United States Patent
Bond et al.

(10) Patent No.: US 12,158,106 B2
(45) Date of Patent: Dec. 3, 2024

(54) HEAT EXCHANGERS

(71) Applicant: Reaction Engines Limited, Abingdon (UA)

(72) Inventors: Alan Bond, Abingdon (GB); Richard Anthony Varvill, Abingdon (GB)

(73) Assignee: Reaction Engines Ltd.

( * ) Notice: Subject to any disclaimer, the term of this patent is extended or adjusted under 35 U.S.C. 154(b) by 0 days.

(21) Appl. No.: 18/136,364

(22) Filed: Apr. 19, 2023

(65) Prior Publication Data

US 2023/0250758 A1    Aug. 10, 2023

Related U.S. Application Data

(60) Division of application No. 17/316,538, filed on May 10, 2021, now Pat. No. 11,661,888, which is a
(Continued)

(30) Foreign Application Priority Data

| | | | |
|---|---|---|---|
| Oct. 11, 2013 | (GB) | ...................................... | 1318098 |
| Oct. 11, 2013 | (GB) | ...................................... | 1318099 |

(Continued)

(51) Int. Cl.
  *F28D 1/047*  (2006.01)
  *F02C 7/141*  (2006.01)
(Continued)

(52) U.S. Cl.
  CPC ............ *F02C 7/141* (2013.01); *F28D 1/0472* (2013.01); *F28D 7/04* (2013.01); *F28D 7/08* (2013.01);
(Continued)

(58) Field of Classification Search
  CPC . F28D 7/04; F28D 1/0472; F28D 7/08; F28D 9/013; F28D 9/0243
  See application file for complete search history.

(56) References Cited

U.S. PATENT DOCUMENTS 2,686,407 A    8/1954  Zellner
3,169,381 A    2/1965  Persson
(Continued)

FOREIGN PATENT DOCUMENTS

AU    2009275670 A1    2/2010
CN    102419128 A    4/2012
(Continued)

OTHER PUBLICATIONS

Hiji, Heat exchanger and hot-water supply device using same, 20010, Full Document (Year: 2010).*

(Continued)

*Primary Examiner* — Nael N Babaa
(74) *Attorney, Agent, or Firm* — Wolf, Greenfield & Sacks, P.C.

(57) ABSTRACT

A heat exchanger which may be used in an engine, such as a vehicle engine for an aircraft or orbital launch vehicle is provided. The heat exchanger may be configured as generally drum-shaped with a multitude of spiral sections, each containing numerous small diameter tubes. The spiral sections may spiral inside one another. The heat exchanger may include a support structure with a plurality of mutually axially spaced hoop supports, and may incorporate an intermediate header. The heat exchanger may incorporate recycling of methanol or other antifreeze used to prevent blocking of the heat exchanger due to frost or ice formation.

14 Claims, 39 Drawing Sheets

Related U.S. Application Data continuation of application No. 14/296,603, filed on Jun. 5, 2014, now Pat. No. 11,162,424.

(30) Foreign Application Priority Data

| Oct. 11, 2013 | (GB) | 1318100 |
|---|---|---|
| Oct. 11, 2013 | (GB) | 1318107 |
| Oct. 11, 2013 | (GB) | 1318109 |

(51) Int. Cl.

| F28D 7/04 | (2006.01) |
|---|---|
| F28D 7/08 | (2006.01) |
| F28F 9/013 | (2006.01) |
| F28F 9/02 | (2006.01) |
| F28F 9/26 | (2006.01) |
| F28F 17/00 | (2006.01) |
| F28F 19/00 | (2006.01) |
| F28D 21/00 | (2006.01) |

(52) U.S. Cl.

CPC ............ *F28F 9/013* (2013.01); *F28F 9/0243* (2013.01); *F28F 9/26* (2013.01); *F28F 17/005* (2013.01); *F28F 19/00* (2013.01); *F28D 2021/0021* (2013.01); *F28F 2260/02* (2013.01); *F28F 2265/26* (2013.01); *F28F 2280/00* (2013.01)

(56) References Cited

U.S. PATENT DOCUMENTS

| 3,638,719 | A | 2/1972 | McGann |
|---|---|---|---|
| 3,828,570 | A | 8/1974 | Stutz |
| 4,088,184 | A | 5/1978 | Cavallaro |
| 4,127,389 | A | 11/1978 | Hackemesser et al. |
| 4,685,511 | A | 8/1987 | Sabatino |
| 4,786,463 | A | 11/1988 | Fernandez et al. |
| 4,874,041 | A | 10/1989 | Crick et al. |
| 4,976,310 | A | 12/1990 | Jabs |
| 5,025,634 | A | 6/1991 | Dressler |
| 5,097,896 | A | 3/1992 | Belcher et al. |
| 5,318,110 | A | 6/1994 | Wei |
| 5,398,752 | A | 3/1995 | Abbott |
| 5,457,951 | A | 10/1995 | Johnson et al. |
| 6,736,191 | B1 | 5/2004 | Lindberg et al. |
| 11,162,424 | B2 | 11/2021 | Bond et al. |
| 11,661,888 | B2 | 5/2023 | Bond et al. |
| 2004/0065433 | A1 | 4/2004 | Meshenky et al. |
| 2005/0066681 | A1 | 3/2005 | Chang et al. |
| 2008/0095611 | A1 | 4/2008 | Storage et al. |
| 2008/0121387 | A1 | 5/2008 | Taniguchi et al. |
| 2009/0277606 | A1 | 11/2009 | Reiss, III et al. |
| 2010/0212346 | A1 | 8/2010 | Bourne et al. |
| 2011/0240275 | A1 | 10/2011 | Piggott |
| 2013/0048246 | A1 | 2/2013 | Giachetti |
| 2013/0048260 | A1 | 2/2013 | Matsumoto et al. |
| 2013/0277022 | A1 | 10/2013 | Neal et al. |
| 2014/0076812 | A1* | 3/2014 | Munro ............... B01D 61/10 210/652 |
| 2015/0013353 | A1 | 1/2015 | Becker et al. |
| 2015/0096726 | A1 | 4/2015 | Citti et al. |
| 2015/0101334 | A1 | 4/2015 | Bond et al. |
| 2015/0204614 | A1 | 7/2015 | Bunce |
| 2021/0262390 | A1 | 8/2021 | Bond et al. |
| 2023/0250759 | A1 | 8/2023 | Bond et al. |
| 2023/0340908 | A1 | 10/2023 | Bond et al. |

FOREIGN PATENT DOCUMENTS

| DE | 3539311 A1 | 5/1987 | |
|---|---|---|---|
| DE | 102006059289 A1 * | 9/2007 | ............ F25B 39/022 |
| DE | 102009004290 B3 | 5/2010 | |
| EP | 1 903 207 A1 | 3/2008 | |
| EP | 2 562 505 A1 | 2/2013 | |
| FR | 1254852 A | 2/1961 | |
| GB | 614 160 A | 12/1948 | |
| GB | 659 151 A | 10/1951 | |
| GB | 883 530 A | 11/1961 | |
| GB | 1 413 473 A | 11/1975 | |
| GB | 1 489 259 A | 10/1977 | |
| GB | 1 530 628 A | 11/1978 | |
| GB | 2 075 397 A | 11/1981 | |
| GB | 2 241 319 B | 11/1991 | |
| JP | S56-144392 A | 11/1981 | |
| JP | S57-2939 A | 1/1982 | |
| JP | S59153095 A | 10/1984 | |
| JP | H04-308325 A | 10/1992 | |
| JP | H05-71682 U | 9/1993 | |
| JP | H06-317363 A | 11/1994 | |
| JP | H11-37674 A | 2/1999 | |
| JP | 2001-241606 A | 9/2001 | |
| JP | 2005-098692 A | 4/2005 | |
| JP | 2006-162157 A | 6/2006 | |
| JP | 2008-144752 A | 6/2008 | |
| JP | 2013-120027 A | 6/2013 | |
| KR | 20100128442 A * | 12/2010 | ............... F24D 3/10 |
| KR | 10-2012-0139813 A | 12/2012 | |
| SU | 1232917 A1 | 5/1986 | |
| WO | WO 2008/030669 A1 | 3/2008 | |
| WO | WO 2008/123603 A1 | 10/2008 | |
| WO | WO 2010/013053 A2 | 2/2010 | |
| WO | WO-2010052887 A1 * | 5/2010 | ............... C25F 3/22 |
| WO | WO 2012/084486 A1 | 6/2012 | |

OTHER PUBLICATIONS

Kim, A method for controlling uniform flow amounts of geothermal heat exchanger, 2010, Full document (Year: 2010).*
Brauckmann, Heat Exchanger, 2006, Full Document (Year: 2006).*
KR20100128442A translation (Year: 2010).*
WO2010052887A1 translation (Year: 2010).*
Invitation to Pay Additional Fees mailed Dec. 5, 2014 in connection with International Application No. PCT/GB2014/000405.
International Search Report mailed Feb. 4, 2015 in connection with International Application No. PCT/GB2014/000405.
International Written Opinion mailed Feb. 4, 2015 in connection with International Application No. PCT/GB2014/000405.
UK Intellectual Property Office Search Report, Ser. No. GB1318098.9, dated Apr. 28, 2014.
UK Intellectual Property Office Search Report, Ser. No. GB1318099.7, dated Apr. 28, 2014.
UK Intellectual Property Office Search Report, Ser. No. GB1318100.3, dated Apr. 28, 2014.
UK Intellectual Property Office Search Report, Ser. No. GB1318107.8, dated Apr. 28, 2014.
UK Intellectual Property Office Search Report, Ser. No. GB1318109.4, dated Apr. 25, 2014.
UK Intellectual Property Office Search Report, Ser. No. GB1318109.4, dated May 14, 2015.
UK Intellectual Property Office Search Report, Ser. No. GB1318109.4, dated May 15, 2015.
Berman et al., Heat exchange has spacing elements made as I-beams placed across coils and contacting in adjacent stages. Thomson Reuters, 1986, 2 pages.

* cited by examiner

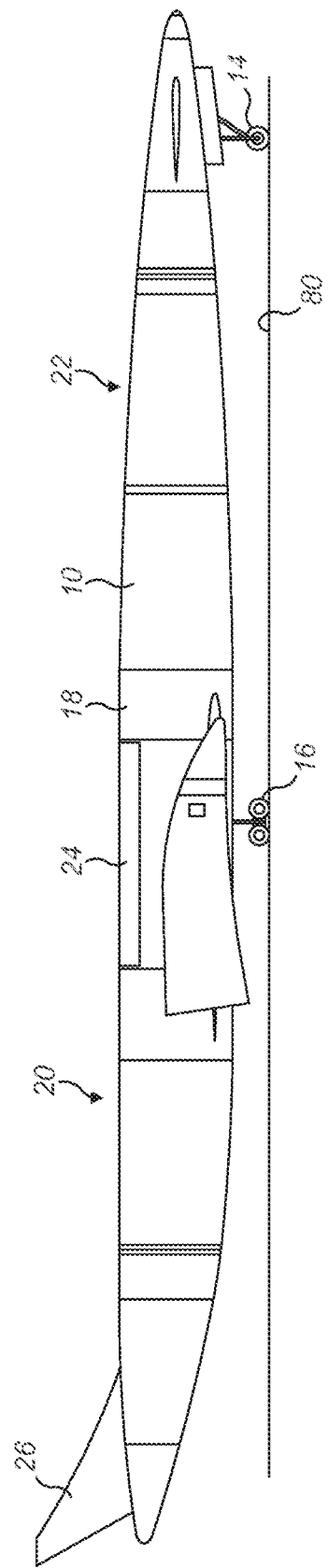

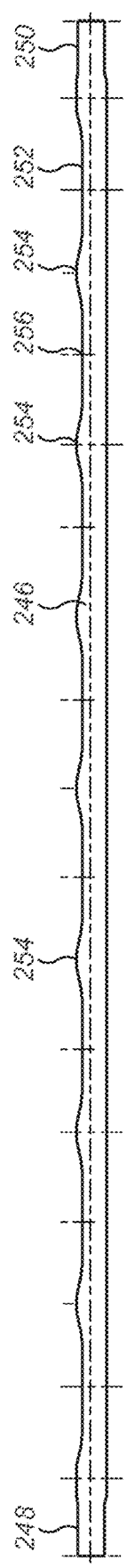
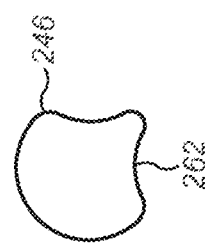
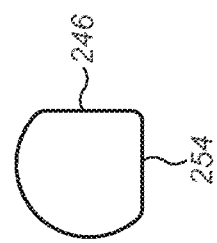
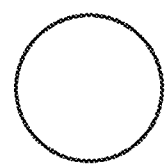

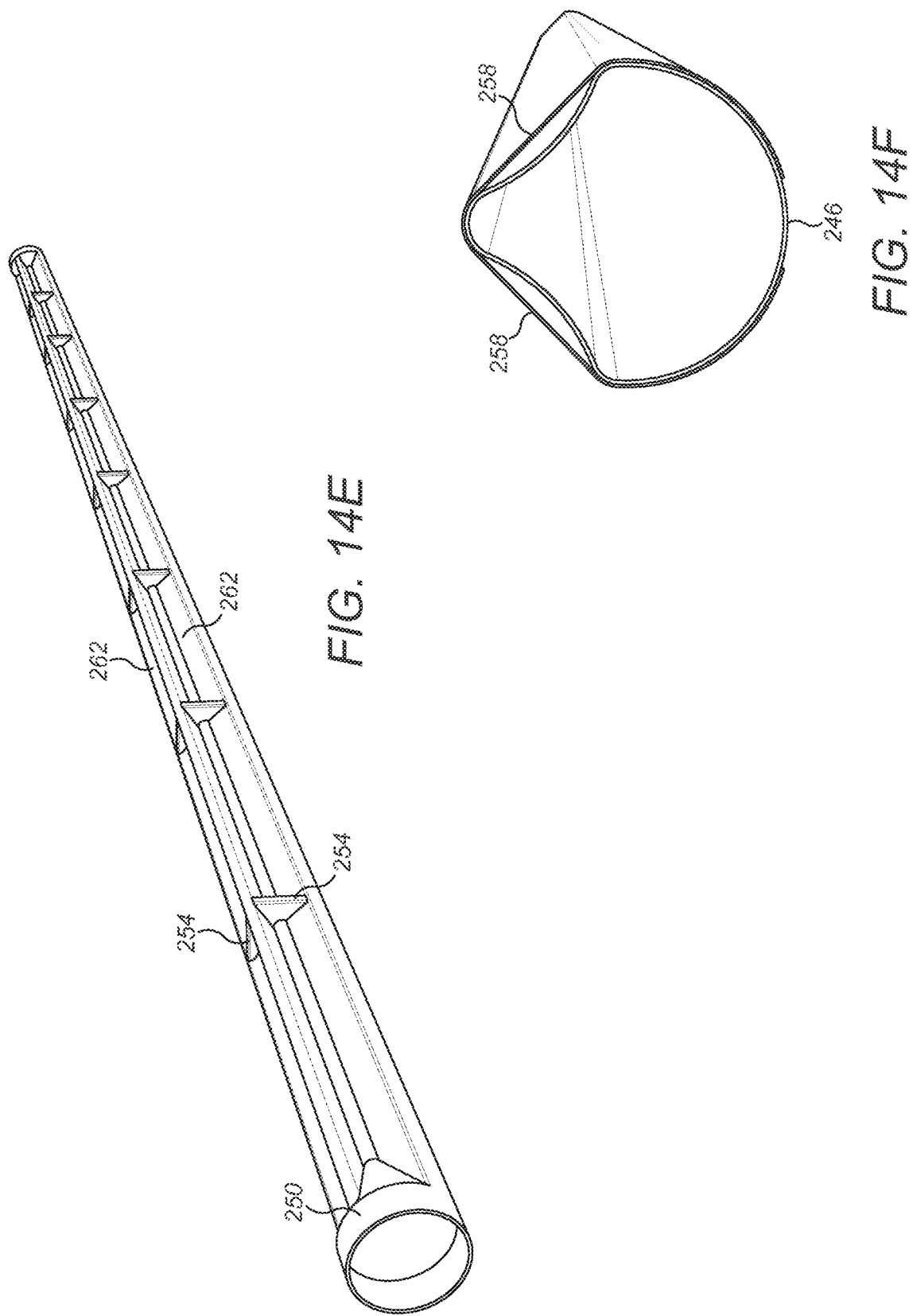

HEAT EXCHANGERS

CROSS-REFERENCE TO RELATED APPLICATIONS

This Application is a Division of U.S. application Ser. No. 17/316,538, filed May 10, 2021, which is a Continuation of U.S. patent application Ser. No. 14/296,603, filed on Jun. 5, 2014, which claims priority under 35 U.S.C. § 119(a) to United Kingdom Patent Application Nos. GB 1318098.9, GB 1318109.4, GB 1318100.3, GB 1318107.8, and GB 1318099.7, each filed on Oct. 11, 2013. Each of the aforementioned U.S. and United Kingdom patent applications is hereby incorporated by reference herein.

FIELD

The present invention relates to heat exchangers such as of the type which may be used in aerospace applications or in industrial or other applications. The invention also relates to engines such as aircraft or aerospace engines including such heat exchangers and to aircraft including such heat exchangers or engines.

BACKGROUND

GB-A-2241319 discloses a heat exchanger with internested spiral tube sections. An inlet manifold is located on one wall and an outlet manifold is located on another wall at the end of the apparatus. However, it is difficult to build such a heat exchanger which will be subject to considerable temperature variations and in a form capable of enduring the numerous cycles that are desirable in certain heat exchangers such as when used in reusable vehicles.

Also, with a substantial airflow through the heat exchanger radially past the tubes, the drag of the airflow on the tubes produces a high radial force on the tubes and the tubes are difficult to support and make last a long time. Additionally, the heat exchanger has rather limited cycle functionality and it is difficult to configure heat exchangers, to accommodate them in an engine and provide a system with low weight and low pressure drop. Also, to achieve sufficient performance it has proven necessary to design a cycle which cools atmospheric air before it enters a compression section downstream of such a heat exchanger at a temperature below 0° C. This can unfortunately very easily result in a very rapid blocking of the heat exchanger with ice because there is often a considerable amount of water vapour in the lower atmosphere where the launch of a vehicle containing the heat exchanger for air cooling may take place, making the entire vehicle unviable. This has proven an exceptionally difficult problem which has been looked at for many years and has been a significant hurdle in being able to provide a reusable vehicle which can operate in a relatively economical horizontal take-off air-breathing mode, and either continue, such as the LAPCAT vehicle which is intended to be capable of transporting three hundred passengers from Brussels, Belgium to Sydney, Australia in about 4.6 hours in an approximately Mach 5 cruising mode, or switch, like the SKYLON vehicle, into a rocket mode for travel out of the atmosphere into orbit.

GB-A-2241537 discloses an air intake for aerospace propulsion which includes a first heat exchanger for cooling incoming air, a water separator downstream of the first heat exchanger, a liquid oxygen injector downstream of the water separator and a second heat exchanger downstream of the liquid oxygen injector. The injector reduces the airflow temperature so that water remaining in the airflow downstream of the water separator is converted to small dry ice crystals. The structure requires the use of two entirely separate heat exchangers and takes up a very considerable axial distance in a flow path along a duct between the two heat exchangers. Also, the liquid oxygen is used to reduce the temperature of the flow from between 5° and 13° C. to minus 50° C. or lower, such that a considerable amount of liquid oxygen needs to be used, to cool the air in a duct where there is already air containing oxygen which may be used downstream in the propulsion.

SUMMARY

According to a first aspect, there is provided a heat exchanger having at least one first conduit section for the flow of a first fluid in heat exchange with a second fluid in a flow path which passes the at least one first conduit section, and a support for the at least one first conduit section, wherein the at least one conduit section is mounted at a first location to the support, and in which the at least one conduit section at a second location thereon is movable relative to the support in response to thermal change.

Optionally, the at least one first conduit section includes a plurality of tubes for heat exchange.

Optionally, the tubes are connected at a first end thereof to an inlet header and at a second end thereof to an outlet header of the at least one first conduit section.

Optionally, said first location is at one of the headers, which is fixedly mounted to the support, the other of the headers being movable relative to the support in response to thermal change.

Optionally, the other of the headers is mounted to a movable support therefor which is movable relative to said support.

Optionally, each said first conduit section comprises a spiral section having a plurality of the tubes extending along in a spiral shape alongside and spaced from one another in rows.

Optionally, the tubes in said first conduit section are arranged in between 1 and 40 rows spaced from one another in a radial direction, for example 4 such rows.

Optionally, the tubes are arranged in about 10 to 1000 rows spaced from one another in an axial direction, for example about 70 to 100 such rows.

Optionally, the tubes are about 2 to 3 metres long and extend from a first header to a second header.

Optionally, the tubes have a diameter which is about 1 mm.

Optionally, the tubes have a wall thickness of about 20 to 40 microns.

Optionally, a plurality of said spiral sections are internested with and oriented angularly spaced relative to one another.

Optionally, said spiral sections are configured in the shape of a generally cylindrical drum.

Optionally, the support includes at least one circular hoop to which said first conduit is secured.

Optionally, the support includes a plurality of said circular hoops which are configured spaced apart from one another in a generally cylindrical perforated drum structure and in which a header of said first conduit is fixed to a plurality of said circular hoops.

Optionally, the heat exchanger includes a support structure extending in an annular fashion and at least partly radially between said header and a further header of the respective at least one first conduit, the further header being supported by a guide member arranged to move circumferentially relative to the perforated drum structure in response to thermal change.

Optionally, said header is rigid or substantially rigid and is fluidly coupled to a flexible conduit.

Optionally, the flexible conduit is fluidly coupled to a rigid or substantially rigid manifold.

Optionally, the manifold is fixed axially in position relative to the support but free to move, e.g. grow, radially.

Optionally, the rows of tubes in a said first conduit section comprise a plurality of rows spaced from one another by spacers arranged to counter aerodynamic load applied to the tubes.

Optionally, a load element, such as a shim, is provided between tubes of two adjacent said first conduit sections for transmitting load therebetween while allowing relative sliding motion therebetween in response to thermal change.

Optionally, the load element is substantially aligned with the spacers to form a generally radially extending load path structure for reaction against aerodynamic load applied to the tubes while allowing relative movement between adjacent said first conduit sections in response to thermal change.

Optionally, said heat exchanger includes a plurality of said load path structures configured in a series in which they are spaced generally circumferentially from one another.

According to a second aspect, there is provided a vehicle engine including a combustion section and a heat exchanger according to the first aspect with or without any optional feature thereof, adapted to cool air (as the second fluid) in a flow path directed towards the combustion section.

Optionally, said vehicle engine includes a helium supply for providing helium as the first fluid, or another working fluid such as hydrogen.

According to a third aspect, there is provided a flying machine, such as an aircraft or orbital launch vehicle, which includes a heat exchanger according to the first aspect with or without any optional feature thereof.

According to a fourth aspect, there is provided a flying machine, such as an aircraft or orbital launch vehicle, which includes an engine according to the second aspect with or without any optional feature thereof.

According to a fifth aspect, there is provided a heat exchanger having a plurality of first conduit sections for the flow of a first fluid in heat exchange with a second fluid in a flow path which passes the first conduit sections, and a support for the plurality of first conduit sections, each of the first conduit sections comprising a plurality of tubes for heat exchange, each first conduit section comprising a spiral section having a plurality of the tubes extending along in a spiral shape alongside and spaced from one another in rows, wherein at least one load element is provided between tubes in mutually radially spaced rows for countering aerodynamic load applied to the tubes.

Optionally, said load element comprises a spacer fixing together, such as by brazing, tubes in radially spaced rows.

Optionally, said load element comprises an element, such as a shim, provided between tubes of two adjacent said first conduit sections for transmitting load therebetween while allowing relative sliding motion therebetween in response to thermal change.

Optionally, said element is fixed to a tube in one said first conduit section and slidably engages a further said first conduit section.

Optionally, said load element comprises at least one I-beam-shaped element.

Optionally, the tubes in a said first conduit section are arranged in between 1 and 40 rows spaced from one another in a radial direction, for example 4 such rows.

Optionally, said tubes are about 1 to 3 metres long from a first header to a second header.

Optionally, the tubes have a diameter which is about 1 mm.

Optionally, the tubes have a wall thickness of about 20 to 40 microns.

Optionally, the tubes are arranged in about 10 to 1000 rows spaced from one another in an axial direction, for example about 70 to 100 or 70 to 200 or 500 such rows.

In some embodiments tubes are made at least partly of alloy material, such as Nickel alloys or Aluminium alloys. Optionally, each tube comprising a first portion made of a first material and a second portion made of a second material. The first portion may terminate at one end of such a tube, such as at a header and the second portion may terminate at a second end of such a tube as at a further header. The first and second portions may be connected to one another such as by a sleeve. This may enable temperature capability to be increased by the use of a first material at a relatively hot region of the heat exchanger but a second material for reasons of density or lost to be used in a colder region.

For example, an aluminium alloy may be used in a colder region and a ceramic or heat resistant alloy in a hotter region. Each of the first and second portions may be connected at one end thereof to the intermediate header.

Optionally, the plurality of spiral sections are inter-nested with and oriented angularly spaced relative to one another.

Optionally, said spiral sections are configured in the shape of a cylindrical drum.

Optionally, the support includes at least one circular hoop to which a first said conduit is secured.

Optionally, the support includes a plurality of said circular hoops which are configured spaced apart from one another in a generally cylindrical perforated drum structure, and in which at least one longeron member is provided for engagingly supporting an adjacent said tube at a location substantially radially aligned with at least one said load element.

Optionally, a plurality of said load elements are provided in a generally radially extending load path structure for reaction against aerodynamic load applied to the tubes.

Optionally, the load path structure is adapted to permit relative movement between tubes of adjacent first said conduit sections in response to thermal change.

According to a sixth aspect, there is provided a vehicle engine including a combustion section and a heat exchanger according to the fifth aspect with or without any optional feature thereof, adapted to cool air, as the second fluid, in a flow path directed towards the combustion section.

Optionally, said vehicle engine includes a helium supply for providing helium as the first fluid.

According to a seventh aspect, there is provided a flying machine, such as an aircraft or orbital launch vehicle, which includes a heat exchanger according to the fifth aspect of the invention with or without any optional feature thereof.

According to an eight aspect, there is provided a flying machine, such as an aircraft or orbital launch vehicle, which includes an engine according to the sixth aspect with or without any optional feature thereof.

According to a ninth aspect, there is provided a heat exchanger having at least one first conduit section for the flow of a first fluid in heat exchange with a second fluid in a flow path which passes the at least one first conduit section, in which each first conduit section comprises a flow path via at least one tube from an inlet to an outlet, and in which an intermediate header is provided in the flow path between the inlet and outlet for flow communication with an intermediate fluid flow path.

Optionally, each of the inlet and outlet comprises a header tube.

Optionally, the header tubes are straight.

Optionally, the at least one first conduit section includes a plurality first flow tubes extending from the inlet to the intermediate header for flow therebetween and a plurality of second flow tubes extending from the intermediate header to the outlet for flow therebetween.

Optionally, the length of a first flow tube plus the length of a second flow tube is about 2 to 3 metres.

Optionally, the first flow tubes and/or the second flow tubes are about 1 mm in diameter.

Optionally, the first flow tubes and/or the second flow tubes have wall thickness of about 20 to 40 microns.

Optionally, said first conduit section comprises a spiral section having the first and second flow tubes extending in a spiral shape alongside and spaced from one another in rows.

Optionally, said heat exchanger includes a controller for controlling pressure in the intermediate flow path.

Optionally, the controller includes a flow valve.

Optionally, the intermediate header comprises an outer enclosure for enclosing first fluid and an injector for injecting intermediate fluid flow into the outer enclosure.

Optionally, the injector comprises a tube having a series of flow apertures spaced therealong for injecting fluid into the outer enclosure.

Optionally, each of the outer enclosure and the injector comprises a straight elongate tube.

Optionally, said rows include a plurality of rows spaced apart from one another along the longitudinal direction of the outer enclosure, the tubes in said spaced apart rows being fluidly coupled to the outer enclosure at respective spaced locations along the length thereof.

In some embodiments tubes are made at least partly of alloy material, such as Nickel alloys or Aluminium alloys. Optionally, each tube comprising a first portion made of a first material and a second portion made of a second material. The first portion may terminate at one end of such a tube, such as at a header and the second portion may terminate at a second end of such a tube as at a further header. The first and second portions may be connected to one another such as by a sleeve. This may enable temperature capability to be increased by the use of a first material at a relatively hot region of the heat exchanger but a second material for reasons of density or lost to be used in a colder region.

For example, an aluminium alloy may be used in a colder region and a ceramic or heat resistant alloy in a hotter region. Each of the first and second portions may be connected at one end thereof to the intermediate header.

A tenth aspect provides a heat exchanger having at least one first conduit section for the flow of a first fluid in heat exchange with a second fluid in a flow path which passes the at least one first conduit section, in which each first conduit comprises a flow path via at least one tube from an inlet to an outlet, wherein at least one of said tubes has first and second portions extending therealong which are formed of different materials to one another.

According to an eleventh aspect, there is provided a method of operating a heat exchanger according to the ninth aspect with or without any optional feature thereof, which comprises flowing helium through the at least one first conduit and through the intermediate fluid flow path.

Optionally, said method of operating a heat exchanger comprises flowing air as the second fluid in the flow path past the at least one first conduit.

According to a twelfth aspect, there is provided an engine, such as a vehicle engine, including a combustion section and a heat exchanger according to the ninth or tenth aspect with or without any optional feature thereof, adapted to cool air (as the second fluid) in a flow path directed towards the combustion section.

Optionally, said engine includes a helium supply for providing helium as the first fluid.

According to a thirteenth aspect, there is provided a flying machine, such as an aircraft or orbital launch vehicle, which includes a heat exchanger according to the ninth or tenth aspect with or without any optional feature thereof.

According to a fourteenth aspect, there is provided a flying machine, such as an aircraft or orbital launch vehicle, which includes an engine according to the twelfth aspect with or without any optional feature thereof.

According to a fifteenth aspect, there is provided a support structure for a heat exchanger having at least one first conduit section for the flow of a first fluid in heat exchange with a section fluid in a flow path which passes the at least one first conduit section, the support structure comprising a generally cylindrical perforated drum structure.

Optionally, said support structure includes a plurality of mutually axially spaced hoop supports.

Optionally, said support structure includes a plurality of mutually radially spaced longeron members which are adapted to supportingly engage the said first conduit sections at a generally radially aligned load path structure.

Optionally, the hoop supports are formed with bearers and/or attachment structures for locating header tubes of the first conduit sections on the hoop supports.

Optionally, the hoop supports and longeron members are configured with generally rectangular or square flow spaces therebetween.

Optionally, said support structure including at least one diagonally mounted bracing element extending across and within or adjacent at least one of the spaces, for example diagonally thereacross.

Optionally, each said space has two diagonally mounted said bracing elements configured in an X configuration thereby providing four substantially triangular flow apertures in the region of each said space.

According to a sixteenth aspect, there is provided a heat exchanger for cooling a fluid in a flow path and containing a component liable to phase change below a temperature thereof, the heat exchanger comprising a series of tubes for the passage of coolant and an injector for introducing an anti-freeze component into fluid in the flow path.

Optionally, the injector comprises an antifreeze injector, e.g. arranged to inject an alcohol, such as a methanol injector arranged for connection to a source of methanol.

Optionally, said heat exchanger includes a removal arrangement for removing liquid located within a body of moving fluid within the flow path.

Optionally, the removal arrangement is located downstream of the injector.

Optionally, the removal arrangement includes at least one catcher arrangement or element arranged to extend generally transverse to a general flow direction of fluid therepast.

Optionally, said heat exchanger includes at least one row of said catcher elements.

Optionally, the catcher elements are spaced apart in the row by a spacing distance which is less than the maximum cross-dimension of each catcher element in a direction of spacing thereof.

Optionally, the spacing distance is about one quarter, one third or half of said maximum cross-dimension.

Optionally, the catcher arrangement includes a section row of catcher elements, the second row of catcher elements being staggered (in a direction from one catcher element to another along a row) with the first row of catcher elements.

Optionally, the catcher elements in the first and second rows are spaced from the catcher elements in the same row substantially the same distance that they are spaced from the catcher element in the other row.

Optionally, each catcher element has a longitudinal extent and has at least one point therealong a substantially circular cross section.

Optionally, each catcher element comprises a hollow tube having at least one (such as a plurality of) liquid collection pocket located on an exterior surface thereof.

Optionally, the hollow tube is hydroformed of metallic material.

Optionally, each liquid collection pocket includes a scavenge aperture communicating from the pocket into an interior conduit of the hollow tube, the scavenge aperture area being of small size for limiting airflow drawn thereinto with liquid.

Optionally, said heat exchanger includes a mesh covering each pocket with a cavity formed between each pocket and the mesh. The mesh may be generally flat in the region of each pocket. The gap behind each such portion of mesh provides the cavity. The physical presence of the catcher element enables air to jig around the catcher element but for liquid to be intertially separated from the air. With the mesh in place, the liquid in the flow may travel into and be caught be the mesh but the air may continue flowing along around the catcher elements.

Optionally, the mesh is an approximately 25 micron to 100 micron mesh, for example a 50 micron mesh.

Optionally, the mesh is coated with a wetting agent.

Optionally, the mesh is coated with silica.

Optionally, said heat exchanger includes a suction system fluidly connected to the hollow tube for removing liquid from the collection pockets.

Optionally, said heat exchanger includes a second said removal arrangement which is located downstream of the said removal arrangement. Embodiments with three of more said removal arrangements are envisaged as well.

The antifreeze injector may include a plurality of injection portions and may be arranged to inject a more concentrated antifreeze at a first injection portion in a first region of air flow and a more diluted (with water) antifreeze at a second injection portion which is more upstream than the first injection portion at a second region of air flow that is warmer than the first region. The water is obtained by condensation out of the air passing through the heat exchanger due to humidity in the air.

The heat exchanger may include a recycle path for recycling antifreeze and liquid water removed from air flow at the second (or further) removal arrangement for re-injection, upstream of the first removal arrangement, at the second injection portion. Each such re-injection in a plural sequence of such re-injections optionally thus may be with the antifreeze being more dilute, into warmer air and more upstream in the airflow than upon the previous injection, the antifreeze thus being re-injectable along a sequence of re-injection points along a path that is counter to the direction of air flow through the heat exchanger. This may thus be considered a kind of "counterflow" of the antifreeze injection system even though the antifreeze, upon injection into the air flow, flows along with the air. The reason for the additional dilution is the condensation of water out of air passing through the heat exchanger. The caught or captured antifreeze (e.g. methanol) and water may then be re-injected (with the antifreeze thus more dilute) into the air flow at a point further upstream than the previous injection at a location where the air flow is warmer. This recycling of antifreeze enables sustained operation without having to use too much antifreeze since the same antifreeze may be injected then caught; and it may then be re-injected and caught again two or more times dependent upon the number of removal arrangements with catcher elements that are employed through the heat exchanger. This also allows the methanol content to become more and more concentrated as the flow becomes colder.

Optionally, said heat exchanger is adapted to cool air to below 0 degrees C.

Optionally, said heat exchanger is adapted to cool air to or to below about minus 100 degrees C., such as down to near minus 140 degrees C., or down to air liquefaction point—about −195 degrees C.

Optionally, said heat exchanger includes a control for controlling the environment in the vicinity of the coldest catcher element to be about 80 mol % or about 88 wt % methanol (on a water-methanol solid-liquid phase diagram) as temperature approaches about minus 100 degrees C. The environment in the vicinity of the coldest catcher element may as the temperature approaches or drops below about −100 degrees C. may in some embodiments be about 70 to 90 mol % methanol (on a water methanol solid—liquid phase diagram), such as about 75 to 85 mol or 78 to 82 mol %.

Optionally, the catcher arrangements are configured and constructed with a sufficient number of catcher elements to remove over 90% of water content from air, such as over 95%, about 99% being one example.

According to a seventeenth aspect there is provided a heat exchanger assembly with a longitudinal extent in a longitudinal direction thereof and which comprises at least one generally annular heat exchanger module arranged to communicate with a longitudinally extending duct, wherein at least one guide vane is provided for turning flow between one and the other selected from (a) generally radial through the heat exchanger module and (b) generally longitudinal along the longitudinally extending duct.

The guide vane may adapted to turn flow from generally radial to generally longitudinal.

The guide vane may be annular or ring-like.

The guide vane may have a leading edge and a trailing edge and is optionally of substantially constant thickness between the leading edge and the trailing edge.

The leading edge may arranged at an angle of about 5 to 20 degrees relative to a radial direction, e.g. about 10 degrees. This may vary outside this range in some embodiments.

The trailing edge may be arranged at an angle of about 5 to 15, or about 8 to 12, degrees to the longitudinal direction. This may vary outside these ranges in some embodiments.

The guide vane may have a longitudinal extent in the longitudinal direction and the guide vane may comprise a curvedly-flaring leading section (which is optionally substantially an arc in cross section) and a substantially conical trailing section, the trailing section extending for about 50 to 85% of the longitudinal extent.

The heat exchanger assembly may include a plurality of said guide vanes which are optionally arranged in a mutually overlapped series along the longitudinally extending duct.

The vanes may be arranged with a narrowing therebetween so as to accelerate flow. In this way flow may be accelerated to substantially the same speed at each vane as a bulk exit speed from the longitudinally extending duct. This assists in maintaining pressure and mass flow rate uniform upstream of the vanes and through the heat exchanger module.

The heat exchanger assembly may include a plurality of said heat exchanger modules arranged in a series along and around said longitudinal duct and a series of said guide vanes may be provided extending adjacent and at least substantially the full longitudinal extent of at least one, optionally all, of said heat exchanger modules. This assists in maintaining pressure and mass flow rate uniform upstream of the vanes and through the heat exchanger modules. Thus two or more generally annular said heat exchanger modules may be configured around the longitudinally extending duct and arranged in a series therealong. Flow may pass overall and/or generally inwardly radially through each heat exchanger module into the longitudinally extending duct. The vanes enable the creation of a generally constant static pressure in the duct downstream of them and therefore uniform flow is drawn through the heat exchanger modules.

Although the heat exchanger modules may be the same size (including diameter or maximum cross-dimension thereof) as one another, they may be different sizes to one another in other embodiments, for example being a series of generally drum-like arrangements with different diameters to one another. The modules may nevertheless be adapted to operate with the same mass flux and pressure drop as one another and may include the same number of rows of heat exchanger tubes as one another, and may in some embodiments have the same difference outer diameter to inner diameter (of where tubes are in the module).

According to an eighteenth aspect there is provided an engine which includes a heat exchanger according to the seventeenth aspect, the heat exchanger being located upstream of an air compressor and/or combustion stage of the engine.

According to an nineteenth aspect, there is provided an engine, such as a vehicle engine, which includes a combustion section and a heat exchanger according to the sixteenth aspect with or without any optional feature thereof adapted to cool air in a flow path directed towards the combustion section.

Optionally, said engine includes a helium supply for providing helium as coolant flowable through the heat exchanger.

According to a twentieth aspect, there is provided a flying machine, such as an aircraft or orbital launch vehicle, which includes a heat exchanger according to the sixteenth aspect with or without any optional feature thereof.

According to an twenty-first aspect, there is provided a flying machine, such as an aircraft or orbital launch vehicle which includes an engine according to the eighteenth or nineteenth aspect with or without any optional feature thereof.

Thus, in some embodiments the heat exchanger is generally drum-shaped and includes a multitude of spiral sections each containing numerous small diameter metal alloy tubes. The spiral sections spiral inside one another. The tubes in some examples are each about 2 to 3 metres long and about 1 millimetre in diameter and have a wall thickness of about 20 to 40 microns or thereabouts.

Each spiral section has an axially-extending coolant inlet header tube which is fixedly attached to a central support sleeve. The tubes of each spiral section are sealingly connected at one end thereof, such as by brazing, to the inlet header tube and extend in a small plurality of rows radially (such as about 1 to 10 rows, 2, 3, 4, 5, 6 or 7 rows being some examples) and in a large number of rows axially such as about 75 to 100 rows or in excess of 100 rows. These various thin tubes all spiral out from the inlet header tube to an outlet header tube to which they are also sealingly connected, such as by brazing. In other embodiments, the flow direction could be reversed such that the inlet headers are at a radially outward location and the outlet headers at a radially inward location and air may flow through the heat exchanger in a radially outward direction in a generally counter-flow to the coolant in the tubes which may be helium.

Also, as temperature changes during operation of the heat exchanger or otherwise, the inlet header tubes remain fixed substantially in position relative to the internal support sleeve. However, due to the thermal expansion, the length of the small diameter tubes changes and the various spiral sections slide over one another in a generally circumferential fashion, the outlet header tubes also moving relative to the internal support sleeve. Therefore, the heat exchanger may be thermally cycled many times due to substantial alleviation of thermal stress, even though over 100 or up to 200 or more full flight cycles.

Also, at various points along their length, the tubes in each spiral section may be supportingly fixed together such as by brazing and each row of tubes which is adjacent to a row of an adjacent spiral section may be provided with a baffle plate, spacer or shim which extends fully along the tubes in the axial direction and slightly radially approximately 1 to 10 millimetres or so. The baffle plates or shims in adjacent spiral sections may slideably abut against one another or a baffle plate or shim of one spiral section may slideably engage upon adjacent fluid flow tubes of an adjacent spiral section. Due to the supporting fixing of the tubes in each section and the sliding abutment, not only are all of the spiral sections easily able to expand and contract as they desire during thermal cycling but the radial drag load of heatant such as air, passing through the heat exchanger outside and between the small diameter tubes may be transmitted inwardly (or outwardly) through all of these spiral sections in a strong substantially radial load path and may be reacted against by the internal support sleeve, or by an external support sleeve in the case of radially outward air flow.

With counter flow heat exchange between radially travelling air flow (heatant) and oppositely radially spiralling helium coolant flow in the narrow tubes, curved ducting may be provided radially outside the heat exchanger to curve approaching axial air flow into the heat exchanger or exiting axial air flow leaving the heat exchanger in the case of outwardly travelling airflow though the heat exchanger. Due to this type of construction, the heat exchanger tubes are relatively well protected and in the event of a problem such as bird strike or other ingestion causing an engine failure after take-off (EFATO), the helium tubes are unlikely to be damaged, the engine may easily be shut down and, with or without dumping fuel to come below maximum landing weight, the vehicle may have a good probability of performing a successful landing with the respective engine shut down.

The internal sleeve may be provided with a perforated or "bird cage" construction to enable the heatant, such as air, to pass therethrough without significant losses. The sleeve may comprise circular hoops at either end thereof, as series of mutually circumferentially spaced and axially extending longeron members, such as about 10 to 50 said longeron members, as well as one or more intermediate circumferential hoops space in a series along the support sleeve. The longeron members may be spaced from one another roughly the same distance that the hoops are spaced from one another to form generally square shapes or spaces which may be reinforced by x-shaped diagonal members such that all of the perforations through the internal support sleeve are triangles. This structure has been found to provide a lightweight form which is noticeably strong for resisting substantially radially inward loads which may be placed thereon without producing significant flow losses and also carries gravitational and inertial loads during flight. In the case of an arrangement with radially outwardly travelling air, a similar support sleeve or bird cage could be provided radially outside the coolant tubes.

It is possible to arrange one or more intermediate header tubes located part of the way along the route of the small diameter tubes from the inlet heads thereof to the outlet headers thereof. Thus, the tubes may conceptually be thought of as "cut" part way along their length and with each of the cut ends attached to the intermediate header tube. An internal intermediate supply tube may be inserted within the intermediate header tube to extend substantially all of the way along its length, the intermediate supply tube having a series of outlet apertures formed in a series therethrough a long its length. During operation of the heat exchanger coolant may be fed into the heat exchanger not only at the inlet header tubes but also at the internal intermediate supply tubes such that further coolant may be added at the intermedial header tubes and different mass flow rates of coolant may flow through different parts of the heat exchanger, allowing the single heat exchanger construction to act as though it is a plurality of different heat exchangers but with roughly only the cost and complexity of building one. It will be appreciated that to add the further coolant at the intermediate header tubes, the pressure of the supply at the intermediate header tubes may be controlled to be similar or the same as the pressure of the nearby coolant inside the small diameter tubes. The use of the internal intermediate supply tubes with the series of outlet apertures formed in a series therethrough ensures that the uniform flow conditions can be achieved along the axial length of the heat exchanger.

The heat exchanger of the preferred embodiment to be described herein includes a frost control system and after an actual test carried out on a test heat exchanger in confidential conditions for the European Space Agency on behalf of the United Kingdom government, the European Space Agency confirm a successful demonstration of the frost control mechanism at laboratory scale. The tested heat exchanger included a total of over 40 kilometres of the small diameter tubes at a weight of less than 50 kilograms and the incoming airstream was cooled to minus 150° C. in under 20 milliseconds. No frost blockage was noted during low temperature operation and the European Space Agency stated they are now confident that a ground engine demonstrating test may now be performed.

The heat exchanger thus may be provided with one or more dogleg zones in each spiral section, each dogleg zone in including a short radially extending section. Thus, each spiral section is not fully spiral in shape but comprises a first substantially spiral portion then a short radial portion which is followed by another substantially spiral portion and so on. This construction causes the provision of a substantially arcuate box shape between the doglegs of adjacent spiral sections.

Within the arcuate box spaces are located a series of one or two radially spaced and circumferential staggered rows of catcher elements. Each catcher element may comprise a tube having an interior which can be connected to a suction system for sucking on the contents of a plurality of exterior pockets spaced along the capture element on the leading face thereof, the pockets being connected via through-apertures to the interior of the tube. The capture element leading face pockets may be covered with 50-micron silica-coated mesh to form a porous front face to the pocket. A wetting agent other than silica may be used in other embodiments as may meshes of different sizes.

In this embodiment, a methanol, or other anti-freeze substance, injection system is located upstream of the capture elements and as water condenses out of the flow it mixes with the methanol which maintains the water as a liquid rather than freezing and this mixture is separated from the air flow by inertial separation upon contact with the wet mesh of the capture elements, then being sucked by vacuum via the pockets and through-apertures and carried away along the capture elements. When there are a plurality of said dogleg zones in each spiral section, a further set of similar catcher elements may be employed in further-resulting arcuate box spaces. In this case, in an example when the air flow is radially inward and is being cooled, for example by helium in the narrow tubes, pure or relatively concentrated methanol may be injected at or just upstream of the radially innermost arcuate box section and then at least partially caught in a mixture with water by the respective catcher elements, and this more dilute mixture may then be recycled further radially outboard in the heat exchanger where the temperature is higher and caught again. Thus, the methanol may be considered in this embodiment to run in overall radial counterflow relative to the air which reduces the required methanol consumption to prevent freezing and blockage.

The methanol could be fully separated from the water after use but it may alternatively be allowed to pass with the engine supply air to a combustion section of the engine where it may contribute to thrust. While the thrust control system is running, the methanol's (combustion product) weight ejected backwards from the main engine rocket nozzles may in some embodiments add 2% to thrust. Also, the loss of the methanol's weight from the vehicle may be desirable in order to enable a higher vehicle velocity to be achieved in response to engine thrust later on during flight.

The frost control system described herein can remove typically 99% of the water content from air.

The conditions in the heat exchanger may be carefully controlled such that operation when considered on a water-methanol solid-liquid phase diagram the environment in the vicinity of the coldest catcher elements is in the region of about 80 mol % or about 88 wt % methanol as the temperature approaches about minus 100° C.

The two above-mentioned radially spaced and circumferentially staggered rows of catcher elements can be configured with the leading row elements circumferentially about half way between the adjacent elements of the trailing row. The leading capture elements may act as bluff bodies which deflect condensed fluid, which may have built up on the narrow coolant-containing tubes, in the flow generally towards the capture elements in the trailing row. This means that about 95% of the fluid removed by the two rows may be removed by the trailing row and only 5% by the leading row.

Thus, in some embodiments, the leading row of capture elements may be replaced by a passive row of bluff body elements, which could be flat sheets with slots or slits opposite the capture elements.

The heat exchanger may be provided with deflector-shaped foil shims in the region of the short radially extending portions of the small diameter tubes in order to ensure that the liquid flow is directed towards the capture elements and does not easily take a short cut across the tubes in the regions of these radial sections. Also, the gaps between the tubes in the radially extending portions are preferably sealed.

Thus, it is anticipated that the frost control system may be used in the low atmosphere to remove water content from the air flow such that icing up and blockage of the heat exchanger does not occur. As the vehicle travels up towards the top of troposphere and towards the stratosphere, for example at an altitude of about 10 kilometres, thereabouts or somewhat higher, there is no longer enough water vapour present to cause troublesome icing and the frost control system can be switched off by shutting down methanol pumps and capture element suction pumps.

Even though the heat exchanger could cool the air down to its liquification point if necessary near the air outlet from the heat exchanger, i.e. near the internal bird cage when the flow is radially inward, the frost control system is set up so that the great majority of the water is removed with methanol at a higher temperature further back in the heat exchanger. At very low temperatures, down below about minus 50° C. and all of the way down to near minus 140° C. any remaining methanol-water liquid content will, if it solidifies, turn directly to mass ice rather than the feathery frost that can be formed at higher temperatures, by direct sublimation from the vapour, and so causes less of a blocking issue.

When a reusable vehicle in which the heat exchanger is used, such as a SKYLON vehicle or similar craft, is travelling back into the atmosphere at high speed, air inlet nacelles to the engine may be closed. Even with no air passing through the heat exchanger, helium may be cycled around the small diameter tubes in order to prevent overheating of the heat exchanger and potentially also nearby components due to aerodynamic heating via the outside body of the engine upon atmospheric re-entry.

In other embodiments, fluids other than helium may be flowed along inside the heat exchanger tubes, such as hydrogen. Instead of acting as a helium/air heat exchanger, the heat exchanger may act as a hydrogen/other fluid heat exchanger (for example). The heat exchanger tubes are generally circular in cross-section in the preferred embodiment although other shapes could be used in other embodiments.

BRIEF DESCRIPTION OF THE DRAWINGS

The present invention may be carried out in various ways and one preferred embodiment of a heat exchanger, an engine and an aircraft in accordance with the invention will now be described by way of example with reference to the accompanying drawings, in which:

FIG. 1A is a side elevation of one preferred embodiment of an aircraft incorporating an engine with a heat exchanger in accordance with a preferred embodiment of the present invention;

FIG. 14A is an elevational view in a circumferential direction of a capture tube of the capture assembly as hydroformed;

FIG. 14B shows the cross-sectional profile of the hydroformed capture tube of FIG. 14A at a circular end spigot thereof;

FIG. 14C shows the profile section of the capture tube of FIG. 14A at a raised point of the profile shown in FIG. 14A, at one end of each of two adjacent liquid capture pockets;

FIG. 14D shows the profile of the tube mid-way between two such pocket ends;

FIG. 14E shows a perspective view of the tube of FIG. 14A;

FIG. 14F shows a sectioned perspective view of the tube of FIG. 14A with a silica-coated mesh wrapped tightly therearound;

DETAILED DESCRIPTION

Figure 1B:
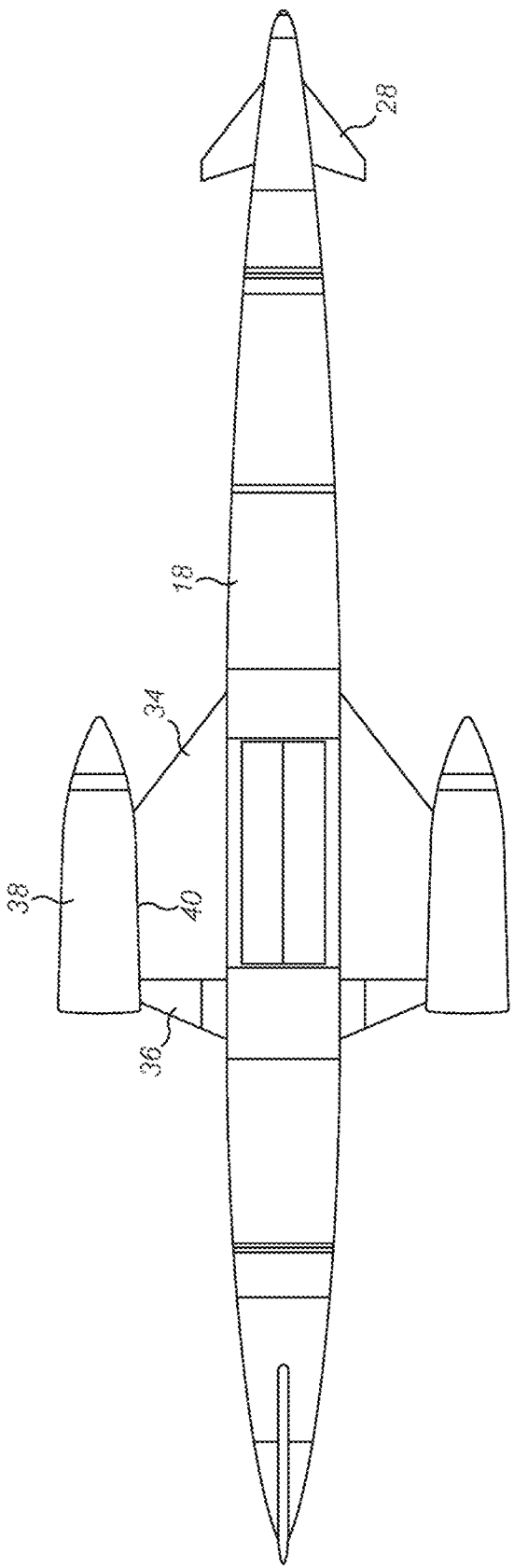
FIG. 1B is a top plan view of the aircraft of FIG. 1A.
Figure 1C:
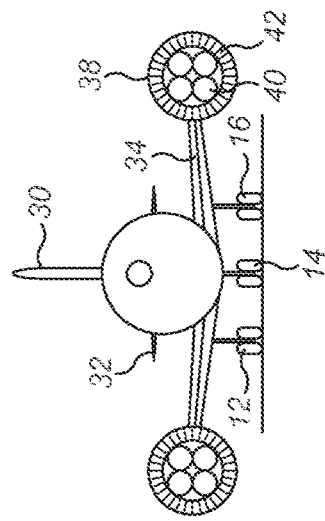
FIG. 1C is a rear elevation of the aircraft of FIG. 1A.
Figure 2:
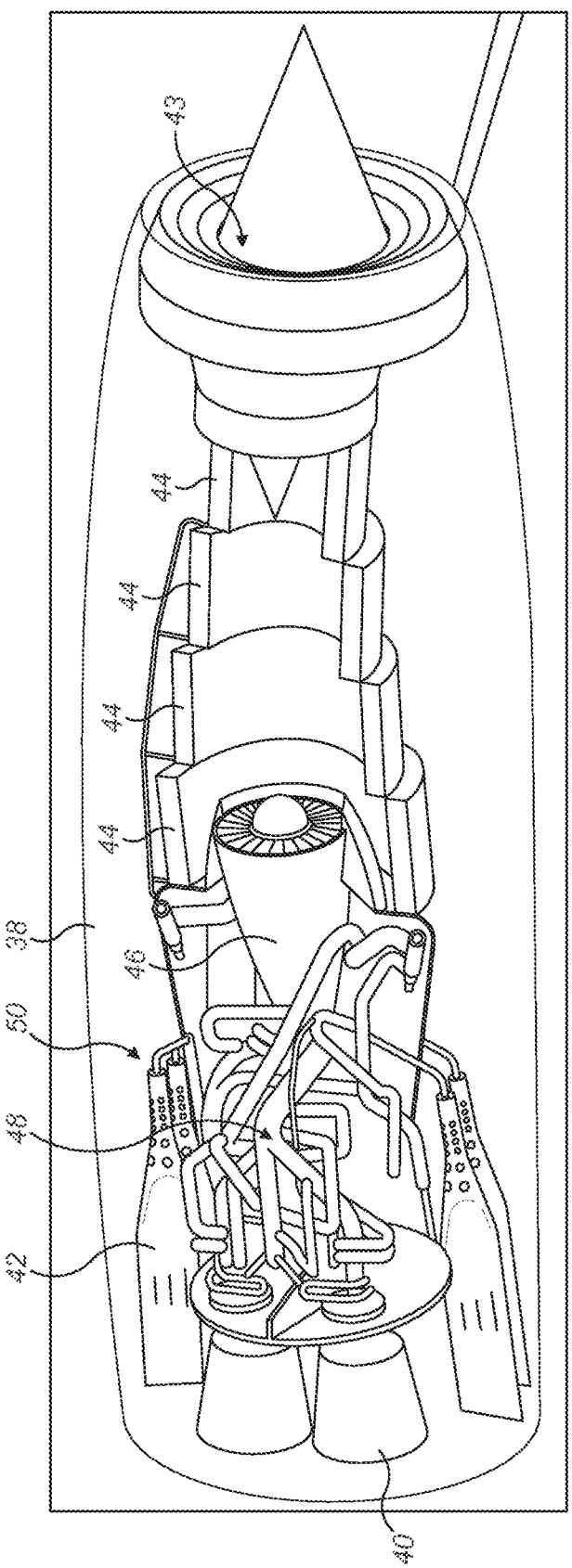
FIG. 2 is a schematic view of a prior art engine.

As shown in FIGS. 1A, 1B and 1C, an aircraft 10 with a retractable undercarriage 12, 14, 16 has a fuselage 18 with fuel and oxidant stores 20, 22 and payload region 24. A moving tail fin arrangement 26 and all moving canard arrangement 28 are attached to the fuselage 18. Main wings 34 with elevons 36 are attached to either side of the fuselage 18 and each wing 34 has an engine module 38 attached to a wingtip 40 thereof. As shown in FIGS. 1C and 2, a rear of each engine module 38 is provided with four rocket nozzles 40 surrounded by various bypass burners 42.

As shown in FIG. 2, the prior art engine module 38 includes an air inlet 43, heat exchanger 44 in four parts, a turbo compressor 46 and cycle conduits 48. In an air breathing mode of the engine module 38 inside the Earth's atmosphere, part of the incoming air passing through the air inlet 43 passes through the heat exchanger 44 to the turbo compressor 46 and part is bypassed along bypass duct 50 to the bypass burners 42.

In the preferred embodiment, the prior art heat exchanger 44 is replaced with the heat exchanger or pre-cooler 52 or a plurality of said heat exchangers 52 operable in parallel.

Figure 3:
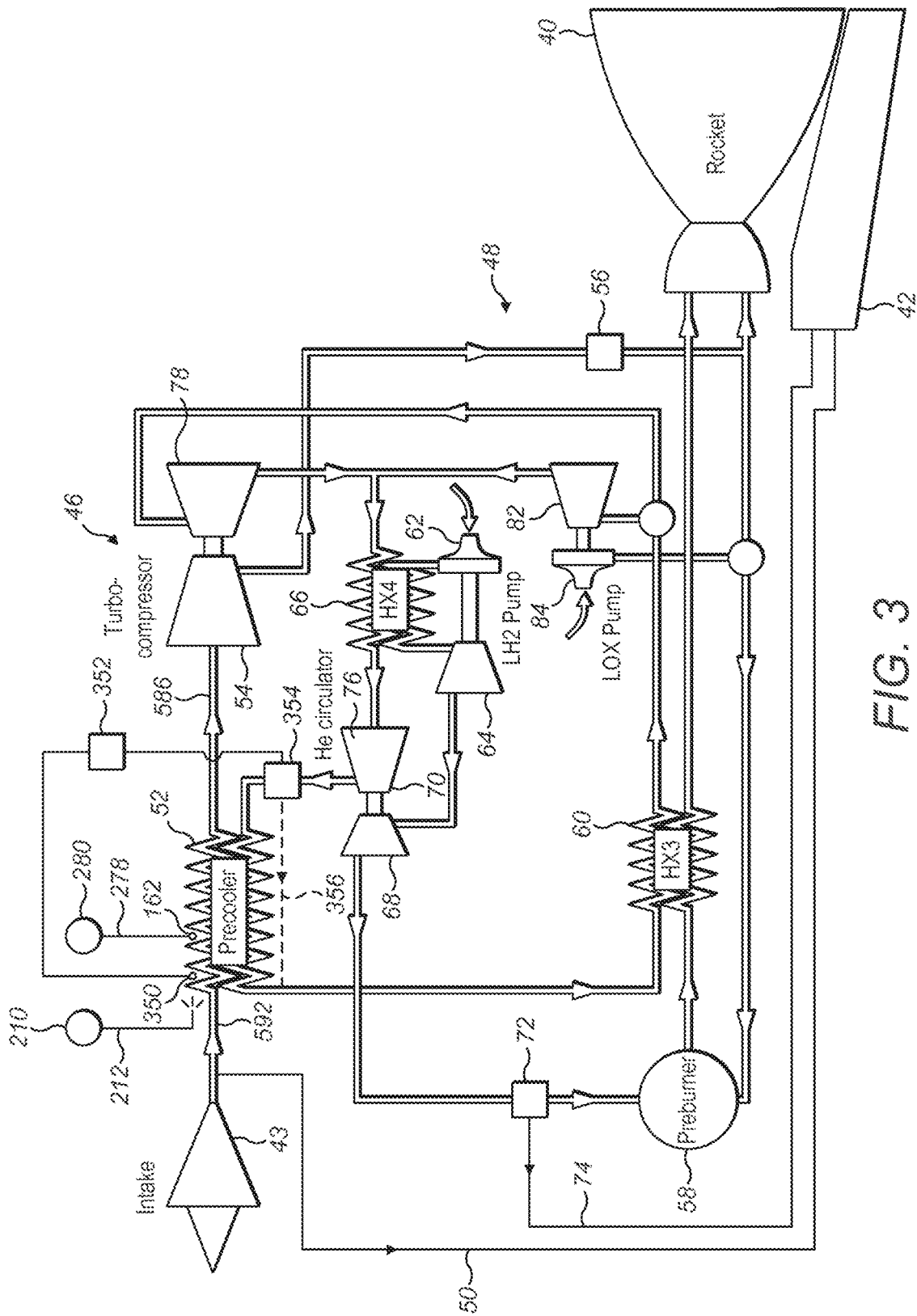
FIG. 3 is a schematic cycle diagram for the engine of FIG. 2 which has been modified to include a heat exchanger in accordance with a preferred embodiment of the present invention.

FIG. 3 shows a schematic view of the cycle for the modified engine module 38, which has been simplified for the purposes of clarity to show only one rocket nozzle 40 instead of four.

Thus, as shown in FIG. 3, in the air breathing mode, air enters the intake 43 and passes either to the heat exchanger 52 or via the bypass duct 50 to the bypass burners 42. The air passing through the heat exchanger 52 is then compressed in a compressor 54 of the turbo compressor 46 before passing through valve 56 to rocket nozzle 40 and partly also to the pre-burner 58 before passing through heat exchanger 60 before passing with uncombusted hydrogen in pre-burner exhaust products for further combustion at the rocket 40.

A liquid hydrogen pump 62 driven by a turbine 64 drives hydrogen through a heat exchanger 66 and the turbine 64 through a turbine 68 of a helium circulator 70 to the pre-burner 58 for partial pre-burner combustion, although some of the liquid hydrogen may be bypassed by valve 72 along the conduit 74 for combustion in the bypass burners 42.

The helium circulator 70 includes compressor 76 which drives gaseous helium through the heat exchanger 52 in counter-flow heat exchange with the air passing in the opposite direction (considering radial components of the paths of the air and helium), the helium then passing through heat exchanger 60 before travelling through helium turbine 78 before being cooled by the hydrogen in heat exchanger 66 and then passing back to the helium compressor 76. In this air breathing mode, the aircraft 10 is able to take off horizontally from stationary on the ground 80 (FIG. 1A).

Once the aircraft 10 is travelling at a significant speed of approximately Mach 5, it may switch from the air breathing mode into a full rocket mode. In the full rocket mode, the air inlet 43 is closed; the path of hydrogen through the cycle conduit 48 is similar to that in the air breathing mode although no hydrogen is diverted by the valve 72 to the bypass burner 42. The turbo compressor 46 is inactive. In the helium circuit, the gaseous helium now flows from the helium compressor 76 through heat exchanger 52 and heat exchanger 60 but then to turbine 82 before returning to the heat exchanger 66 and then to the helium compressor 76. The helium turbine 82 drives liquid oxygen pump 84 which directs oxygen towards the rocket nozzle 40 as well as partly via the pre-burner 58 and then as a pre-burner exhaust product together with unburnt hydrogen to the rocket nozzle 40 for combustion therein. The valve 56 is closed in the full rocket mode.

In the full rocket mode, the aircraft 10 may accelerate up through high Mach numbers and into orbit.

Figure 6:
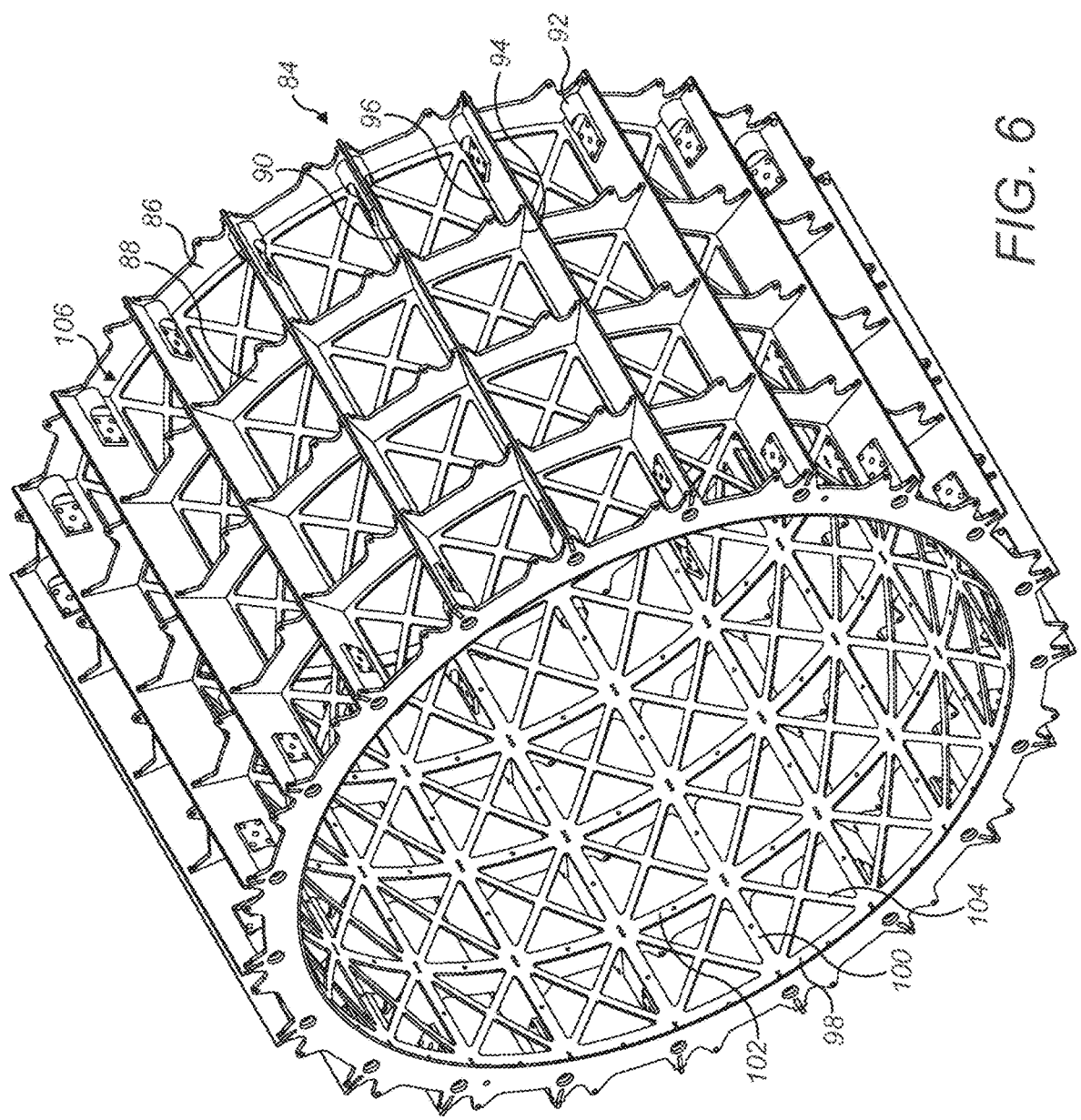
FIG. 6 is an isometric view of a drum-shaped bird cage or perforated sleeve support for the heat exchanger.

As shown in FIG. 6, the heat exchanger 52 has a support in the form of a central bird cage or generally cylindrical perforated drum 84. The drum 84 has two end support rings 86 spaced apart from one another and three intermediate support rings 88 which are spaced apart in an even series between the end support rings 88. A series of 21 longeron members 90 extend along between the two end support rings 86 and are supported by all five of the support rings 86, 88. The longeron members 90 comprise substantially flat radially aligned and thin plates. The longeron members 90 are attached by threaded bobbin members 92 to the two end support rings 86 and have a series of three slots 94 near radially inner edges 96 thereof. The slots 94 extend approximately one quarter to three quarters of the radial extent along each longeron member 90 and enabling supporting engagement between the longeron members 90 and the intermediate support rings 88. The intermediate support rings 88 also have slots, which correspond, to enable the engagement shown in FIG. 6.

The support drum 84 also includes an internal stiffener tube 98 which comprises a perforated tubular element having longitudinal members engaging along the full length of each of the longeron members 90, circumferentially extending members 102 extending along the full circumferential extent and engaging each of the support rings 86, 88, as well as X-shaped bracing members 104 located adjacent to generally square spaces 106 formed between the various longeron members 90 and support rings 86, 88. The stiffener tube 98 therefore forms a very stiff perforated lattice within the drum 84 which is designed to carry shear loads. The drum is capable of accepting a high radially inward load and the four triangles formed in the region of each X-shaped bracing member 104 enable substantial airflow to pass radially through the perforated drum 84 without a significant pressure drop.

Figure 10A:
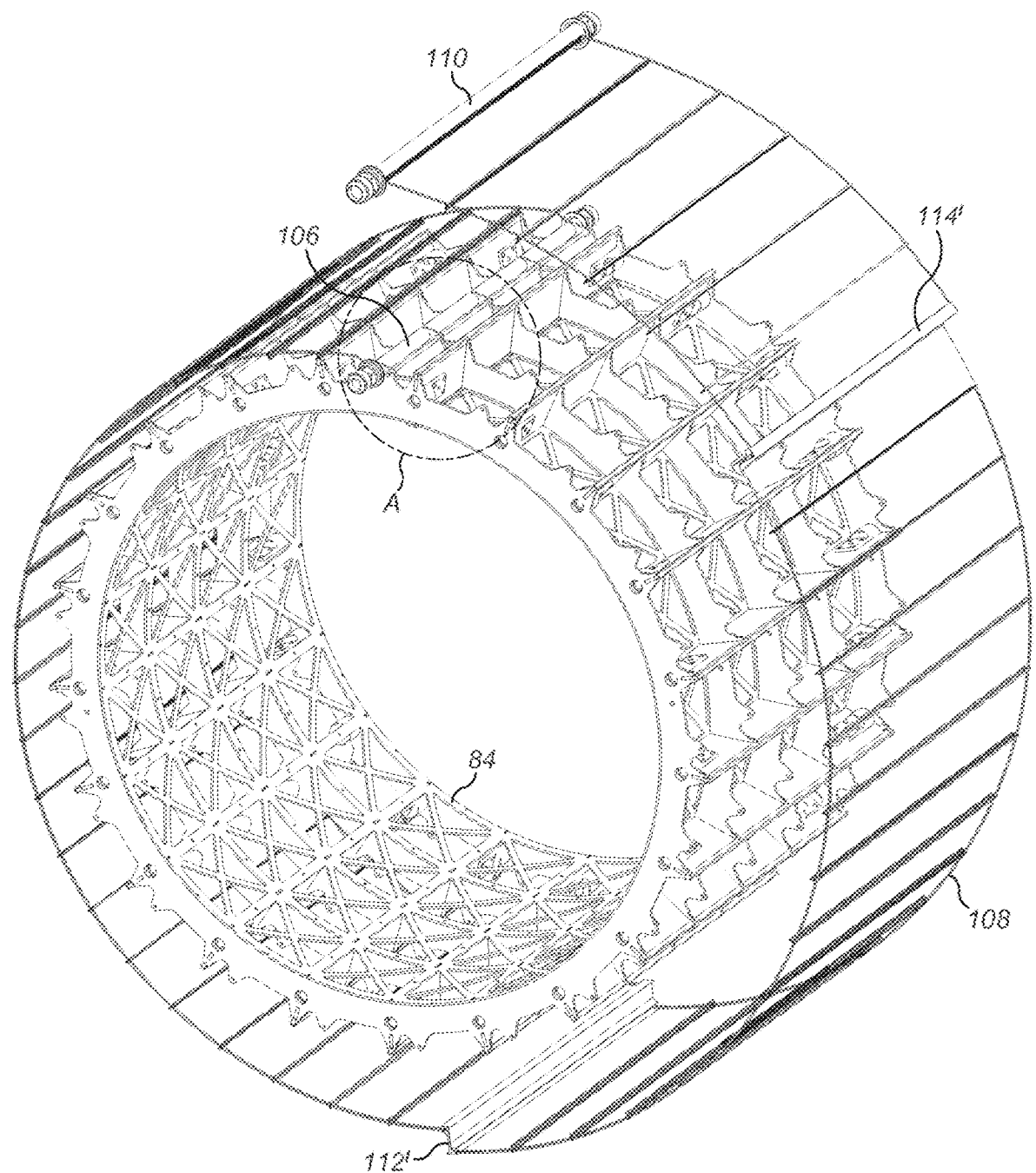
FIG. 10A shows the support member of FIG. 6 with optional longeron shoes fitted to longeron elements of the support and with the components of the spiral section shown in FIG. 8A fitted in a spiralling fashion therearound.

As shown in FIG. 10A, 21 spiral conduit sections, only one of which is shown and which is only partly shown in this Figure, may be secured around the perforated drum with an inlet header 106 of each modular spiral section 108 secured to the support drum 84, the spiral section 108 spiralling outwardly radially away from the central axis of the drum 84 as it extends circumferentially substantially 360° around the support drum 84 to an outlet header tube 110. Each spiral section 108 may be modified in other embodiments to extend a greater or less angle around. As can be seen in FIG. 10A, the modular spiral section 108 includes first 112' and second 114' dogleg sections containing short radially extending sections of heat exchanger tubing as will be described below. In other embodiments more than two such dogleg sections may be used, such as three, four or five in each spiral section 108.

Figure 8A:
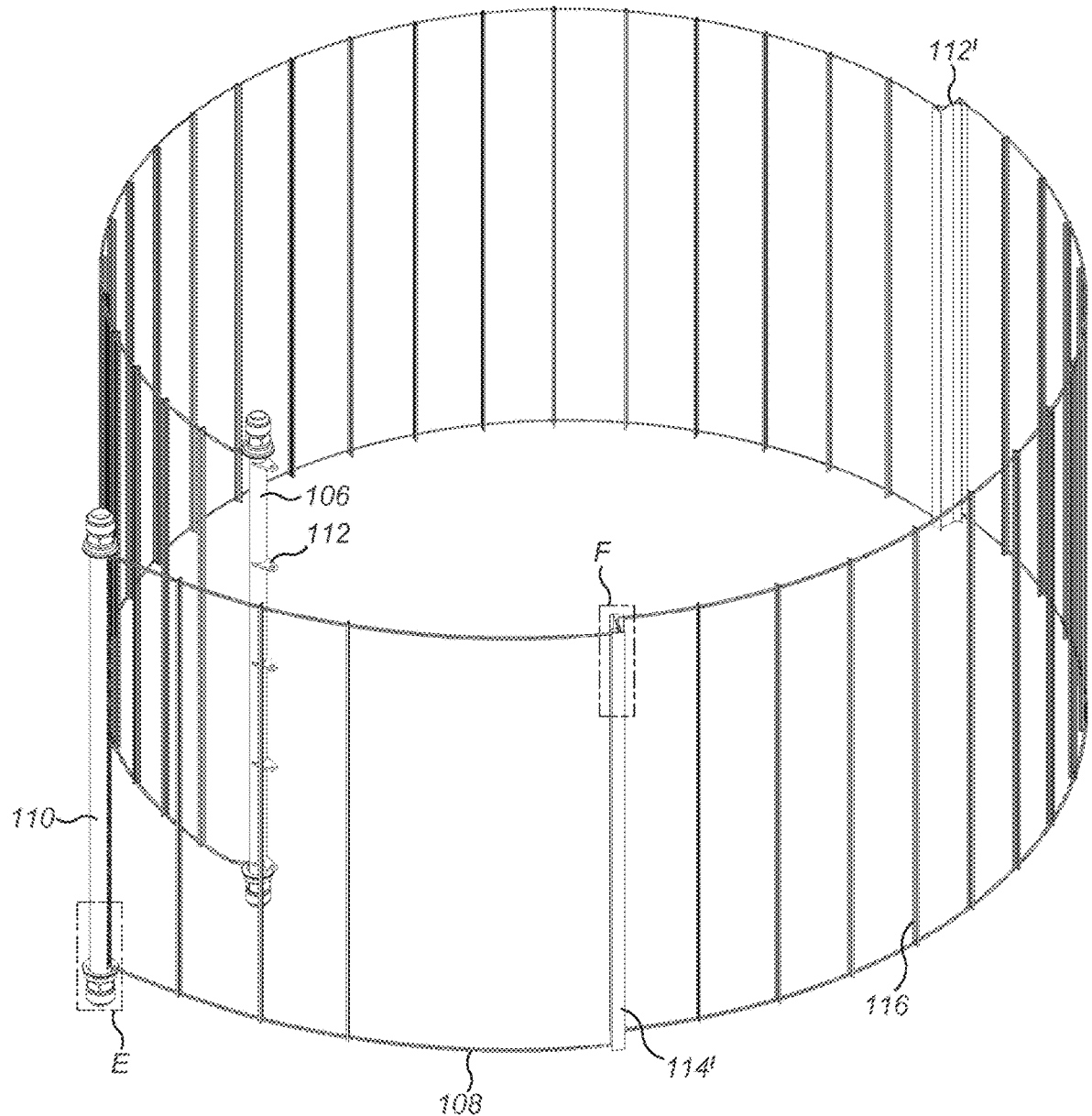
FIG. 8A is a view similar to FIG. 7F but with a substantial proportion of the heat exchanger tubes of the spiral section removed for the purposes of clarity so as to show positions of baffle stations along the curved generally circumferential length of the heat exchanger section.
Figure 10B:
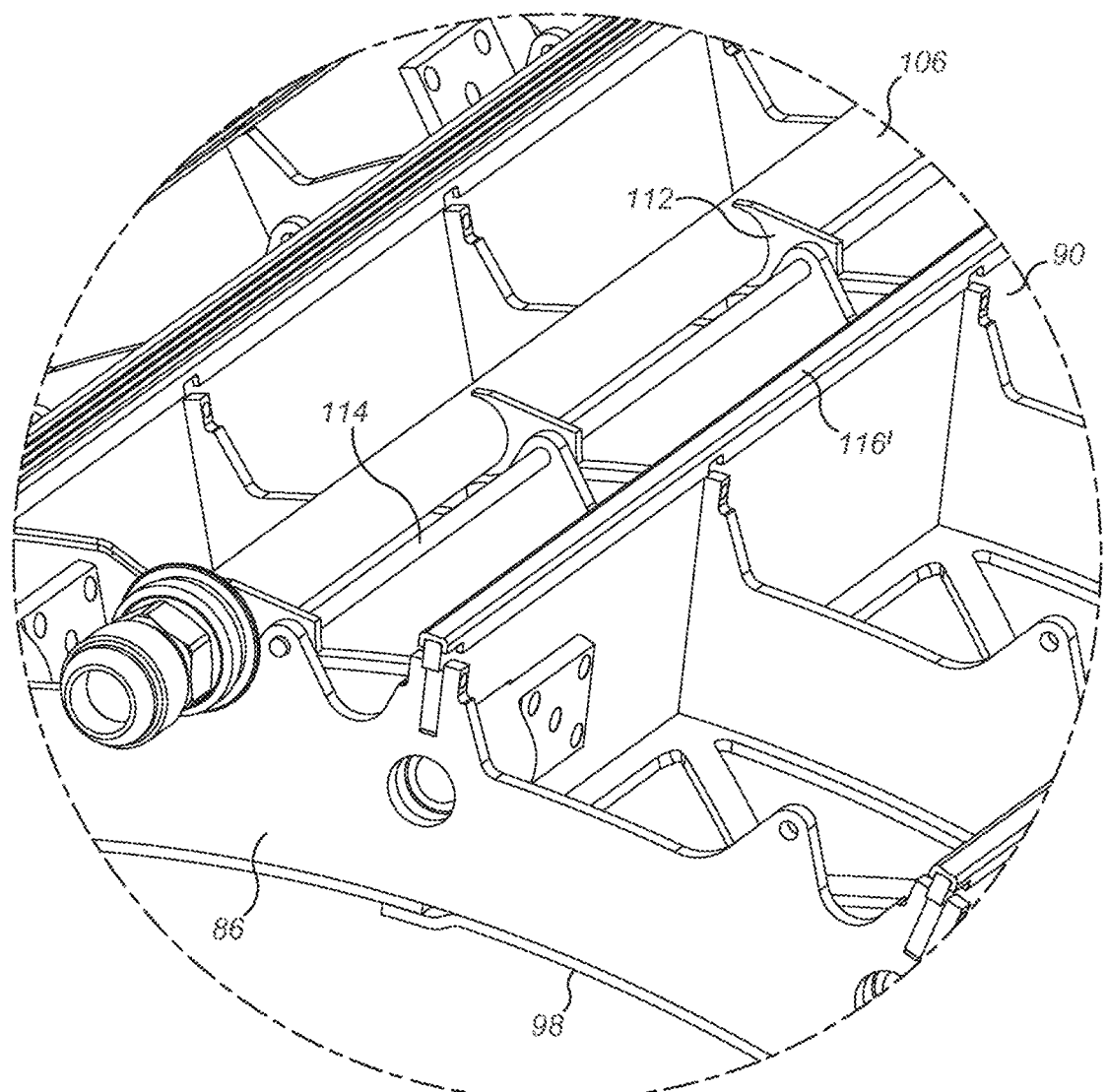
FIG. 10B shows a detail isometric view on detail A in FIG. 10A.

FIG. 10B shows how the inlet header tube 106 includes a series of five mounting flanges 112 (only some of which are shown in FIG. 10B) which have apertures (not shown) engaged by a locking rod 114 to lock the inlet header tube 106 in position to each of the support rings 86, 88. As can be seen in FIG. 10B, an optional longeron shoe 116' covers the radially outer edge of each longeron member 90 to protect the spiral sections 108 which may engage therewith. The longeron shoes 116' are not used in other embodiments. FIG. 8A also shows the location of baffle stations 116 which are regularly spaced along the spiral sections 108.

Figure 8B:
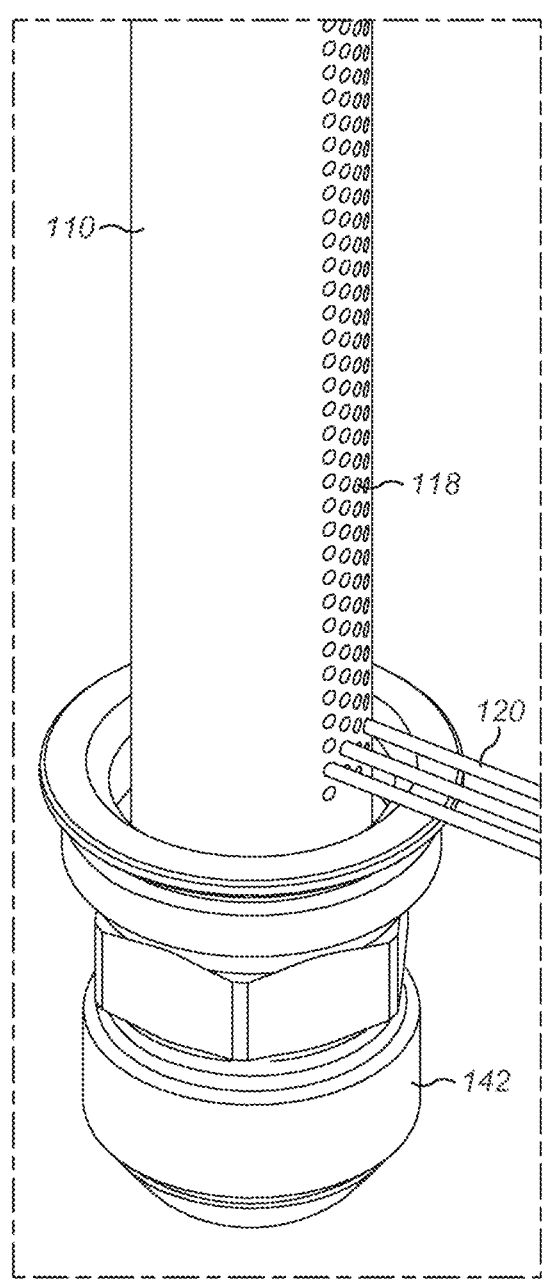
FIG. 8B is a detail view isometric on detail E in FIG. 8A.

FIG. 8B shows that the outlet header 110 (and the inlet header 106 is similar) has within it a series of 800 apertures 118 configured to accept 800 corresponding helium heat exchange tubes 120 only three of which are shown in FIG. 8B. Other embodiments may employ fewer or, indeed, more such tubes 120. The helium tubes 120 are brazed into the apertures 118. To prepare the helium tubes 120 for brazing, preferably the tubes are scanned for defects, wall thickness is measured (OD), a pressurization test is conducted, and the tubes are optionally electrochemically milled, washed, dried, and then cut and formed to shape. The brazing is preferably carried out under vacuum.

The helium tubes 120 are arranged in 200 rows spaced along the axial direction of the headers 106, 110 and four rows radially. The helium tubes 120 extend all of the way along from each inlet header 106 to each outlet header 110.

Since there are 21 spiral sections 108 and each tube 120 is approximately 2 to 3 meters long, the heat exchanger 52 contains approximately 40 kilometres of the tubes 120. The tubes 120 are approximately 1 millimetre in diameter or somewhat more and have a wall thickness of about 20 to 40 microns.

Figure 7A:
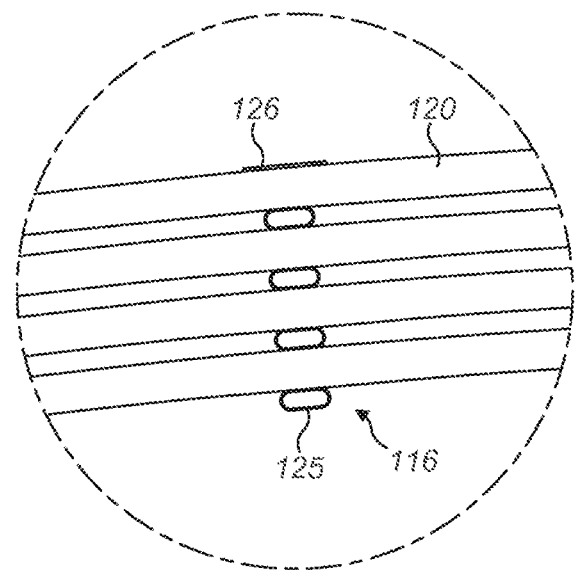
FIG. 7A is a detail view of detail A in FIG. 7E.
Figure 7B:
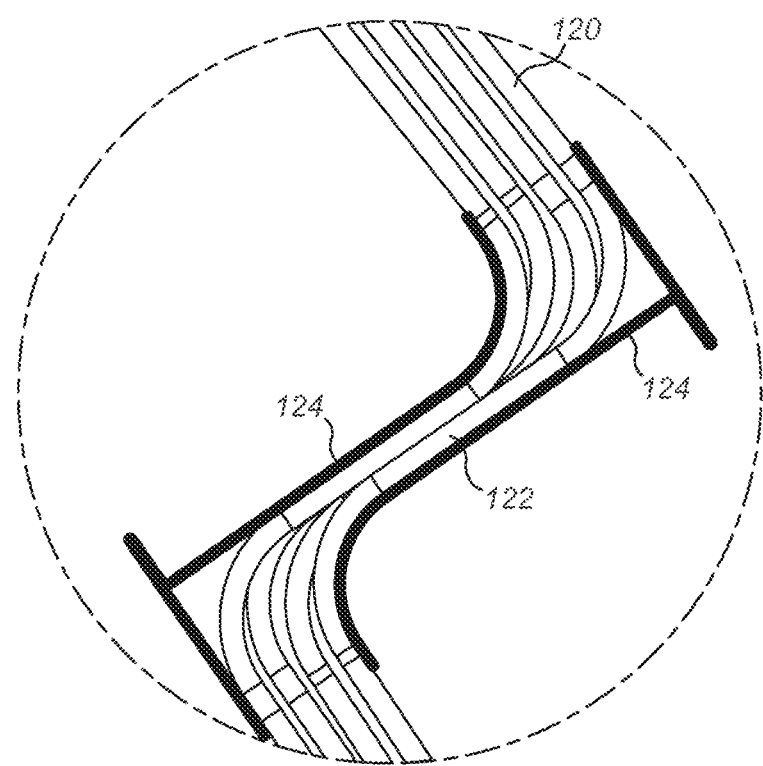
FIG. 7B is a detail view on detail B in FIG. 7E.
Figure 7C:
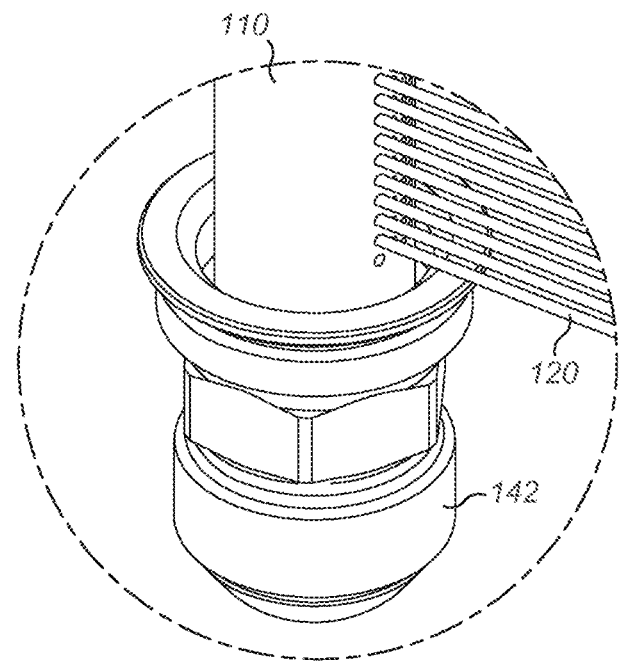
FIG. 7C is a detail view on detail C in FIG. 7F.
Figure 8C:
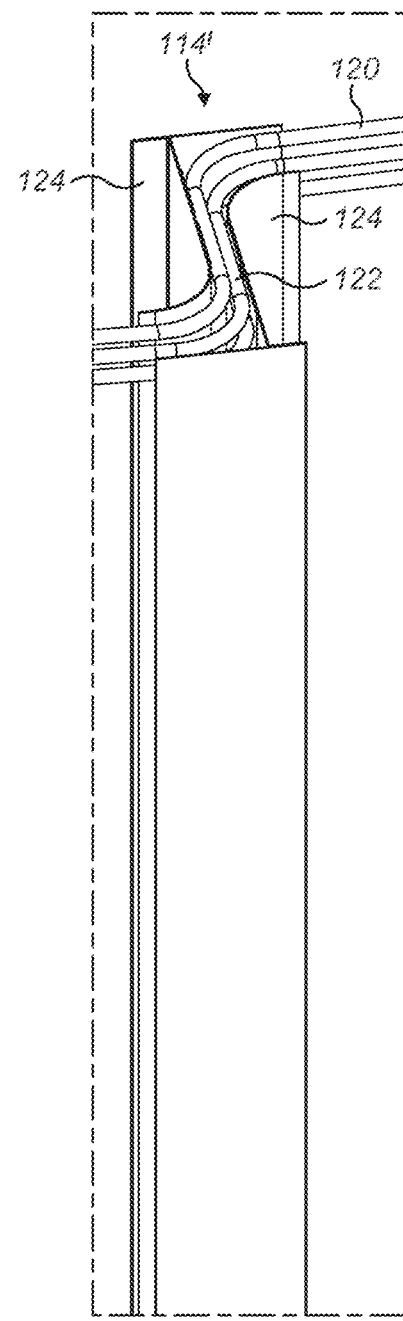
FIG. 8C is a detail view isometric on detail F in FIG. 8A.

FIG. 8C shows how the tubes 120 pass the doglegs 112', 114' with short radial portions 122 and J-shaped foils or joggles 124 located either side of the doglegs 112', 114' to direct flow away from the radial portions 122. This is also shown in FIG. 7B. As can be seen in FIG. 7A, at the baffle stations 116, race track section baffle elements 125 are brazed to the inner side of each of the four rows of helium tubes 120 in any given spiral section 108 and a flat shim plate 126 is based to the outer side of the radially outer tubes 120 in the four rows. The baffle elements 125 are made by flattening tube the same as the helium tubes 120. The baffle elements and shim plates 126 extend axially the full length of all of the 200 rows of tubes 120 in the axial direction. As shown in FIG. 11B, the baffle stations 116 of the 21 spiral sections 108 are substantially aligned with one another wherever there is a longeron member 90 so as to be orthogonal to the matrix tubes 120, although offset slightly angularly from the true radial direction R (see FIG. 11B) from the central axis 128 of the heat exchanger 52 (see FIG. 11A). Therefore, the shoe 116' on the longeron member 90 engages the bottom baffle element 125 of a first spiral section 108 and radial force can be transmitted through the baffle station 116 to the shim plate 126 which engages the bottom of another radially inner baffle element of the next inter-nested spiral section. After the 11$^{th}$ spiral section 108, a radially extending I-beam 130 may transmit the substantially radial load to the next spiral section 108. After a further seven sets of baffle elements 125 and shims 126 of a further seven spiral sections 108, there is a further substantially radially extending I-beam 130 for transmitting radial load and there are then a further three sections 108 that are passed in the radial direction until the spiral sections 108, all twenty-one of them, have been fully counted. This configuration is illustrative only and may differ in other embodiments.

When the heat exchanger is operational, there is a substantial inward flow radially of air past all of the tubes 120 placing a substantial radially inward aerodynamic load on them. This load is countered by the substantially aligned shim plates 126, baffle elements 125, I-beams 130 and longeron members 90 which are aligned substantially in the radial direction. Accordingly, despite the very substantial aerodynamic loads, the tubes 120 may be securely supported.

In some cases, particularly at high Mach numbers, the air inlet temperature to the heat exchanger 52 at the radially outermost side in particular may be substantial, for example over 800 or even 1000° C. The temperature variation may cause a significant thermal change to the tubes 120 which, in particular, may grow in length with increasing temperature. Therefore, although the inlet header tube 106 is fixed in position to the perforated support drum 84, the outlet headers 110 may move as the tubes 120 grow in length. The shim plates 126 of each spiral section 108 may therefore slide relative to the adjacent baffle elements 125 to enable sliding substantially circumferential motion of the spiral sections 108 relative to one another. With lengthening of the tubes 120 due to increased temperature, the line of thrust of the baffle stations 116 through the baffle elements 125, shim plates 126 and I-beams 130 may rotate to be more in line with the truly radial direction of R from the centre axis 152 of the exchanger 52. The line of the baffle elements 125 is maintained substantially orthogonal to the tubes 120. Therefore, thermal expansion and contraction of the tubes in the circumferential (lengthwise) section of the tubes 120 may be allowed for. Naturally, the tubes 120 and other components may expand in the radial direction as they expand and contract with temperature and allowance for this is also provided.

Figure 4A:
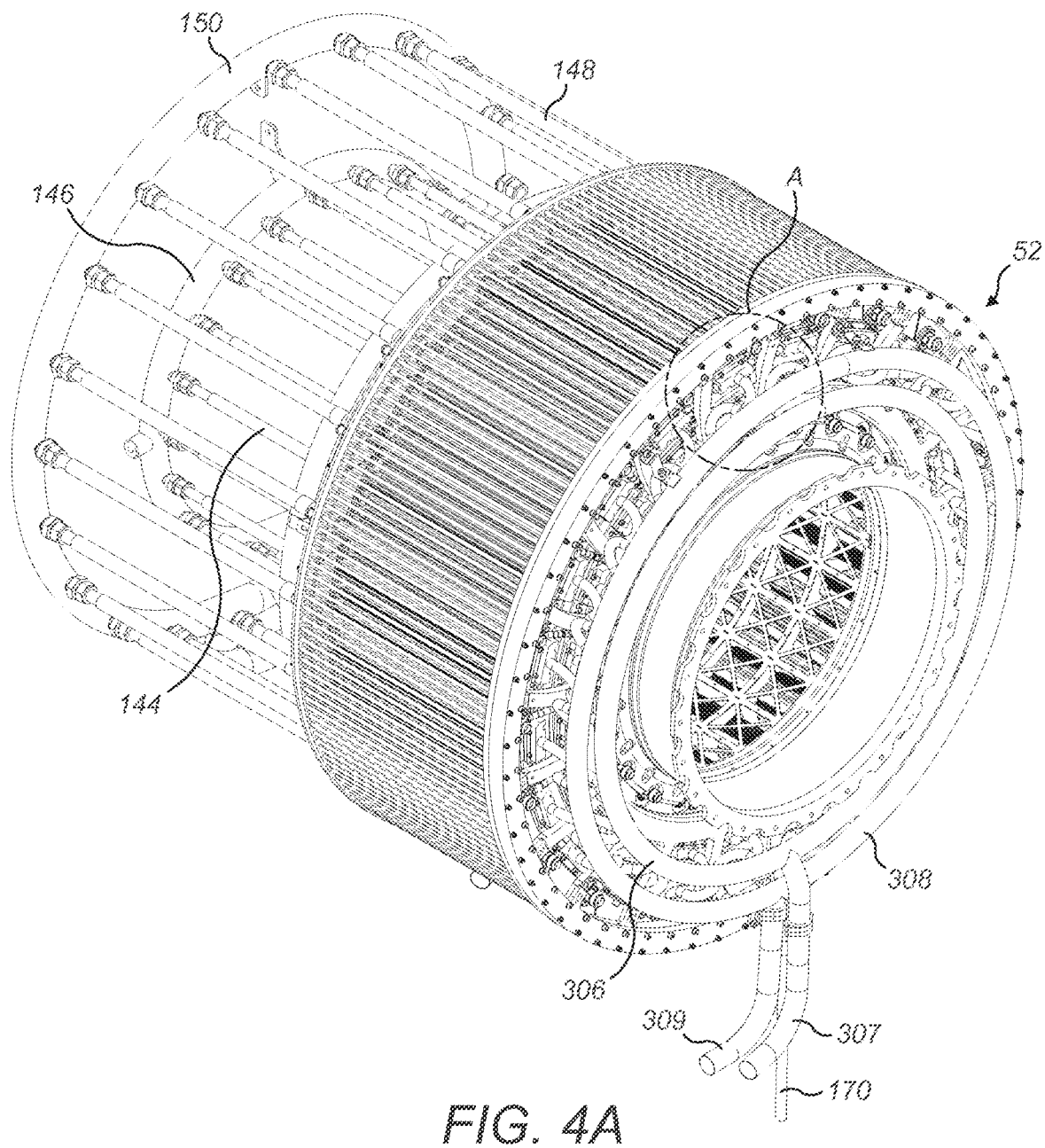
FIG. 4A is an isometric view of a preferred embodiment of a heat exchanger in accordance with the invention as used as a modified heat exchanger in a modification of the engine of FIG. 2 with a cycle as illustrated in FIG. 3.
Figure 5A:
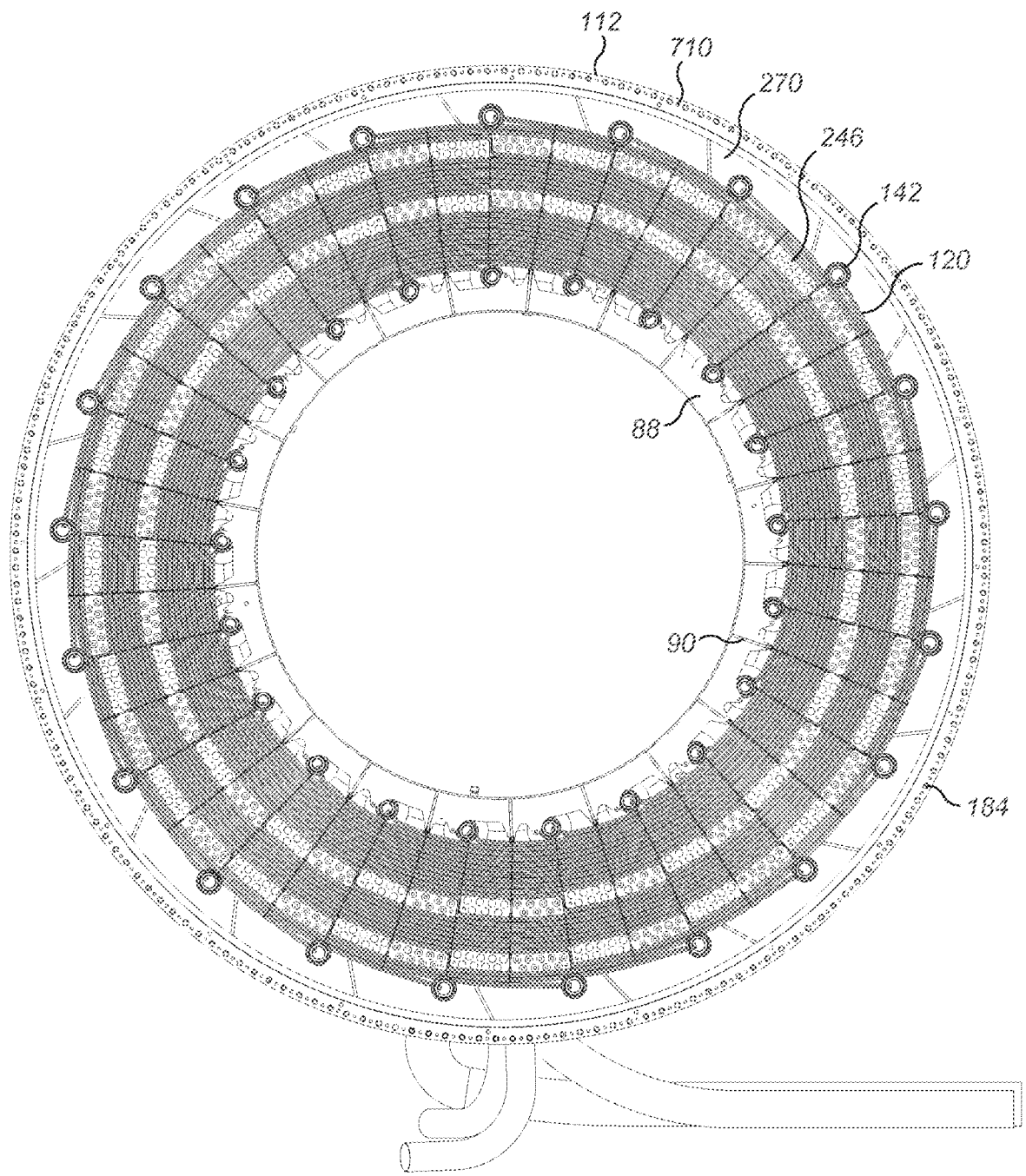
FIG. 5A is a section on Y-Y in FIG. 5B of the heat exchanger.
Figure 5B:
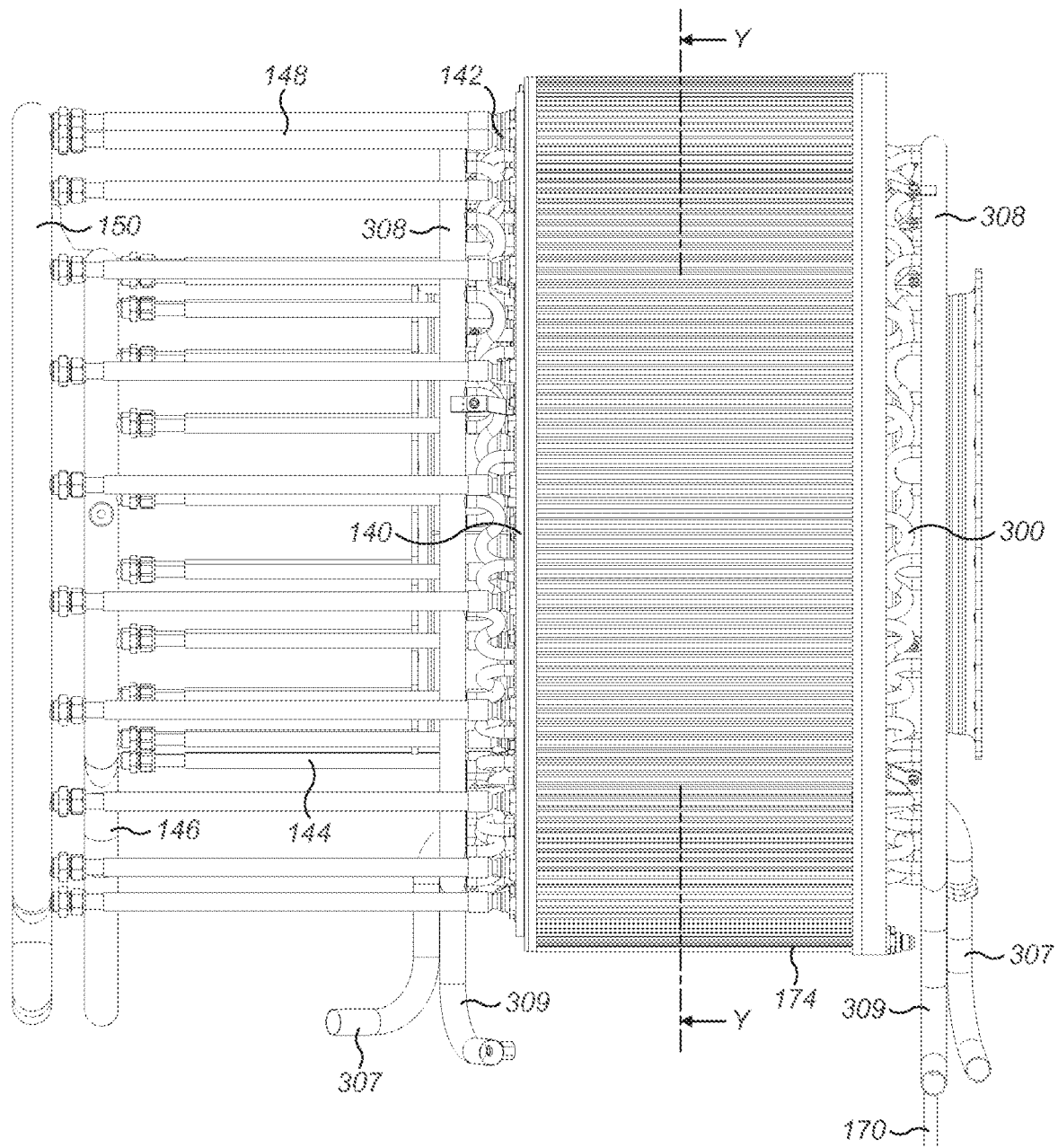
FIG. 5B is a side elevation of the heat exchanger viewed in a radially inward direction.
Figure 7D:
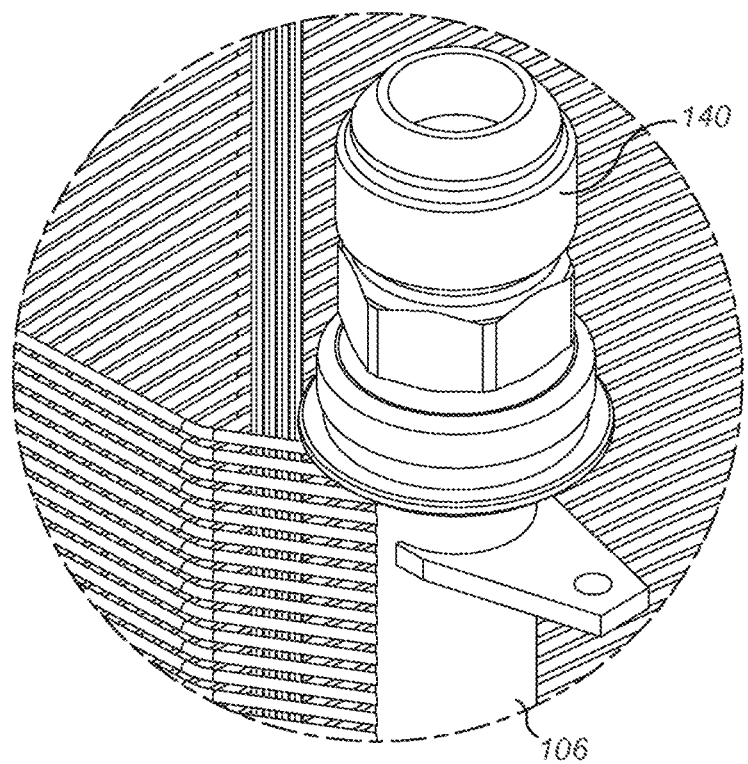
FIG. 7D is a detail view on detail D in FIG. 7F.
Figure 7E:
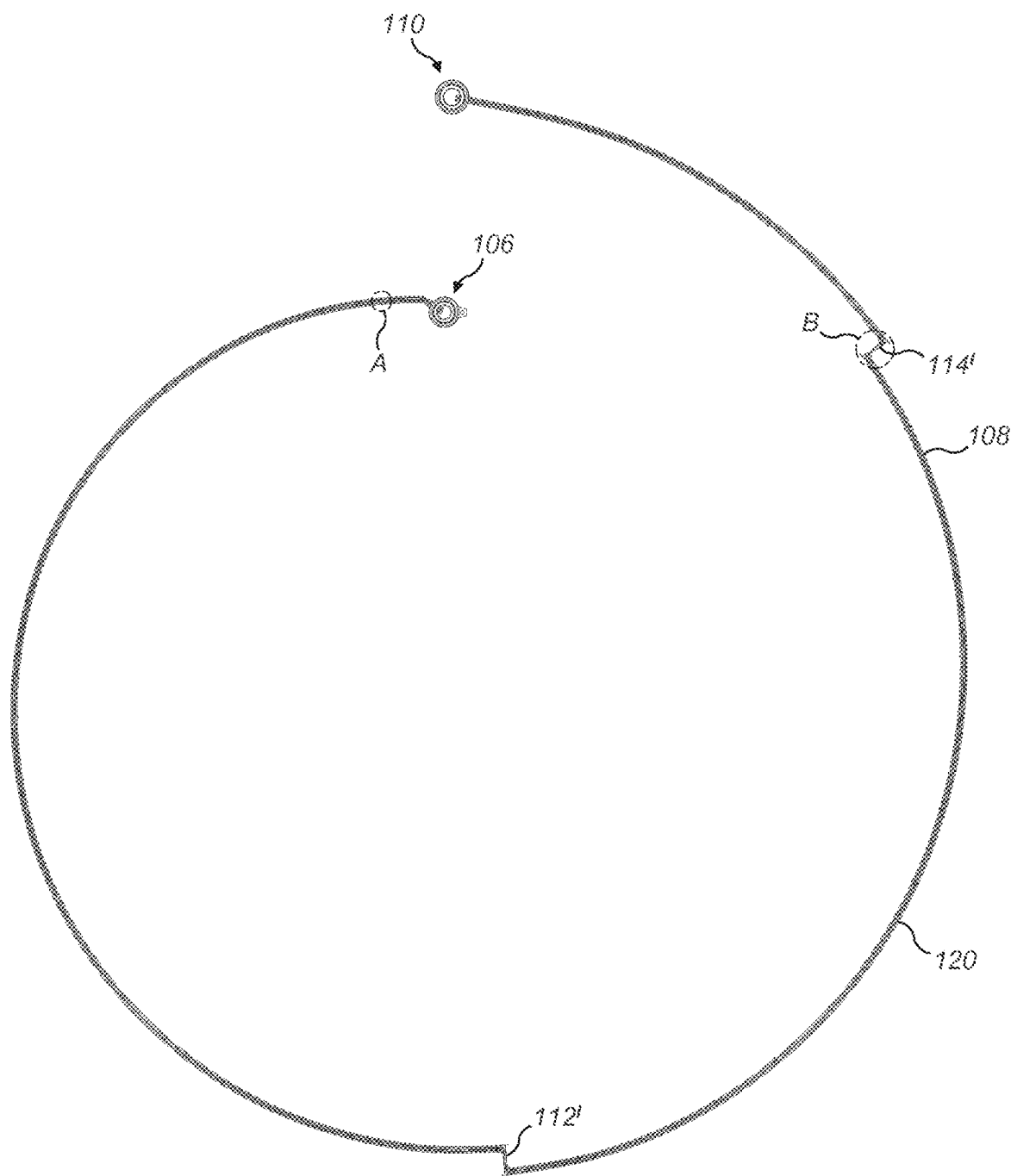
FIG. 7E is a schematic section through the spiral section of the heat exchanger shown in FIG. 7F as though looking up from below in FIG. 7F.
Figure 7F:
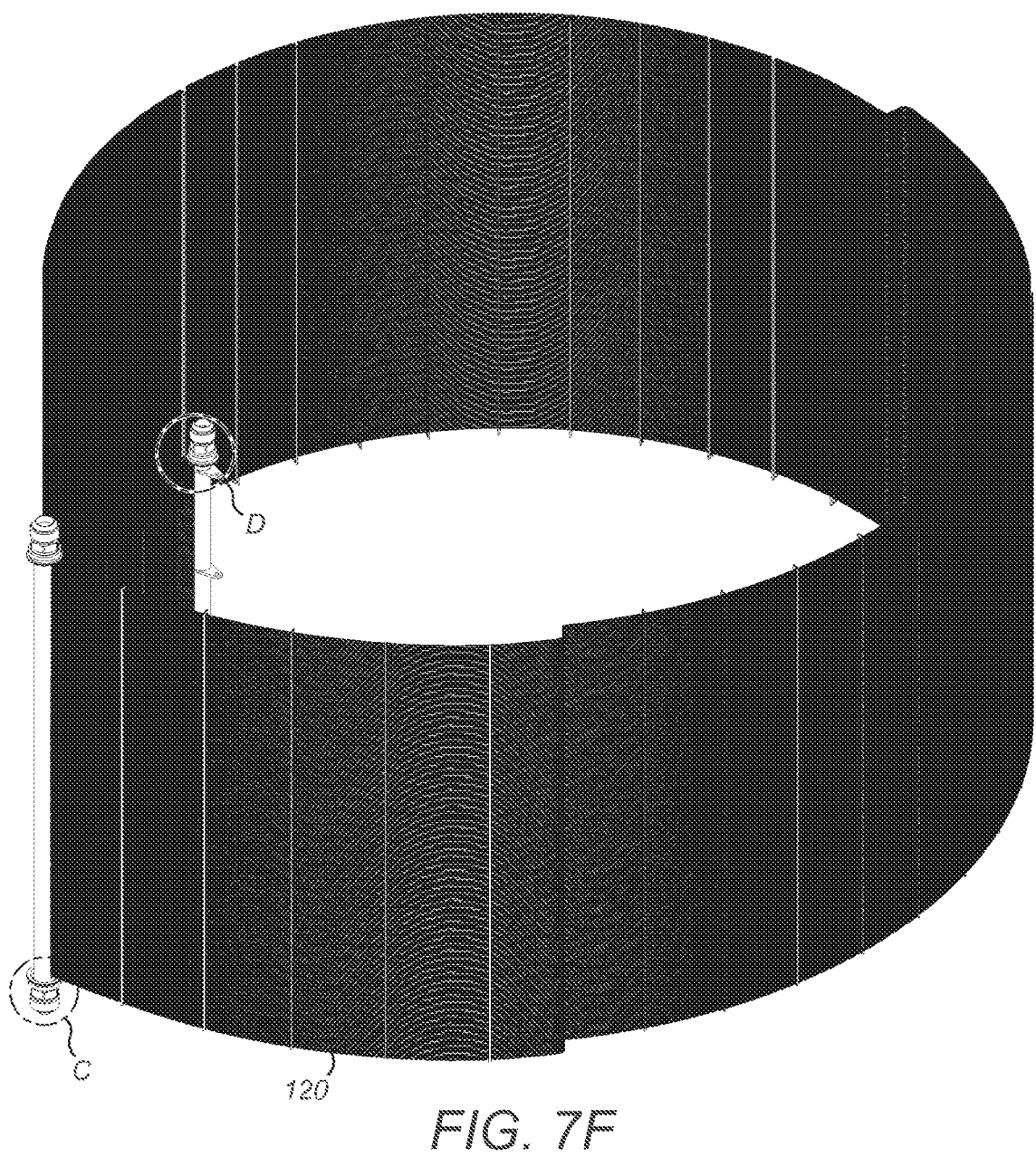
FIG. 7F is an isometric view of a spiral section of heat exchanger tubes of the heat exchanger.

As can be seen in FIG. 7D, each inlet header tube 106 is fitted with inlet header fittings 140 at either end thereof and the outlet header tubes 110 are fitted with outlet header fittings 142 at the respective two ends thereof. As shown in FIGS. 4A and 5B, the inlet header fittings 140 at one end of the inlet headers 106 are fluidly connected by flexible hoses 144 to the inlet manifold 146 for the helium flow, and outlet header fittings 142 at the same end thereof are fluidly connected by flexible hoses 148 to helium outlet ring manifold 150 for the helium.

The inlet header fittings 140 at the other end of the header tubes 106 may be blocked off or may be fluidly connected via a ring manifold to the adjacent header fitting 140. The same is so for the outlet header fittings 142 at the other end of the outlet header tubes 110.

Figure 11A:
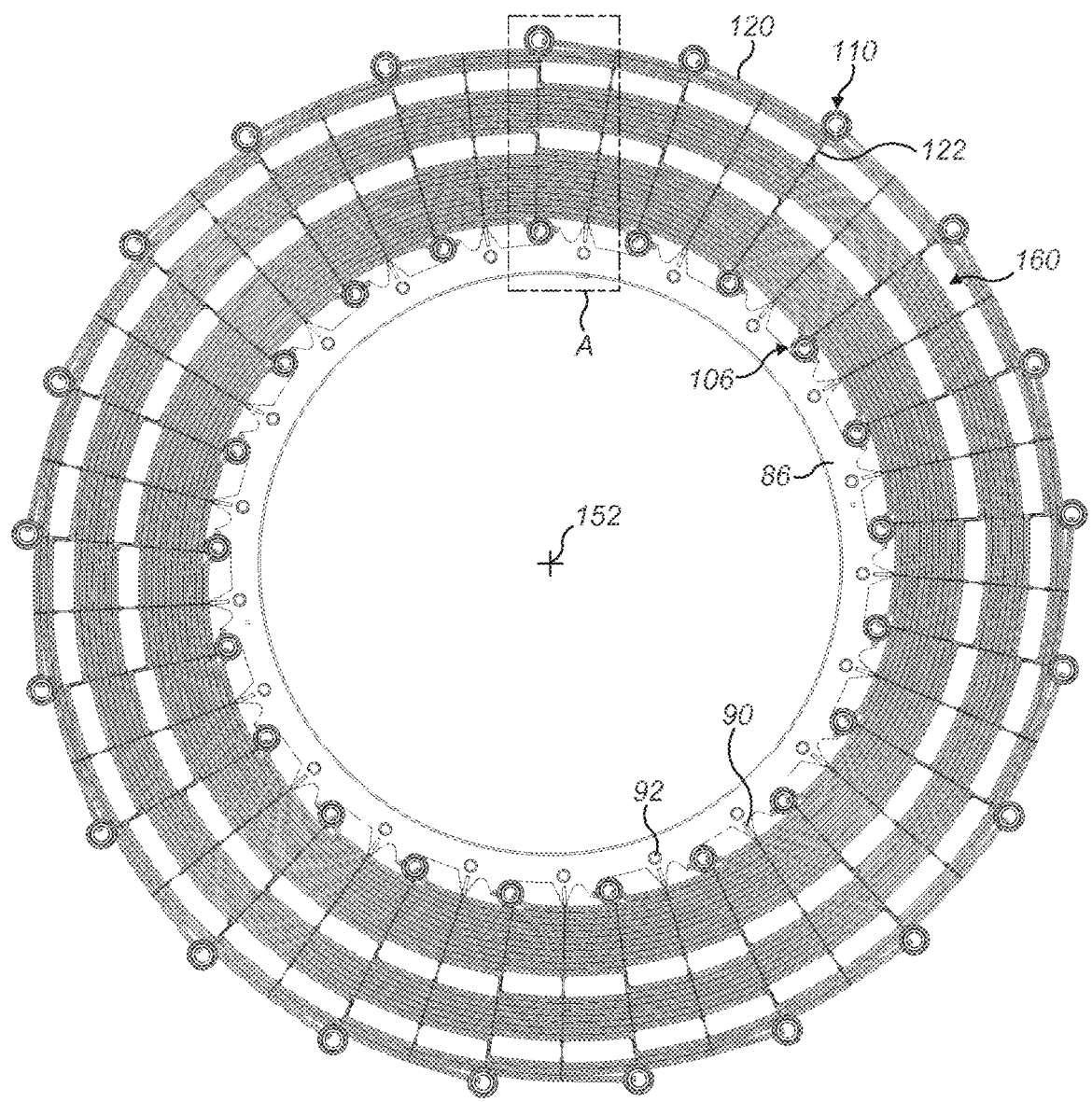
FIG. 11A is an end view of the support of FIG. 6 with all 21 spiral sections fitted but with the capture elements and a methanol injection ring omitted for the purposes of clarity.
Figure 11B:
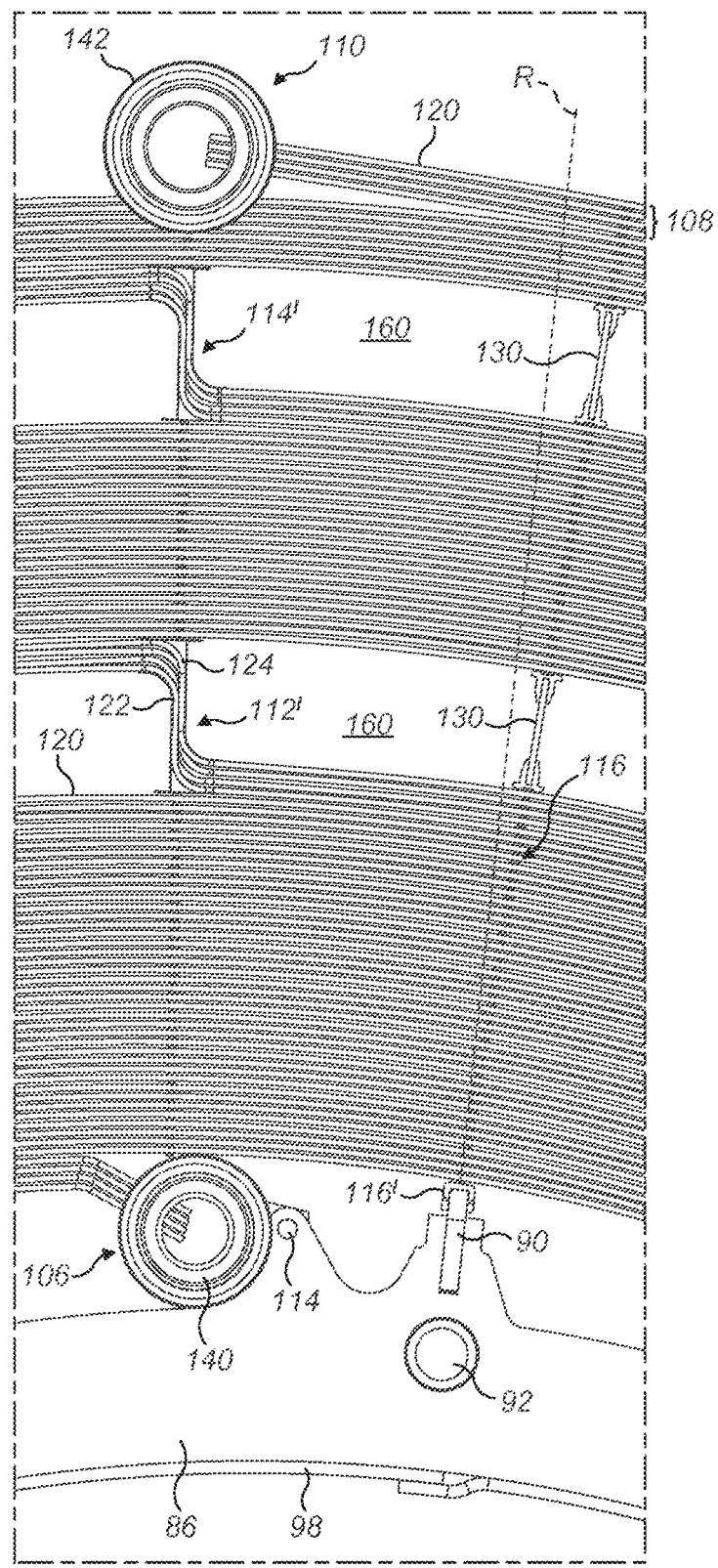
FIG. 11B shows an elevational detail view on detail A in FIG. 11A.

As can be seen for example in FIGS. 11A and 11B, generally rectangular (but arcuate) pockets (or box sections) 160 are created extending axially all of the way along the heat exchanger 52 between the tubes 120 of adjacent spiral sections 108 in the regions of I-beams 130 and the respective doglegs 112', 114'. These generally rectangular but arcuate pockets 160 contain capture elements 162 of a frost control system of the heat exchanger 52 which will now be described.

Figure 12A:
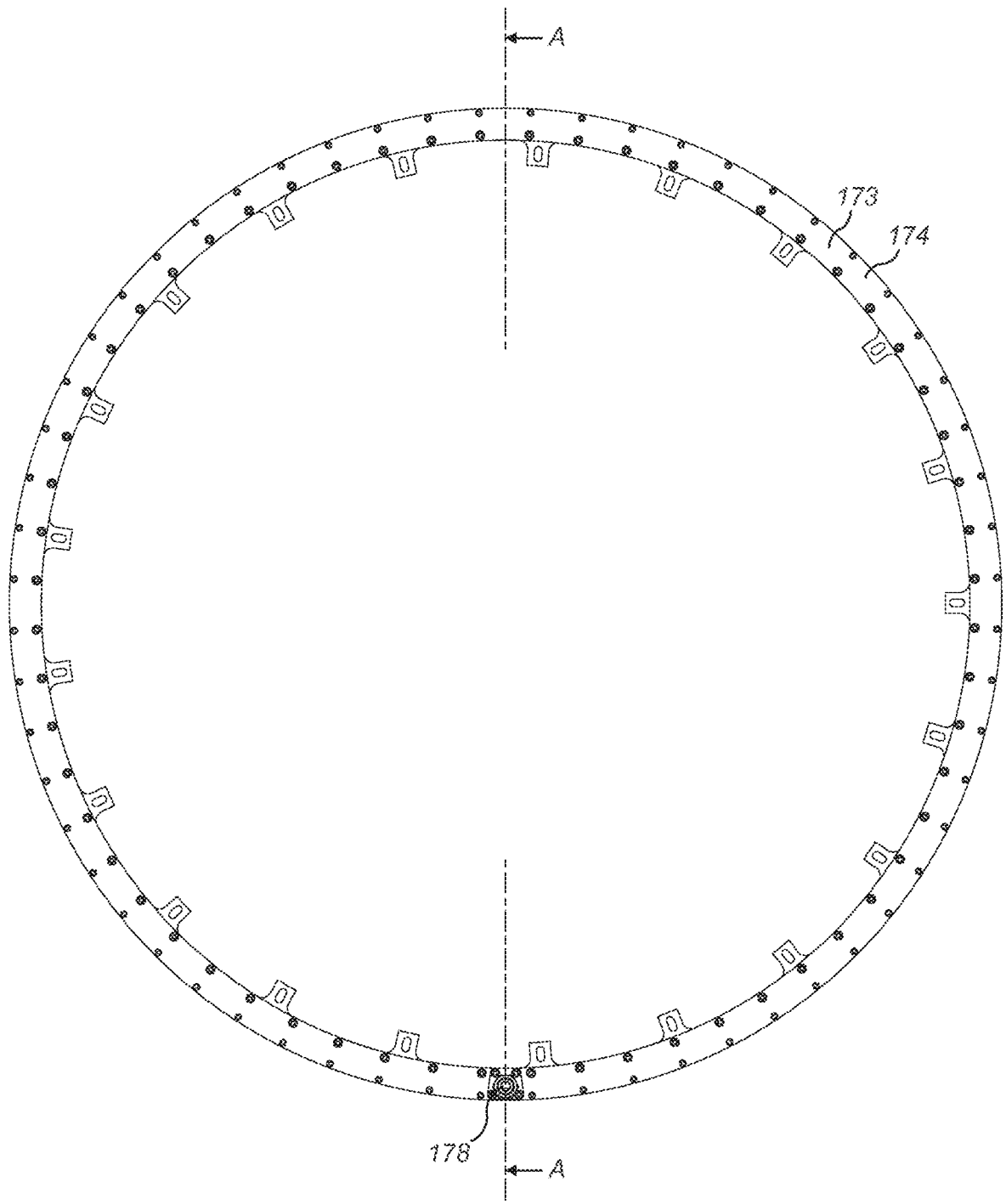
FIG. 12A shows a front elevational view of the methanol injector assembly of the heat exchanger.
Figure 12B:
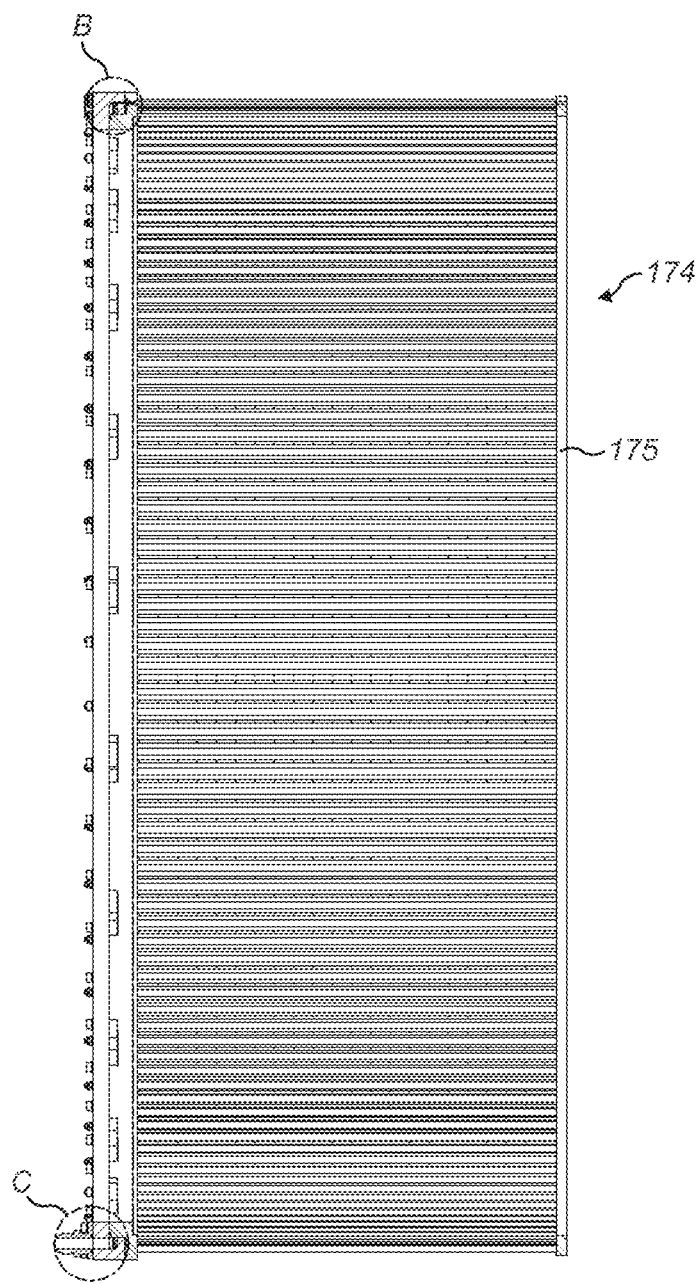
FIG. 12B shows a section on the plane A-A in FIG. 12A.
Figure 12C:
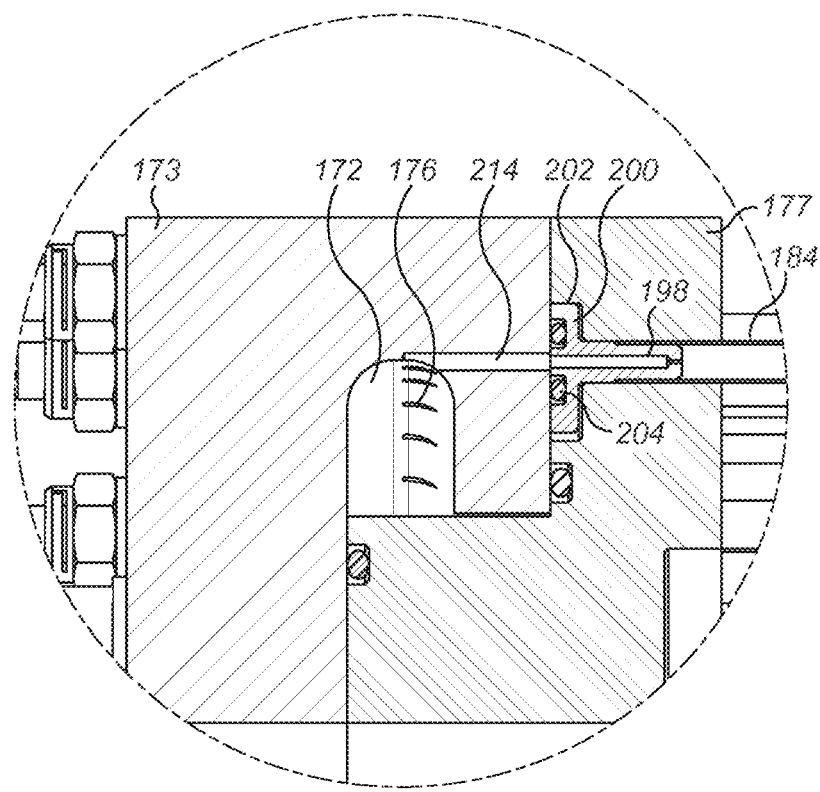
FIG. 12C is a detail view on detail B in FIG. 12B.
Figure 12D:
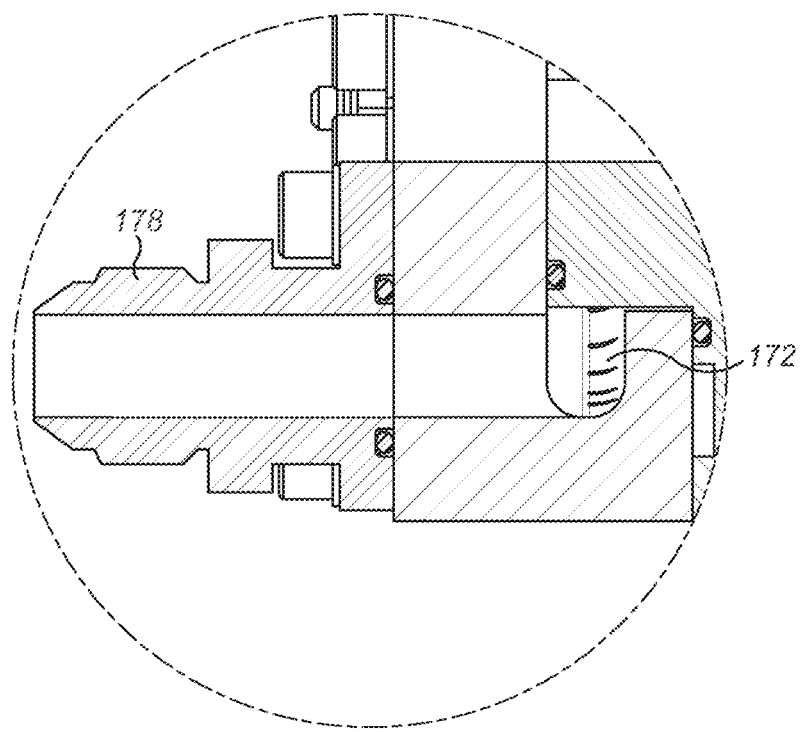
FIG. 12D is a detail view on detail C in FIG. 12B.
Figure 12E:
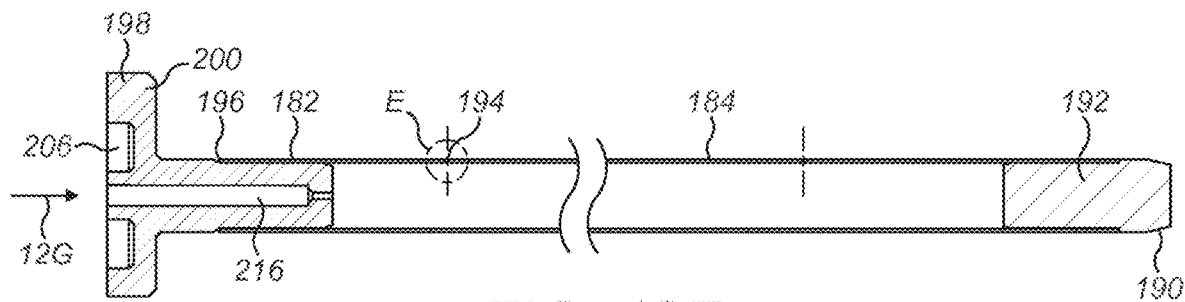
FIG. 12E is a partly shortened cross-sectional view on the plane D-D in FIG. 12G showing one of the injector tube assemblies of the injector assembly.
Figure 12F:
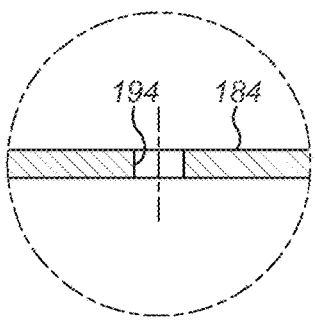
FIG. 12F is a detail view on detail E of FIG. 12E.
Figure 12G:
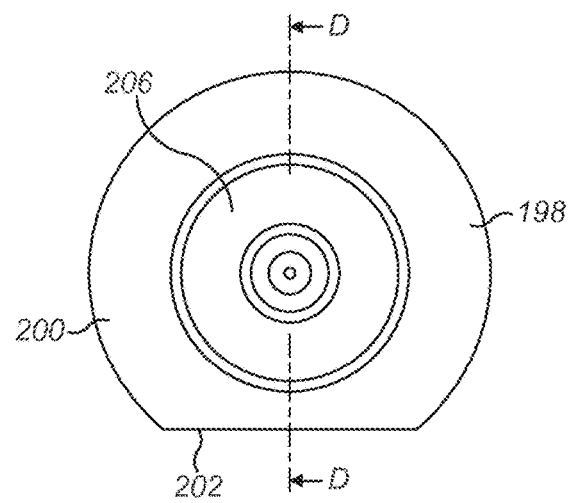
FIG. 12G is an elevational view along the direction 12G in FIG. 12E of the injector tube assembly.
Figure 12H:
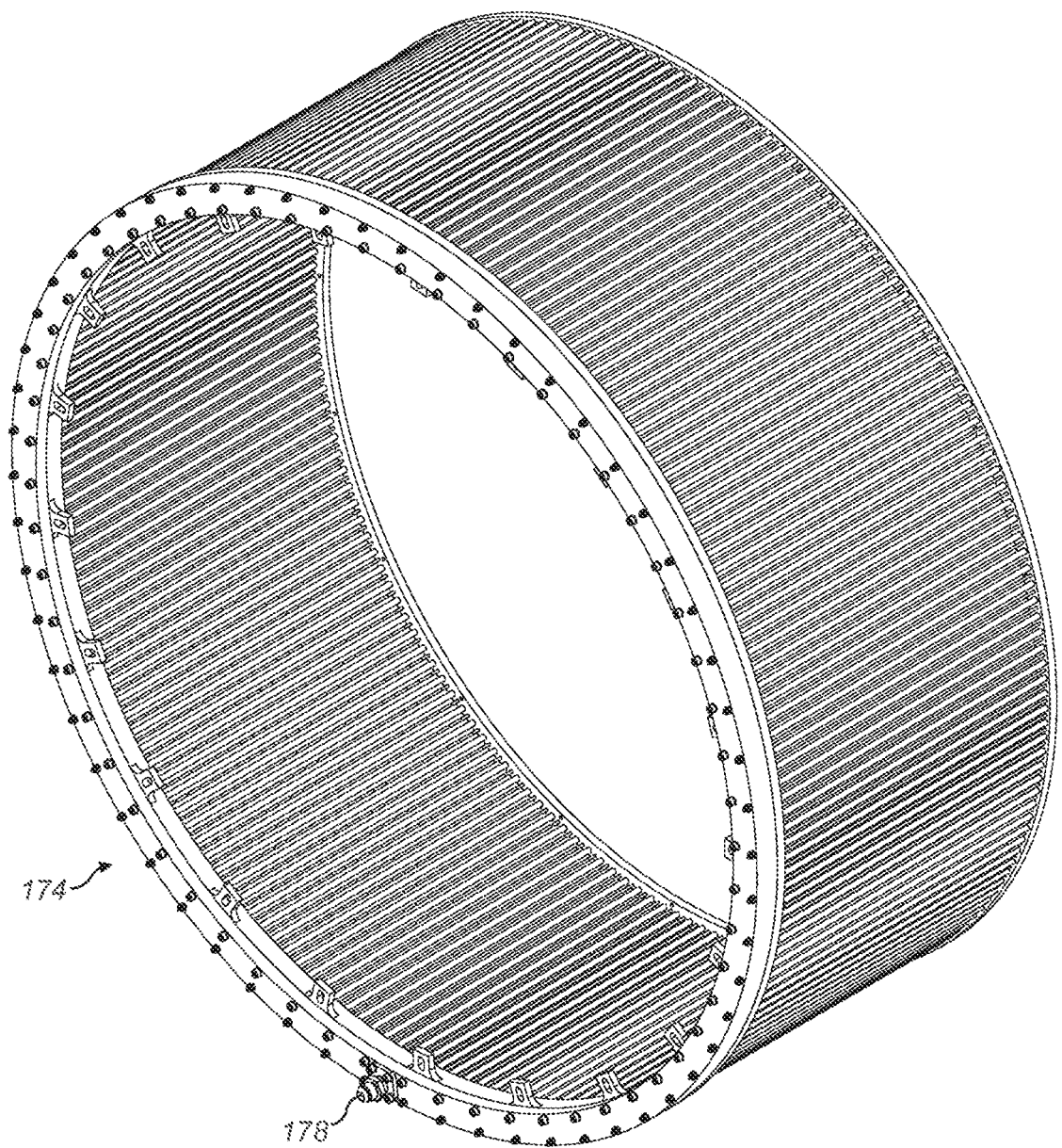
FIG. 12H is an isometric view of the injector assembly of FIG. 12A.

As shown in FIGS. 4A and 12A, a methanol supply tube 170 feeds methanol to an annular gallery 172 of a methanol injection ring 174. The parts 176 in the gallery 172 are sections through tubes 214 where these enter the gallery 172. The methanol injection ring has a series of 180 injector tubes assemblies 182 (FIG. 12E) (this arrangement could differ in other embodiments) located in a series spaced circumferentially around the heat exchanger 52, each injector tube assembly 182 including an injector tube 184 extending axially between annular manifold 173 forming the annular gallery 172 and a further support ring 175 onto which tapered ends 190 of end plugs 192 are fixed. Each of the injector tubes 184 includes a series of 22 injection holes 194 (one of which is shown in FIG. 12F) spaced therealong in a series along the tube 184, the diameter of each of the holes 194 being 0.2 mm. The end 196 of each tube opposite the tapered end 190 is secured to an injector fitting 198 having a non-circular flange 200 with a flat 202 for rotationally aligning the tube 184 by matching of the flat 202 with a corresponding formation in a support ring 177 attached to the ring 173. A circular seal 204 is provided for sealing in an annular recess 206 of the fitting 198.

When a methanol pump 210 (FIG. 3) is operated to pump methanol along a conduit 212 which is connected to the methanol supply tube 170, the methanol is forced through the gallery 172 and through supply channels 214 of the ring 173 and interior channels 216 of the fittings 198 to pump methanol into the interior of the tubes 184 and then out through the injection holes 194. Accordingly, methanol is injected into airflow just about to enter into the volume defined by the spiral sections 108 of the tubes 120.

The methanol is able to prevent the formation of ice in the heat exchanger 52 which would block the airflow through the same. The methanol lowers the freezing temperature of water droplets condensed out within the heat exchanger to do this and a substantial proportion of the methanol and water are together removed from the airflow by catcher elements as will now be described.

Figure 13A:
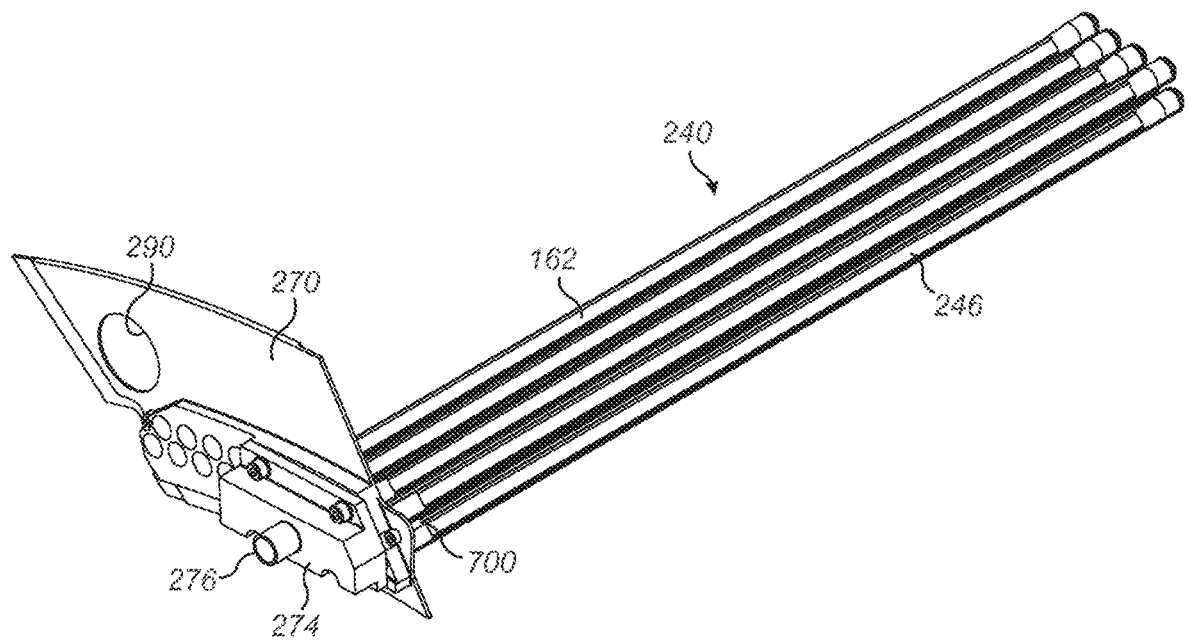
FIG. 13A is an isometric view of part of an outer capture assembly for removing liquid from the heat exchanger in the frost control system.
Figure 13B:
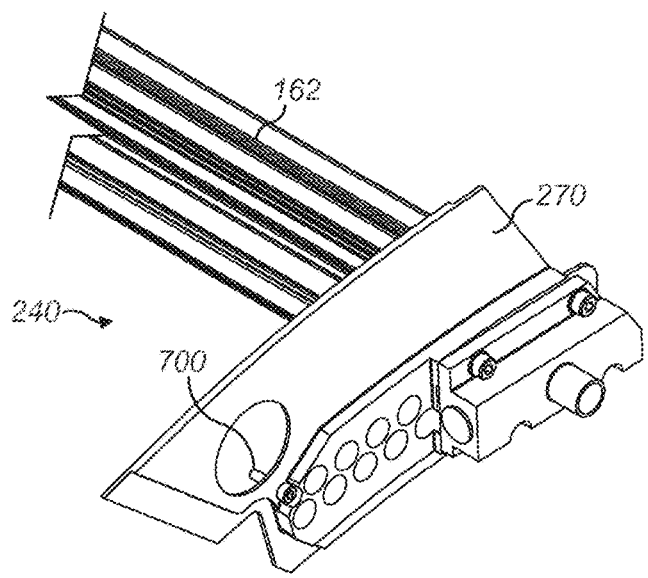
FIG. 13B is a view in isometric of part of the components shown in FIG. 13A.
Figure 13C:
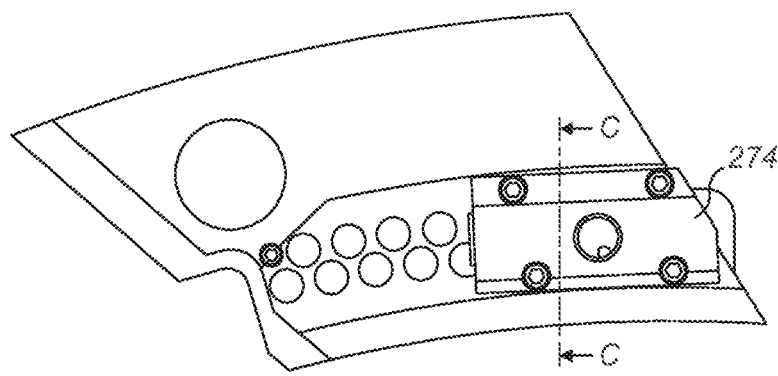
FIG. 13C is an end view of the components shown in FIG. 13A.

Each outer one of the two pockets 160 shown in FIG. 11B has nine mutually spaced catcher elements located therein and each inner one of the pockets 160 has seven catcher elements 162 located therein. With reference to FIGS. 13A to 14D of the drawings, the catcher elements 162 will now be described. These Figures show one outer catcher assembly 240 having nine catcher elements. The inner catcher assemblies are similar apart from the number of catcher elements (since they only have seven). As shown in FIGS. 13A and 13H, each catcher assembly 240 has an outer row 242 of four catcher elements 162 and an inner row 244 of five catcher elements 162. Again, the numbers of catcher elements and the numbers of doglegs and rows (radially) of pockets may differ in other embodiments. Each catcher element 162 comprises a hydro-formed tube 246 with a varying cross-section along the length thereof as shown in FIGS. 14A to 14D. In particular, the tube 246 is circular in section at respective ends 248, 250 thereof and has eight pocket depressions 252 formed therein between peaks 254 where the cross-section of the tube 246 is as shown in FIG. 14C, the cross-section a mid-point 256 between the peaks 254 being as shown in FIG. 14D in which there are two outwardly concave portions 258. As shown in FIG. 13I, the tubes 246 are covered with a stainless steel 50 micron filter mesh 258 (other meshes may be used in other embodiments) which is coated with a wetting agent such as silica. Each mesh 258 is generally cylindrical (it may vary in other embodiments) and forms a pair of cavities 260, 262 at each of the pocket depressions 252, such that there are sixteen cavities 260, 262 in total per catcher tube 246. Scavenge holes 264 are positioned through the wall of the tube 246 in each cavity 260, 262—this number may differ in other embodiments. The catcher assembly 240 includes a control plate 270 and one end 248 of each catcher tube 246 is fitted to a non-rotational fitting 272 such that all nine catcher element tubes 246 communicate with the interior of a catcher suction manifold assembly 274 having a suction port 276 leading, via piping 278 (FIG. 3), to suction source 280. The catcher elements 162 are capable of operating upside down and also when used in any axially or otherwise accelerating flying vehicle.

Figure 13D:
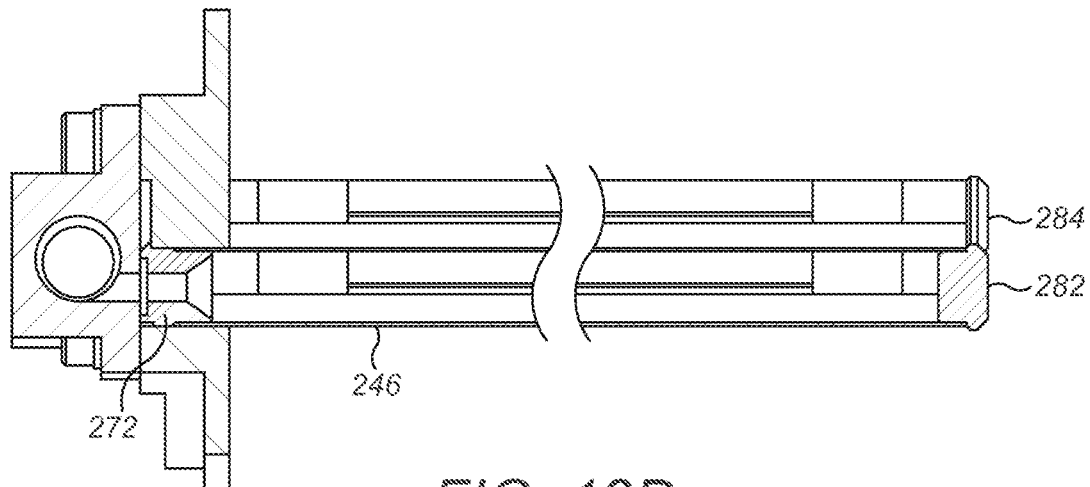
FIG. 13D is a section on the plane C-C in FIG. 13C.
Figure 13E:
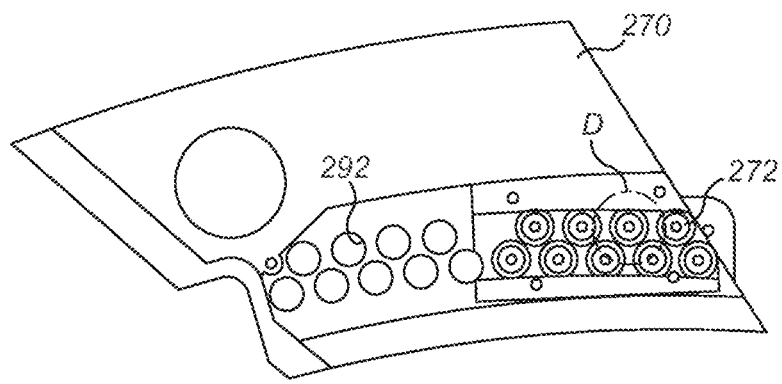
FIG. 13E is a view similar to FIG. 13C but with a capture manifold plate of the capture assemble removed.
Figure 13F:
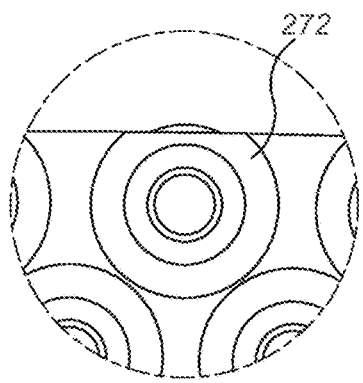
FIG. 13F is a detail view on detail D in FIG. 13E.
Figure 13G:
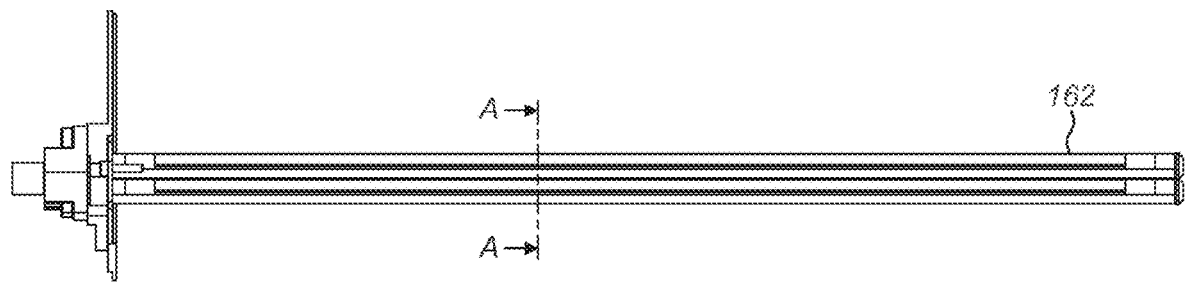
FIG. 13G is an elevational view in a circumferential direction (around the drum center axis of the heat exchanger) of the parts shown in FIG. 13A.
Figure 13H:
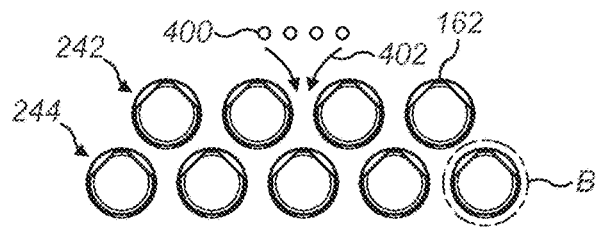
FIG. 13H is a section on the plane A-A in FIG. 13G.
Figure 13I:
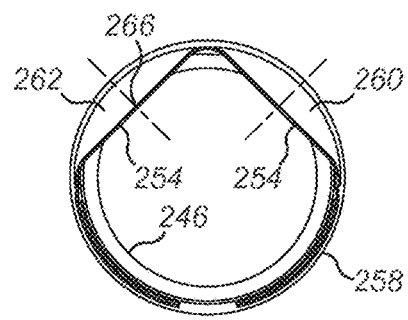
FIG. 13I is a detail view on the detail B in FIG. 13H.

As shown in FIGS. 13A and 13D, the distal ends 282 of the catcher elements 246 are securely closed by end plugs 284.

It will be seen that the catcher control plates 270 includes circular apertures 290 therethrough. The outlet header tubes 110 of the heat exchanger 52 pass through these apertures 290. It will also be seen that the catcher plate 270 includes nine extra apertures 292. The reason for this is that the adjacent catcher assembly 240 spaced one circumferentially around the heat exchanger 52 is arranged with the manifold 272 and end plugs 284 at opposite ends. Therefore, the apertures 292 serve to engage around the circular ends 250 of the catcher elements 162 of the adjacent catcher assembly 240 so that all of the catcher tubes 246 are supported at both ends. With a vacuum applied at the suction port 276, there is suction at the scavenge holes 266. With methanol and water in liquid form in the region of the catcher element 162, when the liquid touches the silica coated mesh 258, it becomes wetted onto the mesh 258 and is sucked through the mesh (the cavities 262 operating at a low pressure due to the small mesh pores), into the cavities 262, 260/pockets 252, then through the scavenge holes 266 and along inside the catcher tubes 246 to the respective manifold 274 and suction port 276. The scavenge holes 266 control the air flow sucked through with the liquid to a low level. In this way, a substantial proportion of the water vapour in the incoming air may be removed from the flow such that the heat exchanger 52 does not block with ice. Whereas the mesh 258 is shown with a circular section for the purposes of clarity in FIG. 13I, as shown in FIG. 14F, the mesh in fact stretches out to a flatter configuration over the cavities 262/260/pockets 252. As shown in FIG. 14E the peaks (or lands) 254 are configured generally flat. The lands 254 engage the mesh 258 so as to separate the pockets from one another. Thus, if one pocket should lose its integrity, for example if debris is ingested into the heat exchanger, the other pockets 252 will remain operational.

Figure 4B:
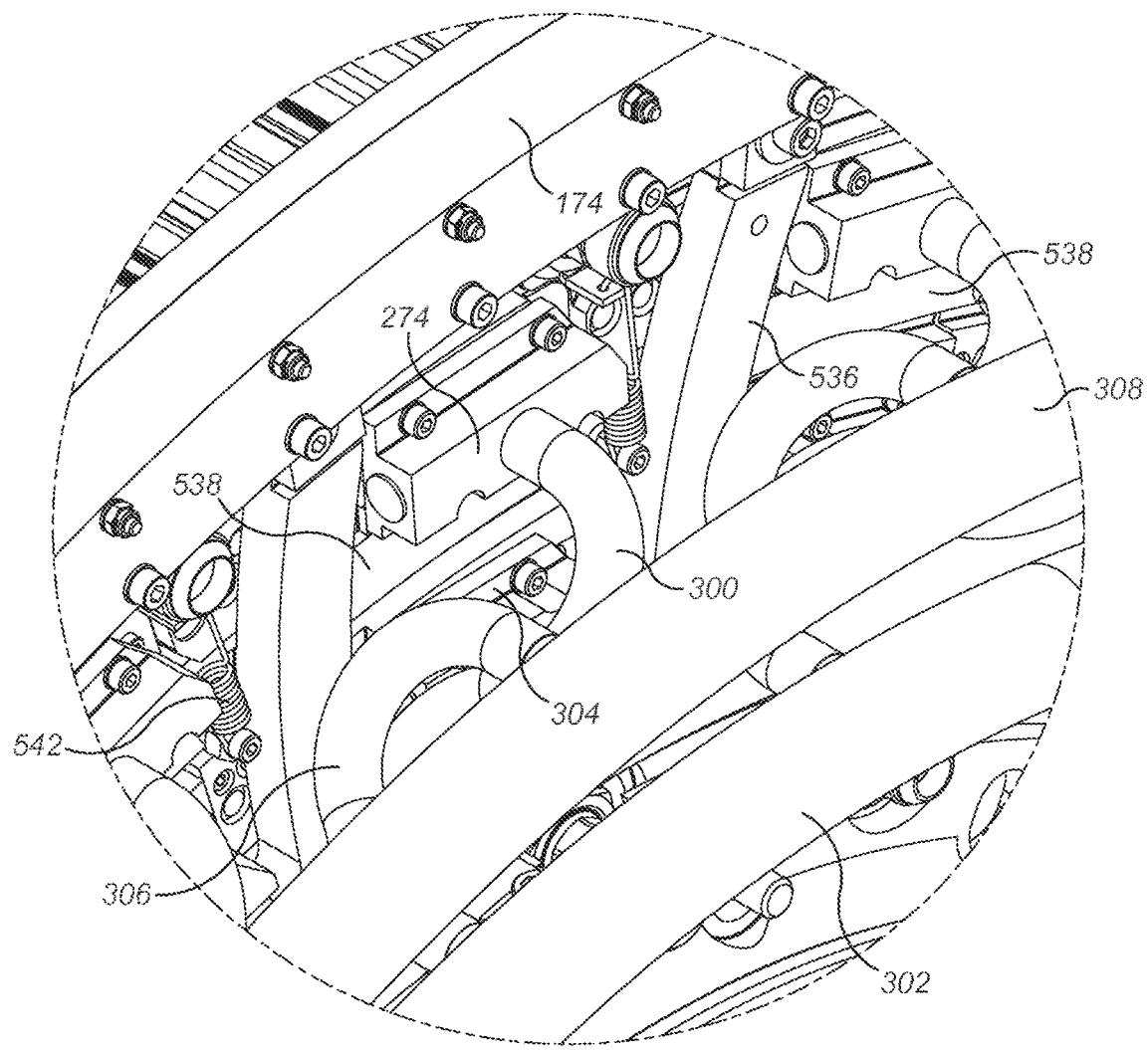
FIG. 4B is a detail view on area A of FIG. 4A.

As shown in FIG. 4B, the outer catcher suction manifold assemblies 274 are connected by flexible S-shaped vacuum tubes 300—the S-shape allows for manufacturing differences and for thermal expansion but need not be employed in other embodiments—to annular frost control catcher ring manifold 302 and the inner catcher element manifold plates 304 (corresponding to the manifold plates 274 but for only seven catcher elements) are connected by similar S-shaped flexible hoses 306 to frost control catcher ring manifold 308. The ring 308 leads to a vacuum outlet conduit 309 and ring 306 to a vacuum outlet conduit 307 both leading via the piping 278 to vacuum source 280.

Since there are similar vacuum manifold plates 272, 304 at the opposite axial end of the heat exchanger, a similar arrangement of S-shaped flexible hoses 300, 306 and frost control catcher ring manifolds is also provided at that end, as shown in FIG. 5B with similar reference numerals denoting similar features.

It will be noted from FIG. 13H that the spacing between the catcher elements 162 along the length of each of the rows 242, 244 is approximately one third of the diameter of the catcher elements 162. It will also be noted that the distance between the catcher elements 162 in the row 242 and the catcher elements in the row 244 is approximately the same or slightly less. When liquid droplets 400 approach the outer row 242 they may travel and turn approximately as shown by arrows 402. Droplets flow through the matrix of tubes 120 and whilst growing on the tubes are focused laterally by the airflow accelerating into the gaps between the catcher elements 162 of the outer row 242. Therefore, the droplets 400 tend to be diverted by the catcher elements 162 in the first row 242 to be travelling almost straight towards the catcher elements 162 in the next row 244. In practice, this means that the catcher elements 162 in the row 242 may act as bluff bodies and about 5% of the water extracted by the catcher assembly 240 may be extracted in the front row 242 (in the sense of airflow direction) and 95% in the next row 244. In other embodiments, the front row catcher elements 162 of the row 242 may be replaced with solid bodies with no mesh or suction function.

With the heat exchanger 52 in operation, the temperature at the inner catcher elements and/or outer ones may be monitored by a temperature sensor 350 which may send data to a controller 352 (FIG. 3) which may control a valve such as the valve 354 with a diverter part 356 for altering the helium flow through the heat exchanger 52. In this way or in a similar way, the temperature at the catcher elements 162 may be controlled. The water and methanol removed from the airflow may be added back into the airflow approaching the rocket nozzle 40 and may in some embodiments add 2% to thrust. The loss of the methanol's weight from the vehicle may be desirable also in order to enable a higher vehicle velocity to be achieved in response to engine thrust later on during flight. The frost control system described herein can typically remove 99% of the water content from air. The control provided by the controller 352 just described may be such that on a water-methanol solid-liquid phase diagram the environment in the vicinity of the coldest catcher elements 162 is in the region of about 65 mole % or about 82 wt. % methanol as the temperature approaches about −100° C. Even though the heat exchanger could cool the air down to its liquification point if necessary near the air outlet from the heat exchanger, the frost control system is set up so that the great majority of the water is removed with methanol at a higher temperature further back in the heat exchanger. At very low temperatures down below about −50° C. and all of the way down to near −140° C. any remaining methanol/water liquid content will, if it solidifies, turn directly to mass ice rather than the feathery frost that can be formed at higher temperatures, by direct sublimation from the vapour, and so causes less of a blocking issue.

Figure 15:
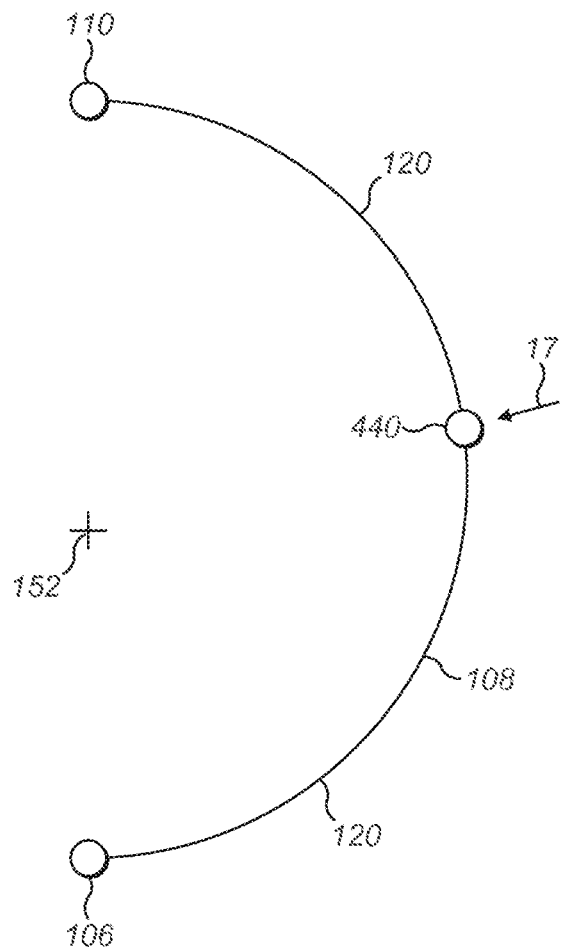
FIG. 15 is a schematic view of a modified version of the spiral sections including an intermediate header.
Figure 16:
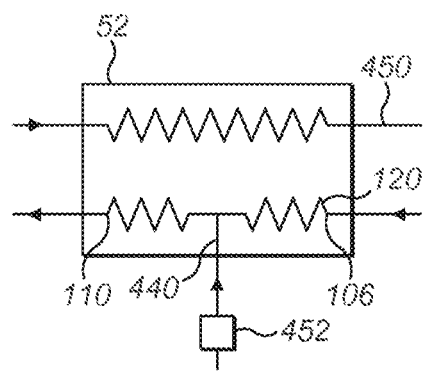
FIG. 16 is a schematic view showing the heat exchanger and intermediate header fluid flow path.
Figure 17:
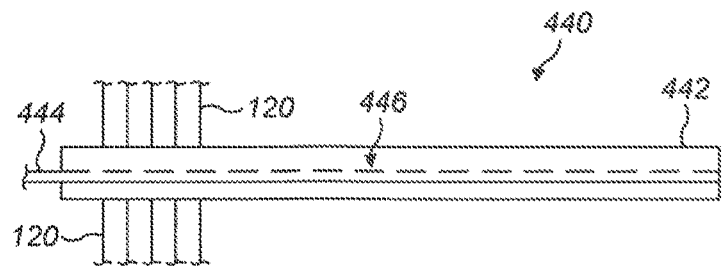
FIG. 17 shows a schematic view of part of the spiral section viewed in the direction 17 in FIG. 15.

As shown in FIG. 15, the spiral sections 108 may be modified to incorporate an intermediate header 440. The intermediate header 440 may have two sets of apertures, into one set of which all of the tubes 120 arriving from the inlet header 106 may be fixed by brazing and into which other set all of the tubes 120 leading to the outlet header 110 may be so fixed. The intermediate header 440 may have an outer tube 442 thus into which the tubes 120 communicate. The inlet header 440 may include an interior tube 444 having a series of injector apertures 446 located in a series at spaced locations therealong for injecting helium into the intermediate header 440. Therefore, the tubes 120 downstream of the intermediate header 440 may carry more mass flow rate of helium than the tubes 120 upstream. This may be extremely useful in cycle design to be able to vary heat exchange characteristics substantially, for example to prevent exceeding allowable metal temperatures at high flight Mach, and in what is only one heat exchanger 52 essentially provides a system which may act like two different heat exchangers with different flows of coolant, helium or another coolant, flowing in them. This may be seen schematically in FIG. 16 where air is seen flowing along one path 450, and inlet header 106 may conceptually be thought of at an inlet point in the heat exchanger 52, intermediate header 440 at an intermediate point and an outlet header 110 at an outlet point. A control valve 452 is schematically shown for controlling the flow of coolant into the intermediate header 440.

Figure 19A:
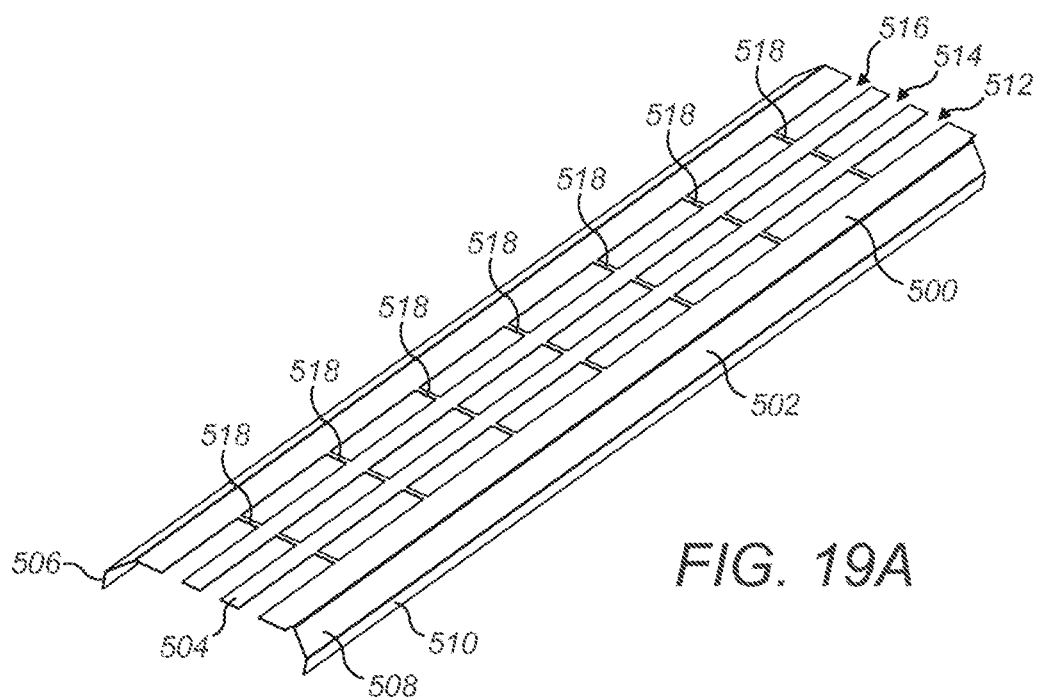
FIG. 19A shows a shim plate used with catcher elements of the capture assemblies.
Figure 19B:
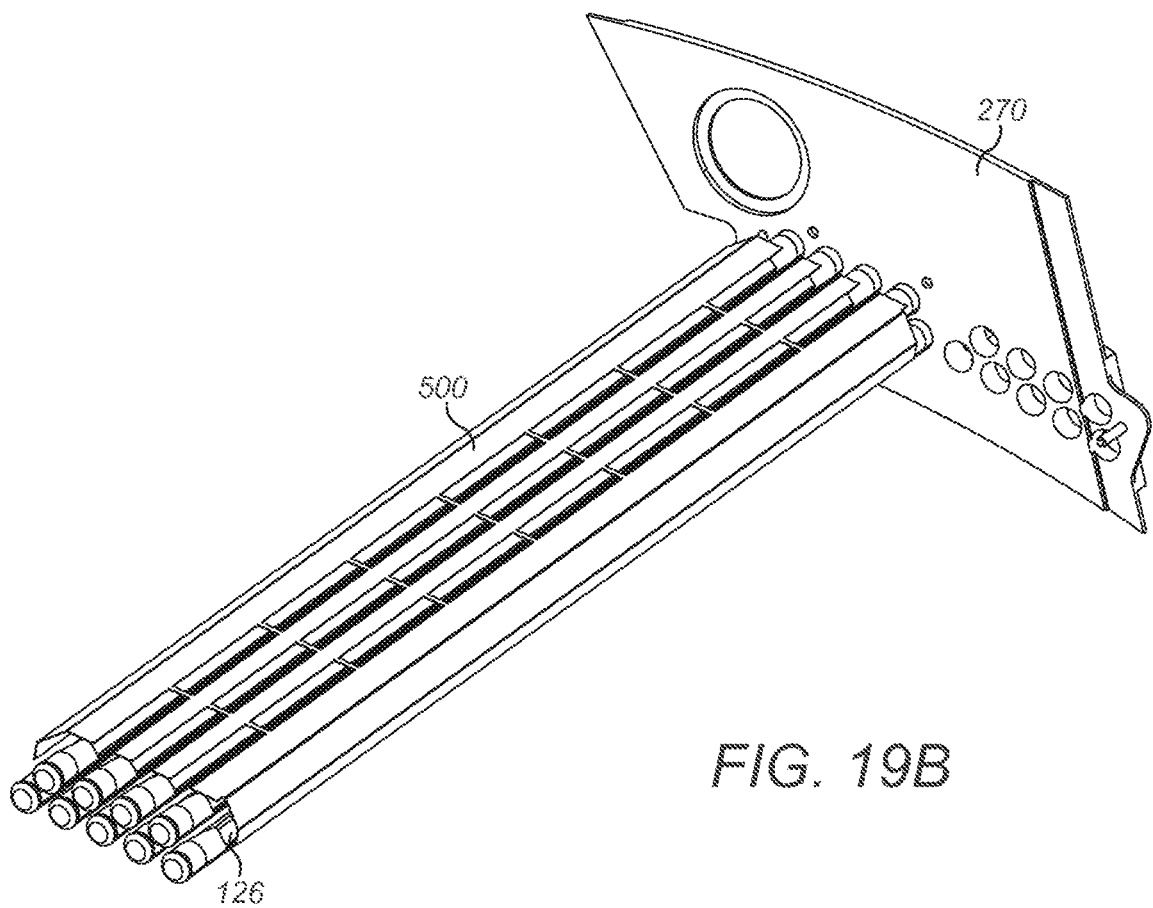
FIG. 19B shows the shim plate of FIG. 19A positioned relative to the catcher elements.
Figure 19C:
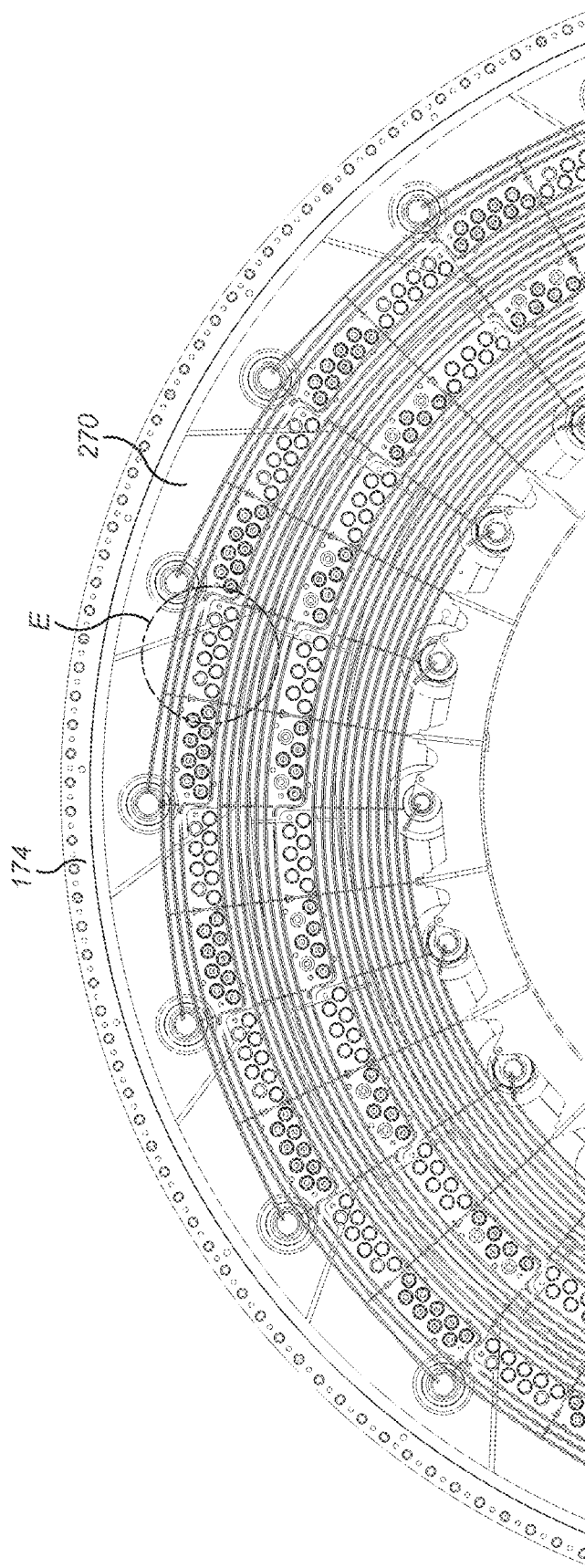
FIG. 19C is a partial end view of the heat exchanger.
Figure 19D:
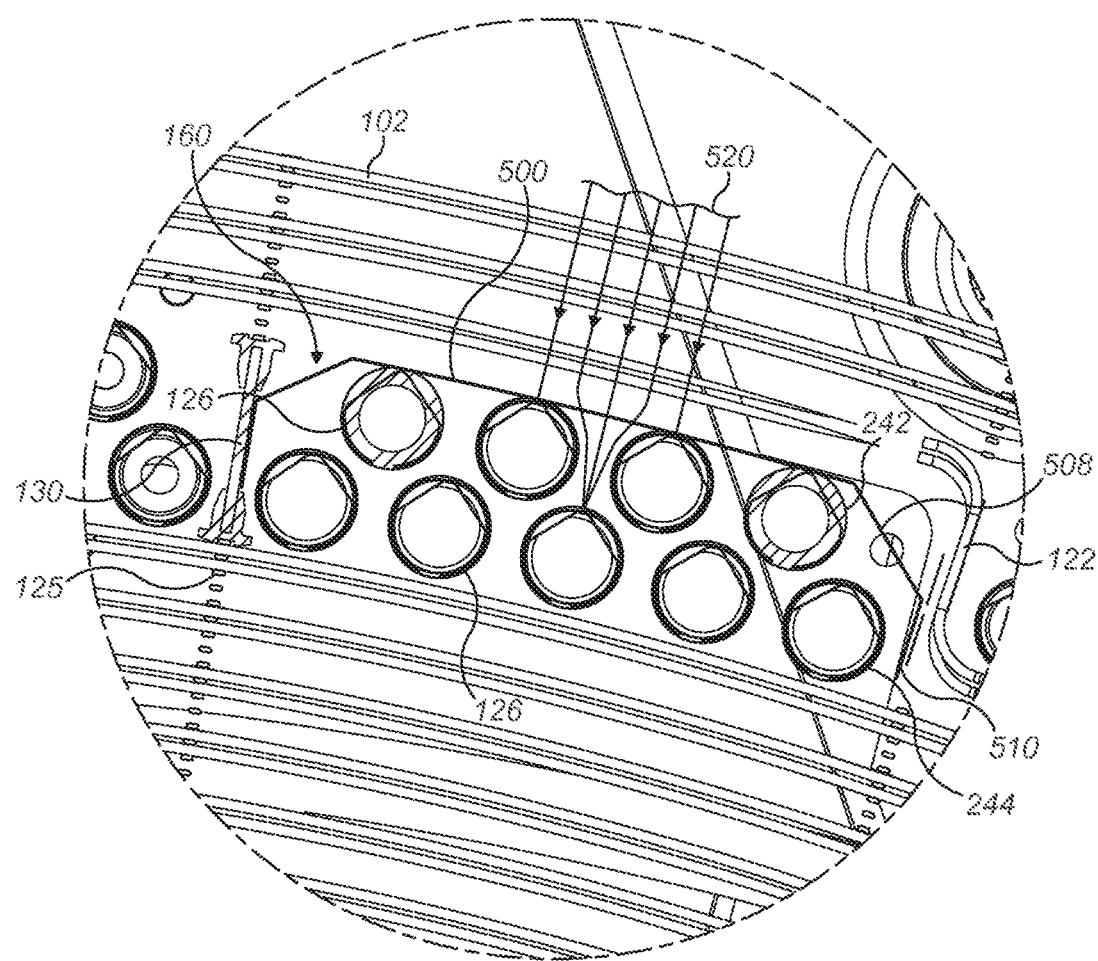
FIG. 19D is a detail view on detail E of FIG. 19C.

As shown in FIGS. 19A to 19B, a shim plate 500 is located in each pocket 160 located radially outside the catcher elements 162 of the rows 242,244. FIG. 19A shows the shim plate 500 for the outer pockets 160, the inner pockets with seven catcher elements 162 having similar shim plates 500 (although the number of longitudinal slots 512,514,516 may be changed e.g. reduced). Each shim plate has a first side wall 502, a top wall 504 and a second side wall 506. Each side wall 502,506 comprises a downwardly slanted portion 508 joined to the top wall 504, the downwardly slanted portion 508 being connected to a lower generally radially extending portion 510 of the side wall 502. The top wall 504 defines generally all of the way therealong three longitudinally extending slots 512,514,516, the slots 512,514,516 being interrupted by a series of small cross-connectors 518. The three slots 512,514,516 are aligned along respective radial paths with the three middlemost catcher elements 126 of the second row 244 of catcher elements 126. Therefore, as shown by the five air flow lines 520 shown in FIG. 19D, the slots 512,514,516 in the shim plates 500 tend to assist in directing the flow onto the catcher elements 126 in the second row 244. The arrangement may be modified by omitting the first row 242 of catcher elements 126 and potentially by placing the top wall 504 of each shim plate 500 nearer to the remaining "second" row 244 with the slots 512,514,516 still being substantially aligned with the catcher elements 126 thereof. In some embodiments, the shim plates may have one slot (or slit) per catcher element 126 in this row. There are not necessarily three slots. There could be, for example five.

The shim plates 500 are optional. They locally increase air flow velocity so that aerodynamic forces are dominant over gravity. Gravity may tend to cause drops to move diagonally between catcher elements without hitting them and being caught. The shim plates 500 thus assist in the production of aerodynamic loads on droplets of water/anti-freeze which tend to direct them onto the catcher elements 126, 244. Other structures than the shim plates 500 be used in other embodiments for a similar purpose.

Figure 9A:
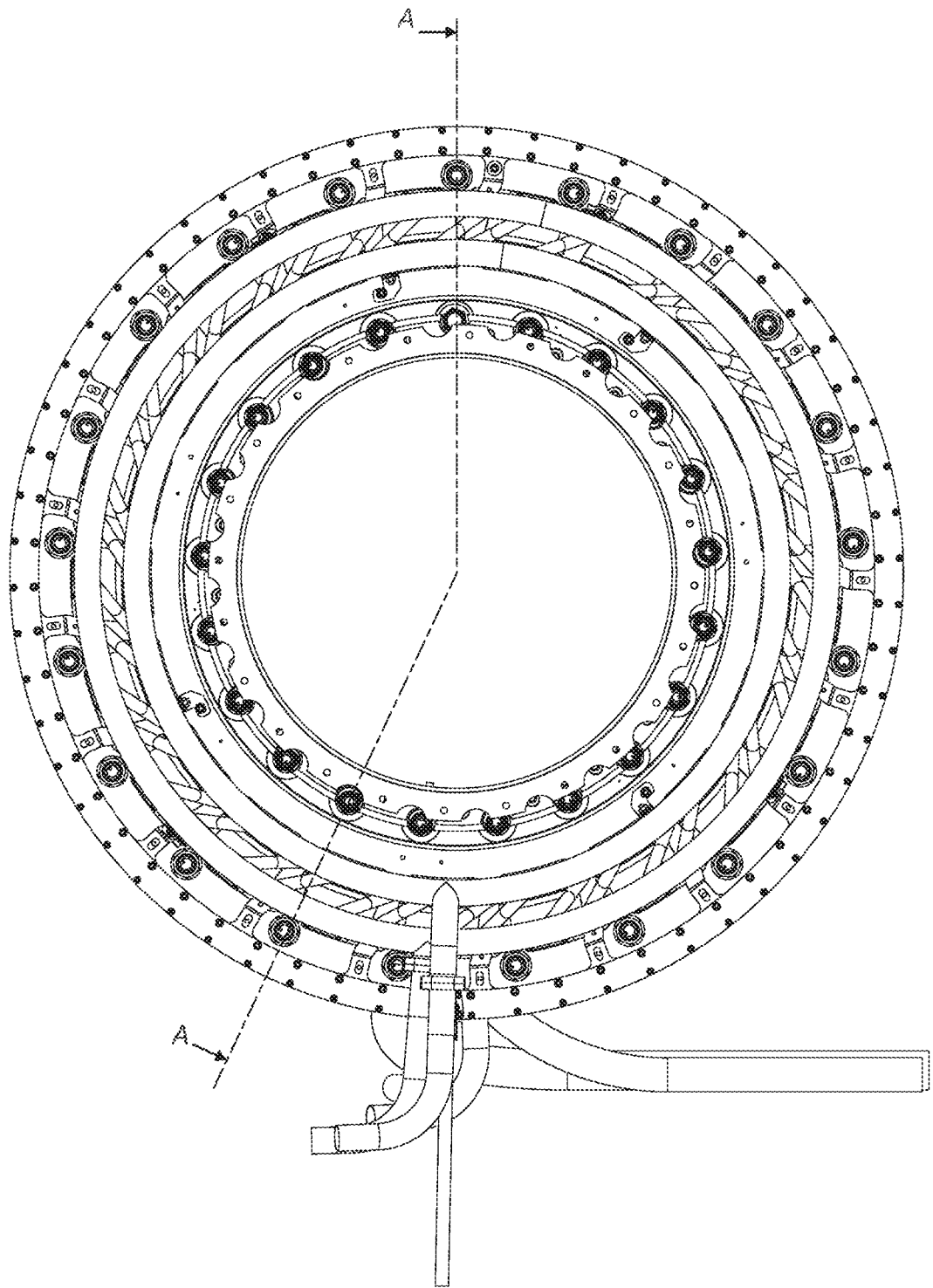
FIG. 9A is rear elevational view on the heat exchanger in the direction 9A in FIG. 9B.
Figure 9B:
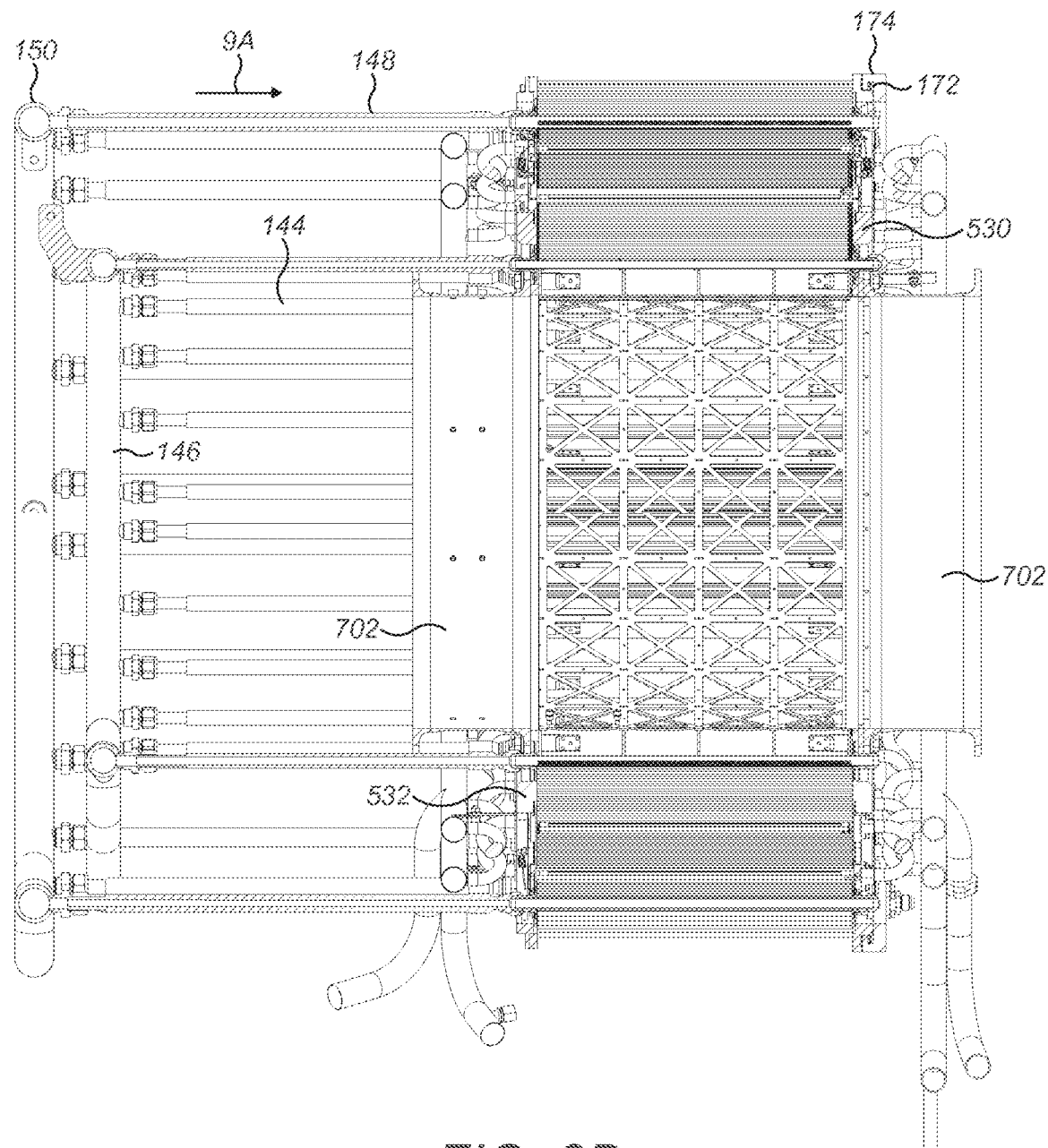
FIG. 9B is a cross-sectional view of the heat exchanger on the two planes represented by the line A-A in FIG. 9A.
Figure 20A:
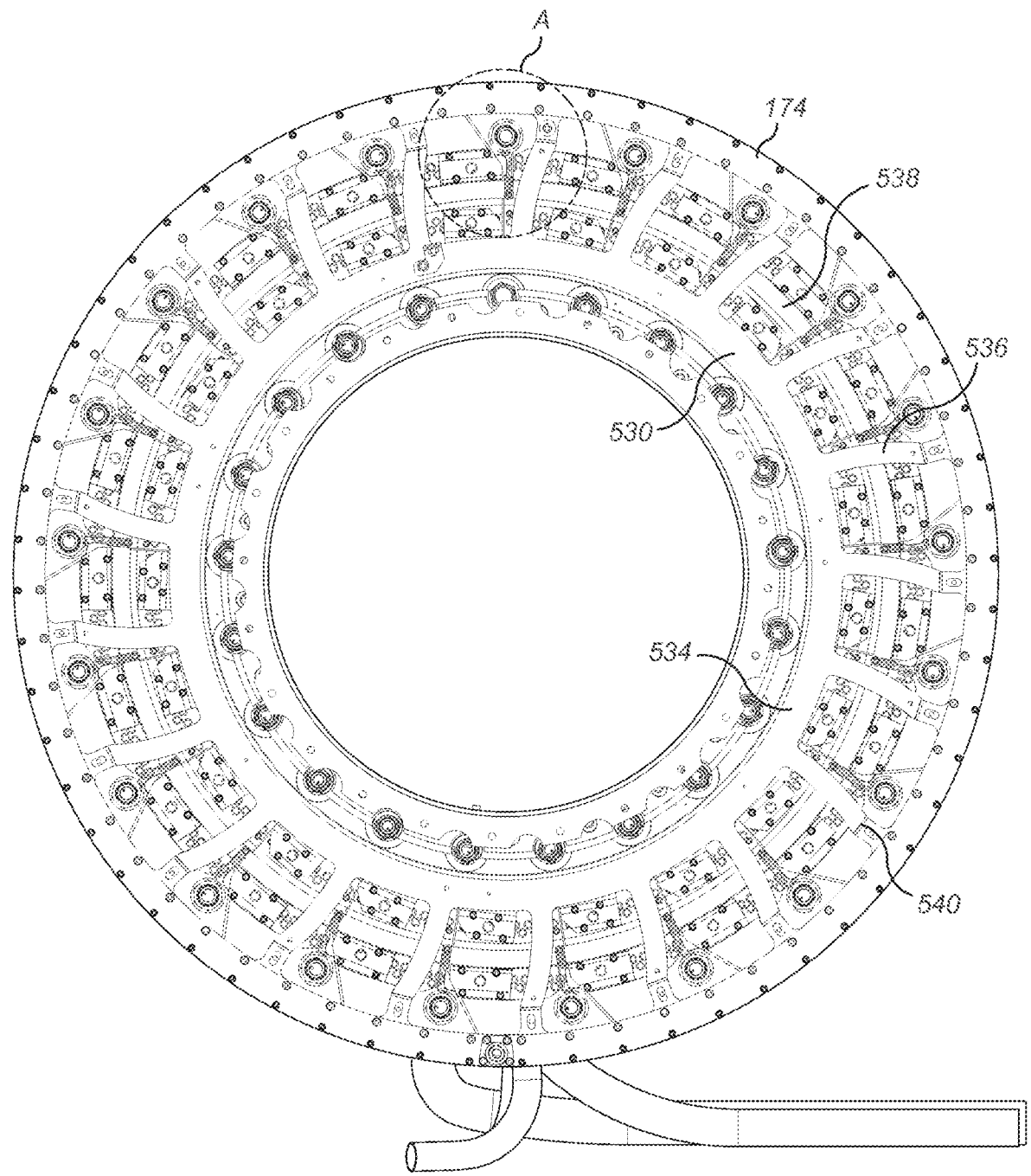
FIG. 20A is a front view of the heat exchanger with circular catcher ring manifolds and S-shaped connection hoses thereof removed for the purposes of clarity.
Figure 20B:
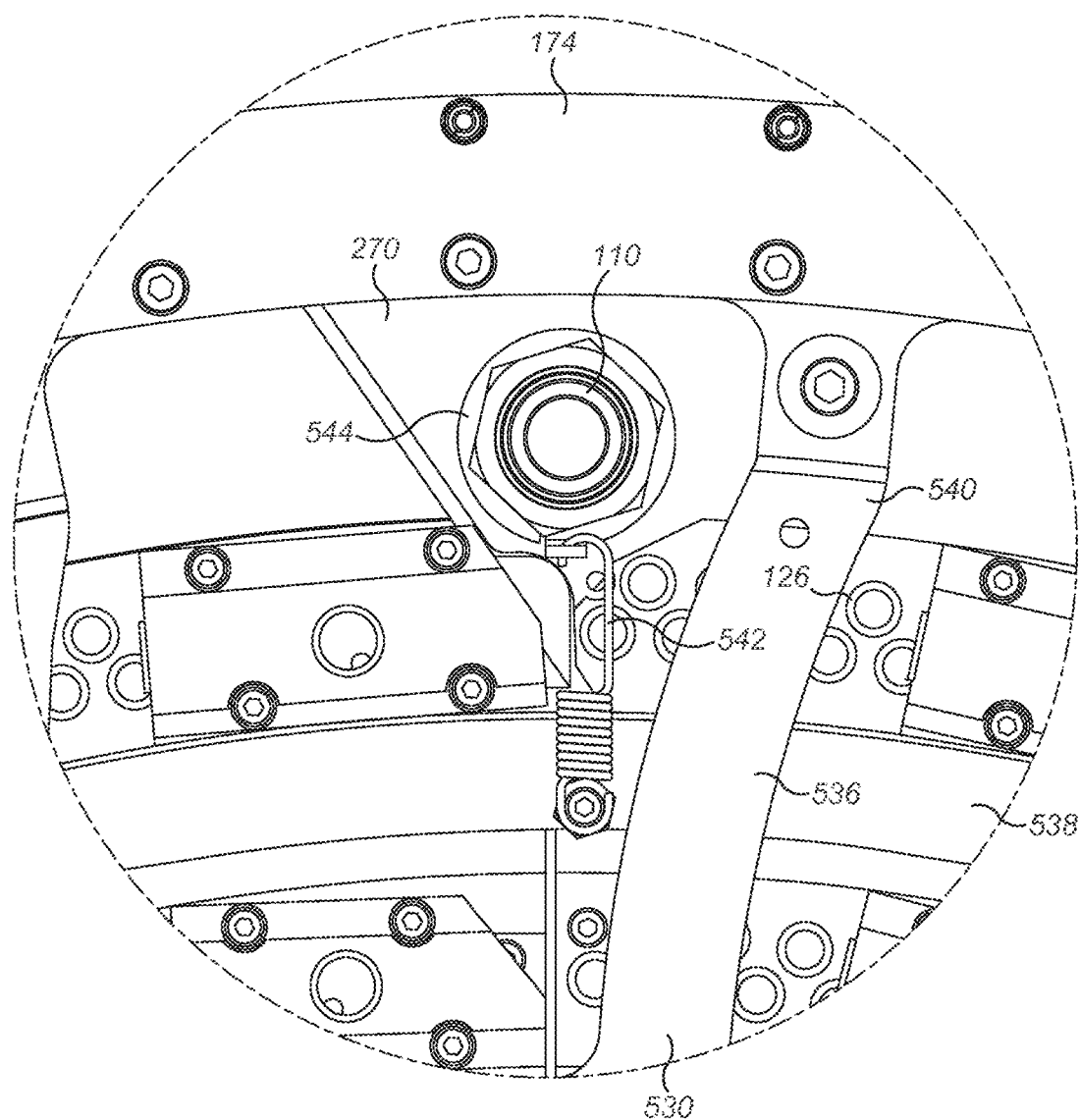
FIG. 20B is a detail view on detail A of FIG. 20A.

As shown in FIG. 20A, and FIG. 9B, the heat exchanger is provided with a front bulkhead 530 and a corresponding rear bulkhead 532, these bulkheads being essentially mirror images of one another. The bulkheads 530, 532 are secured with attachments to allow for movement due to thermal expansion. As shown in FIG. 20A, the front bulkhead 520 has an inner ring 534 sitting around and secured to the support drum 84. The inner ring 534 is connected by a series of generally radially extending spokes 536 with an outer ring 538 of the bulkhead 530. Outer ends 540 of the spokes 536 are connected to the methanol injection ring 174. As shown in FIG. 20B, an outer header retainer spring 542 is spring-located to the ring 538 of the bulkhead 530 and to a tab washer 544 for the header tube 110 attached to each catcher assembly control plate 270. A spring 542 applies a light radial clamping load to the matrix of tubes 120 whilst allowing thermal expansions.

Spokes 536 are slightly spiral in shape in this embodiment to provide a clearance but could be truly radial or have other configurations in other embodiments.

Figure 18:
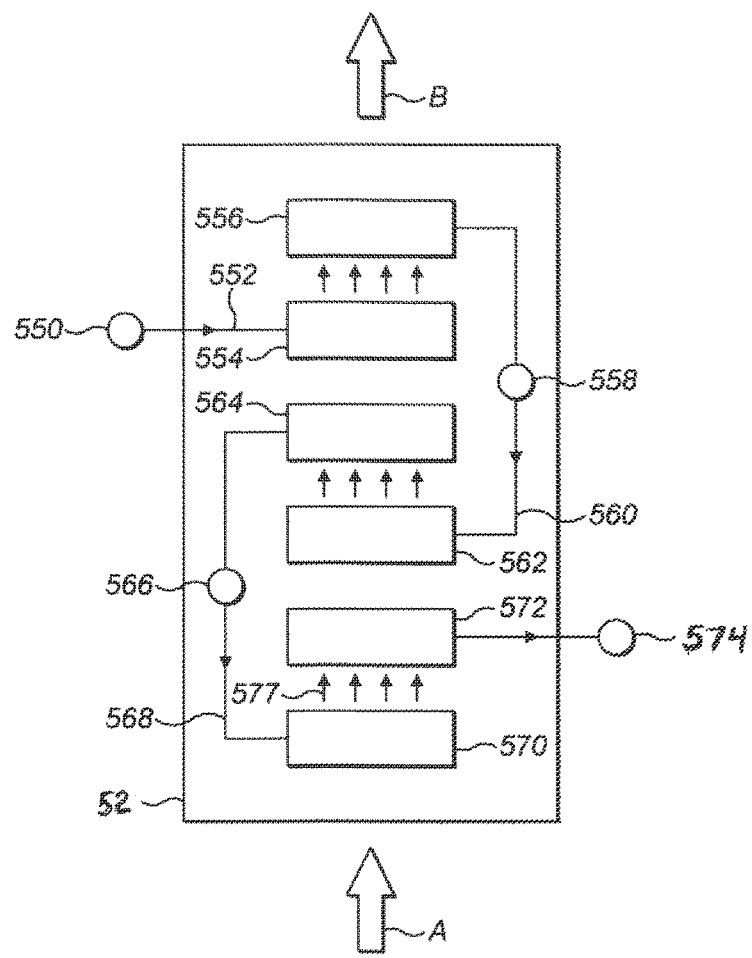
FIG. 18 shows schematically a modified injection system in which methanol (or other antifreeze) is recycled and injected more than once into the air flow.

FIG. 18 shows a modification to the heat exchanger to incorporate recycling of the methanol or other antifreeze used to prevent blocking of the heat exchanger due to frost or ice formation. The air flow flows through the heat exchanger annularly inwardly, as before, shown schematically in the direction of the airflow arrows A,B with the air flow being cooled by the helium tubes 120 (not shown in FIG. 18 for the purposes of clarity) and make it not shown in FIG. 18 (for the purposes of clarity). Methanol (or other antifreeze) is fed from a source/pump 550 along a conduit 552 to a first injector manifold 554 located at a relatively cold downstream location in the air flow in the heat exchanger 52. The methanol is then collected or a significant portion of it is collected with water in the air flow at a first downstream capture or removal arrangement 556. This captured methanol, diluted with the water is then recycled by a pump 558 along a conduit 560 to a more upstream methanol/water injection manifold 562 and this mixture is then (at least partly) captured along with more water from the air flow at a further capture or removal arrangement 564. This methanol (together with water) is then pumped by a further pump 566 along a further conduit 568 with the methanol further diluted to an upstream methanol/water injector manifold 570 where it is injected into the air flow. This further diluted methanol (diluted with water) is then collected or substantially all collected at an upstream catcher or removal arrangement 572 from where it is led away to an exit 574, which may lead to a combustion or thrust producing section of the engine in order to be ejected from the engine to supply additional thrust. This recycling of the methanol in which it is re-injected each time at a location further upstream (and thus can conceptually be considered in counter flow to the air flow even though as shown by schematic arrows 577 the methanol flows along with the air while in the air flow) enables consumption of methanol or other antifreeze to be optimised to a minimum.

It is envisaged that in some embodiments the methanol and water may be lead away from the exit 574 to a methanol separator, such as a distillation system, for re-concentrating the methanol for re-use so as to reduce overall methanol consumption and the weight of methanol to be carried.

Instead of the arrangement shown in FIG. 18 it would be possible to have two or more catcher sections (like catcher arrangement 572) in series (one after the other along the air flow path) after each injection manifold (like 562) and before the next ejection manifold.

Figure 21A:
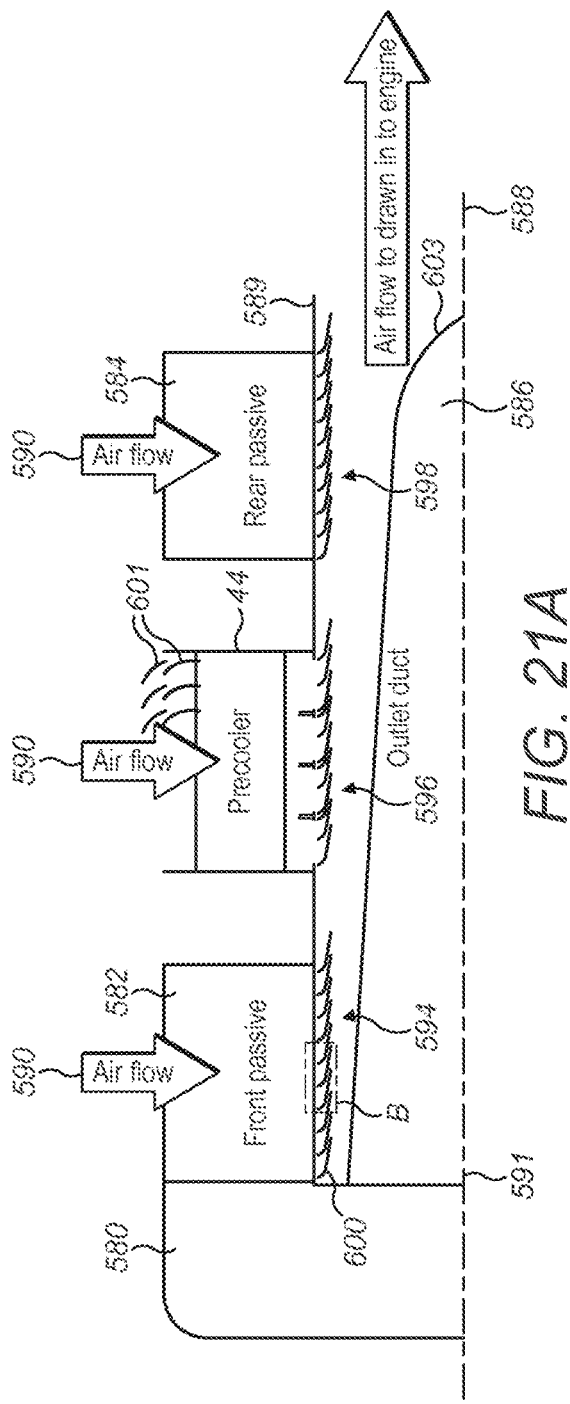
FIG. 21A is a schematic view of the heat exchanger placed around an outlet duct together with two passive units, the outlet duct leading in a longitudinal direction towards an air compressor of the engine.

As shown in FIG. 21A the heat exchanger 52 (or pre-cooler) may be assembled in a test rig 580 together with a front passive heat exchanger simulator 582 and a rear passive heat exchanger simulator 584. The simulators 582, 584 have similar air flow characteristics to the heat exchanger 52. The air flow simulators 582,584 and heat exchanger 52 are arranged annularly around an outlet duct 586 with a centre line or axis 588. In practice for a flight-ready arrangement of three (or another multiple of) heat exchangers 52 next to one another in a similar configuration, the front and rear passive air flow simulators 582,584 may be replaced by additional heat exchangers 52 which may be substantially identical to the middle heat exchanger 52. These three heat exchangers 52 may thus accept incoming air flows 590 from duct 592 leading from inlet 43 and the outlet duct 586 may lead to the air compressor 54 of the turbo compressor 46 shown in FIG. 3.

Figure 21B:
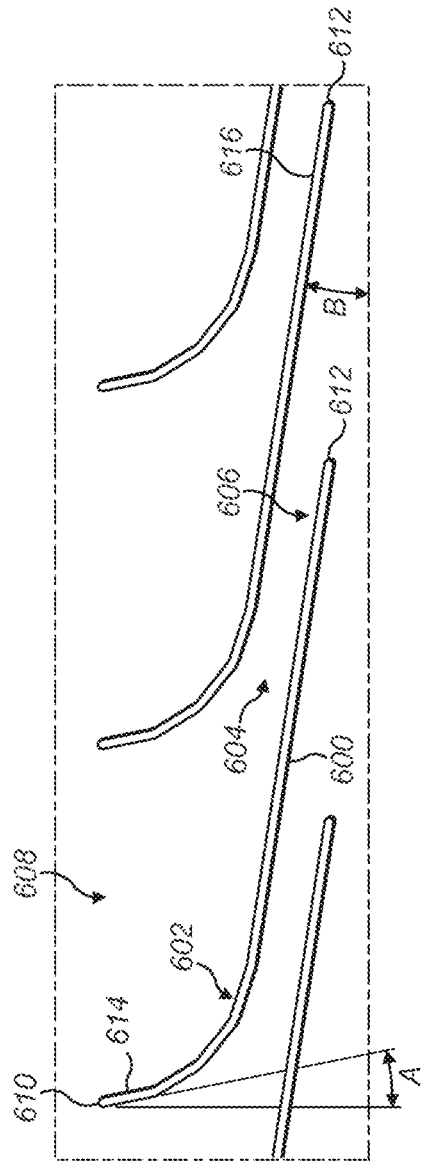
FIG. 21B is a detail view on detail B of FIG. 21A.

The airflow simulators 582,584 and heat exchanger 52 are each radially inwardly bounded by a series 594,596,598 of overlapping guide vanes 600, each guide vane being an annular or ring-like element co-axial with the central axis 588. Each guide vane has a longitudinal extent along the axis 588 and in cross-section as shown in FIG. 21B has a curved generally radiused leading portion 602 extending approximately 20% of the longitudinal extent of the guide vane and a trailing portion 604 extending the remaining approximately 80% of the longitudinal extent of the guide vane 600 which is substantially conical—although FIG. 21B shows the leading edge portion 614 to be several flattened portions it is in fact preferably smoothly curved. Due to the configuration of the vanes in which they are curved and inter-nested, and in which an exit area 606 between adjacent guide vanes 600 is considerably smaller than an entrance area 608 between or near leading edges 610 thereof (bearing in mind both a smaller slot length transverse to flow as shown in cross section and a smaller circumference at the exit area 606 too), the flow is turned and accelerated through the guide vane 600. Each guide vane 600 is substantially the same width all the way along from its leading edge 610 to a trailing edge 612 thereof but this could be changed in other embodiments. The leading edge 610 (or leading edge portion 614) of each guide vane 600 is angled at approximately 10 degrees to radial, i.e. the angle A in FIG. 21B. The trailing edge 612 (or trailing edge portion 616) of the guide vane 600 is angled at approximately 10 degrees to the longitudinal axis 588 of the duct 586, i.e. the angle B in FIG. 21B.

The guide vanes 600 serve to locally turn and accelerate the air flow up to the air velocity generally in the outlet duct 586 such that upstream velocity distribution, i.e. upstream of the front and rear passive air flow simulators 582,584 and the heat exchanger 52, is forced to become more uniform such that the same or substantially the same air mass flow rate will flow through each even though they are different distances along the duct 586.

Although it was originally assumed that a centre body inserted into the outlet duct 586 would eradicate the problem of static pressure distribution along the outlet duct reducing in the direction towards the engine, such a centre body unexpectedly did not when tested by the present applicants have the desired effect and forced even more of the flow to be drawn through the rear of the installation, the reason for this (the present applicants have worked out) being that the air entering the outlet duct enters in the radial direction but subsequently follows a curved path in order that it turns through 90 degrees to exit the outlet duct and whenever the fluid follows a curved path there is a pressure gradient perpendicular to the flow and the flow entering the outlet duct towards the rear of the installation (nearer duct exit 589) was found to follow a tighter radius of curvature than the air entering the duct from nearer the front 591 thereof, with the tighter radius of curvature and high velocity towards the rear causing larger pressure gradients and resulting in a higher pressure region underneath the front passive airflow simulator 582 compared to the rear passive airflow simulator 584, thus causing higher velocities drawn across the rear passive air flow simulator 584 than the front passive airflow simulator 582.

The turning vanes 600 alleviate this problem locally at the exit of the drum-like air flow simulators 582,584 and heat exchanger 52. Although between neighbouring vanes 600 there will still be a pressure gradient in the axial direction, this is now constrained between boundaries of vane pairs. Hence by splitting the flow into a sufficient number of turning segments, the larger outlet duct pressure gradient can be removed or at least reduced. Not only are more even mass flow rates drawn through the three drums 582,584,52 but the streamlines across the heat exchanger 52 become almost radial (reducing a tendency without the vanes for more flow to pass through the heat exchanger 52 at one axial position than another), thereby helping to ensure a more uniform flow field through the heat exchanger 52 for the purposes of heat transfer.

With the turning vanes 600 installed, the pressure ratio, i.e. the ratio of pressure in the duct 586 in the region of the front airflow simulator 586 to the pressure in the region of the rear simulator 584 was seen to improve from a ratio of 72% without the guide vanes 600 to 89% with the guide vanes installed as shown in FIG. 21A.

The vanes 600 are thus shown to offer a solution to re-distributing the mass flow through a heat exchanger assembly having a longitudinal extent and leading to an axially-flowing duct and/or arrangements with multiple heat exchanger modules like the module 52 together with similar modules replacing the passive air flow simulators 582,584. The vanes 600 provide more uniform radial velocity distributions through the heat exchanger 52.

The blade outlet angles (B) may be varied along the axial length of the installation to increase uniformity of flow yet further and it is envisaged that a centre body 603 may be added as well such that a combined turning vane and centre body geometry can be utilised to provide a highly uniform flow distribution with minimal total pressure loss. With the outlet duct 586 generally cylindrical, the centre body 603 may be parabolic in cross-section, as schematically shown, in order to provide generally linear area increase per unit length (due to the 3D annular shape), enabling mass flux to remain substantially constant.

As shown in FIG. 21A, as well as inner guide vanes 600, each heat exchanger 52 may also be provided with a series of outer guide vanes 601 extending fully along the axial length thereof, or substantially so. Only three such outer vanes 601 are shown in FIG. 21A for the purposes of clarity. The outer vanes 601 are preferably each slotted as shown in FIG. 21A since pressure increases and the flow velocity slows as flow passes the vanes 601 and the slotting stops flow stall. Slotting is not needed on the inner vanes 606 since pressure decreases and flow accelerates across them. With the flow reversed outwardly radial in other embodiments, the inner vanes may be slotted. In some embodiments, either the inner 600 or the outer 601 vanes may be omitted.

As shown, for example, in FIG. 13B, the catcher plates 270 have pegs 700 which protrude into the catcher pockets in the matrix of tubes 120 which allows them to follow the catcher pockets as the matrix moves under thermal and pressure displacements. It will be appreciated that the catch plates 270 overlap so as to prevent axial air leakage between them; and it is noted that and the catcher plates do not normally bear radially on each other or the front and rear bulkheads.

Although the embodiment shown in the majority of the drawings has only a single antifreeze/methanol injection point radially outside the matrix of tubes 120, it is envisaged that a flight-ready engine may have at least two injection points at different radial locations or more radial locations as shown in FIG. 18.

The transition tubes 702 shown in FIG. 9B may be useful in test rigs and may be removed in operational engines.

The concave dished pockets in the catcher elements 126 are approximately 50 mm long. The mesh 258 is wrapped tightly around the catcher tubes and secured to them. This forms 50 mm long pockets where each catcher tube 126 is dished, separated by the lands 254 where the mesh 258 contacts the tube so as to compartmentalise the suction cavities into separate pockets so that in case of screen damage remaining pockets remain operational.

The temperature control components including the temperature sensor 350 and controller 352 may be adapted or replaced in other embodiments with other apparatus known to the skilled person in the art form maintaining a constant airside temperature profile for frost control by providing the correct amount of methanol/water condensation at the particular catcher locations. The control in at least some embodiments is adapted to control the last (coldest) catcher row to be located at about −80 to ~100 degrees C. air temperature where the methanol concentration should be about 80% mole fraction or 88% mass fraction to delay the freezing point to the lowest possible temperature.

The frost control system requires very little consumable materials compared to the previous publications mentioned above, i.e. the mass of methanol required is very low, translating into increased vehicle payload and improved economics.

The connection of the methanol manifold 174 to the spokes 536 is preferably via slotted holes (not shown) to allow for radial thermal expansion.

The methanol injector ring 174 shown in the drawings is composed of active injection tubes 710 with alternate plain non-fluid injecting tubes 712 of larger diameter. This arrangement provides increased air velocity close to the injection tubes 710 but the plain tubes 712 may be removed in other embodiments.

The light pressing of the outlet headers 110 against the matrix of tubes 120 using the springs 542 applies an initial preload which is augmented by the airside pressure drop when the engine is running and it also prevents the module spirals 108 from swinging open when the axis of the heat exchanger 52 is horizontal. The helium bypass controls, 350,352,354 may be replaced in other embodiments and the circuitry may be changed to include a recirculation loop and for alternative designs of catcher temperature control.

The heat exchanger may be used in other applications than with the engine shown and is not limited to use in the particular aerospace application described and may be used in various other aerospace and industrial applications.

Various features shown in the drawings may be varied to what is shown and described without departing from the scope of the invention. For example the end walls formed by the catcher plates 127 and bulkheads 530,532 may be in other embodiments formed in thin sheet material.

In embodiments with generally radially outward air flow (inside of radially inward), the tube support structure including the bird cage drum 84 and I-beams 130 may be reversed such that the drum 84 is positioned radially outside the spiral tubes 120 so as to resist outward loading thereon.

In situations where the fluid (such as air) being cooled does not contain water vapor, or if the fluid will not be cooled below 0 degrees, there is a relatively low likelihood that frost formation will impede the operation of the heat exchanger. In such situations, it may be advantageous to eliminate the frost control apparatus (e.g., the methanol injection system, the catcher assemblies 240, the shims 500, the doglegs 112',114', I-beams 130 in the region of the spiral sections 108, arcuate pockets 160, radial portions 122 and foils/joggles 124) from the heat exchanger, to, for example, reduce weight when the heat exchanger is used with an engine (such as the engine disclosed in GB 1318111.0).

Various modifications may be made to the described embodiments without departing from the scope of the invention as defined by the accompanying claims.

The invention claimed is:

1. A heat exchanger, comprising:
    at least one first conduit section for the flow of a first fluid in heat exchange with a second fluid in a flow path which passes the at least one first conduit section, in which each first conduit section comprises a flow path via at least one tube from an inlet to an outlet; and
    an intermediate header provided in the flow path between the inlet and outlet for flow communication with an intermediate fluid flow path,
    wherein the intermediate header includes an outer enclosure for enclosing the first fluid and an injector for injecting intermediate fluid flow into the outer enclosure, at least a portion of the injector disposed within the outer enclosure and extending along at least a portion of a length of the outer enclosure.
2. The heat exchanger as claimed in claim 1, wherein each of the inlet and outlet comprises a header tube.
3. The heat exchanger as claimed in claim 2, wherein the header tubes are straight.
4. The exchanger as claimed in claim 2, wherein the at least one first conduit section comprises a plurality of first flow tubes extending from the inlet to the intermediate header for flow therebetween and a plurality of second flow tubes extending from the intermediate header to the outlet for flow therebetween.
5. The heat exchanger as claimed in claim 4, wherein a length of one first flow tube plus a length of one second flow tube is 2 to 3 metres.
6. The heat exchanger as claimed in claim 4, wherein the first flow tubes and/or the second flow tubes are 1 mm in diameter.
7. The heat exchanger as claimed in claim 4, wherein the first flow tubes and/or the second flow tubes have wall thicknesses of 20 to 40 microns.
8. The heat exchanger as claimed in claim 4, wherein each said first conduit section comprises a spiral section having the plurality of first and second flow tubes extending in a spiral shape alongside and spaced from one another in rows.
9. The heat exchanger as claimed in claim 1, further comprising a controller for controlling pressure in the intermediate flow path.
10. The heat exchanger as claimed in claim 9, wherein the controller comprises a flow valve.
11. The heat exchanger as claimed in claim 1, wherein the injector comprises a tube having a series of flow apertures spaced therealong for injecting fluid into the outer enclosure.
12. The heat exchanger as claimed in claim 11, wherein each of the outer enclosure and the injector comprises a respective straight elongate tube.
13. The heat exchanger as claimed in claim 12, comprising a plurality of rows of tubes spaced apart from one another along a longitudinal direction of the outer enclosure, the tubes in said spaced apart rows being fluidly coupled to the outer enclosure at respective spaced locations along a length of the outer enclosure.
14. The heat exchanger as claimed in claim 1, wherein at least one of said at least one tube has first and second portions extending therealong which are formed of different materials to one another.

* * * * *